(12) United States Patent
Zhang et al.

(10) Patent No.: US 9,040,634 B2
(45) Date of Patent: May 26, 2015

(54) POLYCARBOXYLIC ACID DYE WITH LOW POLYMERIZATION DEGREE

(75) Inventors: Shufen Zhang, Dalian (CN); Bingtao Tang, Dalian (CN); Wei Ma, Dalian (CN)

(73) Assignee: DALIAN UNIVERSITY OF TECHNOLOGY, Dalian, Liaoning Province (CN)

( * ) Notice: Subject to any disclaimer, the term of this patent is extended or adjusted under 35 U.S.C. 154(b) by 225 days.

(21) Appl. No.: 13/700,092

(22) PCT Filed: May 23, 2011

(86) PCT No.: PCT/CN2011/000888
§ 371 (c)(1),
(2), (4) Date: Nov. 26, 2012

(87) PCT Pub. No.: WO2011/147196
PCT Pub. Date: Dec. 1, 2011

(65) Prior Publication Data
US 2013/0289218 A1    Oct. 31, 2013

(30) Foreign Application Priority Data

May 25, 2010    (CN) .......................... 2010 1 0193521

(51) Int. Cl.
```
C08F 222/06      (2006.01)
C09B 29/50       (2006.01)
C08L 37/00       (2006.01)
C08F 8/30        (2006.01)
C08L 35/02       (2006.01)
C08F 220/36      (2006.01)
C08F 222/22      (2006.01)
C09B 69/10       (2006.01)
C08F 122/06      (2006.01)
C09B 1/22        (2006.01)
C09B 1/24        (2006.01)
C09B 29/36       (2006.01)
```

(52) U.S. Cl.
CPC .............. *C09B 29/366* (2013.01); *C08L 37/00* (2013.01); *C08F 8/30* (2013.01); *C08L 35/02* (2013.01); *C08F 220/36* (2013.01); *C08F 222/22* (2013.01); *C09B 69/101* (2013.01); *C09B 69/106* (2013.01); *C09B 69/109* (2013.01); *C08F 122/06* (2013.01); *C08F 222/06* (2013.01); *C09B 1/22* (2013.01); *C09B 1/24* (2013.01); *C09B 29/3604* (2013.01)

(58) Field of Classification Search
None
See application file for complete search history.

(56) References Cited

U.S. PATENT DOCUMENTS

| | | |
|---|---|---|
| 3,911,164 A | 10/1975 | Sayigh et al. |
| 4,093,793 A | 6/1978 | Champenois |
| 6,497,732 B1 | 12/2002 | Soane et al. |
| 6,764,541 B1 | 7/2004 | Banning et al. |
| 2003/0205171 A1 | 11/2003 | Adams et al. |
| 2009/0095200 A1 | 4/2009 | Belmont et al. |

FOREIGN PATENT DOCUMENTS

| | | |
|---|---|---|
| CN | 1665892 A | 9/2005 |
| DE | 39 21 498 A1 | 3/1990 |
| DE | 43 12 243 A1 | 10/1993 |
| EP | 1 489 144 A1 | 12/2004 |
| EP | 1489144 | * 12/2004 |
| GB | 2267095 | * 11/1993 |
| WO | WO 2009/048564 A2 | 4/2009 |

OTHER PUBLICATIONS

International Search Report (PCT/ISA/210) issued on Sep. 1, 2011, by the Chinese Patent Office as the International Searching Authority for International Application No. PCT/CN2011/000888.

* cited by examiner

*Primary Examiner* — Robert C Boyle
(74) *Attorney, Agent, or Firm* — Buchanan Ingersoll & Rooney PC

(57) ABSTRACT

The present invention provides a polycarboxylic acid dye with low polymerization degree, which is formed by using a macromolecule skeleton of polymaleic acid linked to an azo chromophore, an azo-metal complexation chromophore or an anthraquinone chromophore via a bridge group of amide or ester bond. The dye is useful for dyeing and printing leather, protein fiber, cellulose fiber and synthetic fiber.

5 Claims, 1 Drawing Sheet

POLYCARBOXYLIC ACID DYE WITH LOW POLYMERIZATION DEGREE

TECHNICAL FIELD

The present invention relates to a polycarboxylic acid dye with low polymerization degree.

BACKGROUND

The polymerization-type dye has high strength, good film-formability, solvent resistance and processability, and has excellent transference resistance and moisture resistance, which thus represents a new field within the macromolecule and dye chemistry. The polymerization-type dye of polycarboxylic acid has carboxyl group supported on the molecule, which can not only endue the dye water-solubility, so as to be useful for coloring the natural fiber and leather; but also change into hydrophobic dye owing to the ability of the carboxyl group to be removed or be amidated or esterified under certain conditions, so as to color the synthetic fiber. The polycarboxylic acid dye hereby is broadly applicable, and thus is much applicably valuable and has great prospect.

Lewis et al. produce a tetra-carboxylic acid dye by reacting an aspartic acid and a dye of C.I. reactive red 120 with di-active groups, which dye is baked at a temperature of 180-210° C. for 1-2.5 minutes, reacted with fiber via a transition state of acid anhydride for dyeing. However, the dye has low dye fixation, and the temperature for dyeing is relatively high (Lewis, AATCC, 1995, 536-544). U.S. Pat. Nos. 3,911,164 and 6,764,541 disclose to polymerize the maleic anhydride and methylvinyl ether to obtain a copolymerized polymer, which is then reacted with a dye, so as to obtain a carboxyl-comprising copolymerized macromolecule dye; whilst the incorporation of copolymerized group decreases the content of acid anhydride in the polymer, resulting in decreased amount of dye grafted thereto. Anyhow, the polycarboxylic acid dye is one with great prospect due to strong binding force and ease to syntheses; however, research on the polycarboxylic acid dye is currently insufficient. In particular, the polycarboxylic acid dye based on polymaleic acid having a macromolecule skeleton of polymaleic acid homopolymer, linked with organo-small molecule dye via a bridge group of amide or ester bond.

Therefore, the purpose of the present invention is to provide a new polycarboxylic acid dye with low polymerization degree, which dye has a macromolecule skeleton of polymaleic acid homopolymer, linked with organo-small molecule dye via a bridge group of amide or ester bond. The dye is useful for dyeing and printing leather, natural fiber and synthetic fiber; wherein the color fastness of dye is increased due to the presence of polycarboxyl group increasing the binding force between the dye and the colored substrate. The dye is synthesized by simple process, is convenient to use, and thus has broad application prospect.

SUMMARY OF THE INVENTION

The present invention provides a polycarboxylic acid dye with low polymerization degree.

The dye is a polymerized polycarboxylic acid dye having a macromolecule skeleton of polymaleic acid homopolymer linked to a chromophore via a bridge group of amide or ester bond, having a structural formula of:

(1)

in formula (1), the structural component A comprises, mainly comprises or consists of the following monomer units which are linked randomly, in block or alternately in arbitrary sequence present with the numbers of $n_1$, $n_2$ and $n_3$:

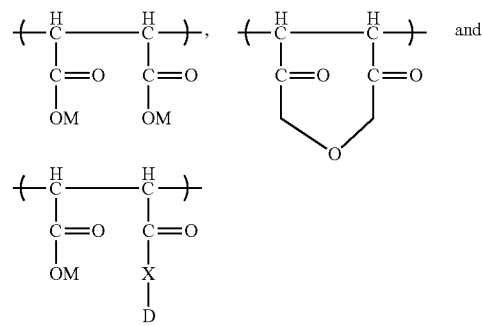

wherein each of the structural component A can independently have same or different $n_1$, same or different $n_2$ and/or same or different $n_3$, wherein, M is H, Na, K or a quaternary ammonium positive ion of formula 1-1:

(1-1)

in formula 1-1, $r_1$, $r_2$, $r_3$ and $r_4$ are hydrogen, a $C_1$-$C_{12}$ linear alkyl, or a $C_1$-$C_{12}$ linear alkenyl, wherein the $r_1$, $r_2$, $r_3$ and $r_4$ can be same or different;

$n_1$=1-100, preferably 1-20; $n_2$=0-100, preferably 0-10; $n_3$=1-100, preferably 1-50; n=an integer of 1-10000, preferably 1-1000;

X=O or NH, linked to a chromophore;

D is a chromophoric group having an azo, azo-metal complexed or anthraquinone structure, with the formula of (2), (3), (4), (5), (6), (7), (8), (9), (10), (11), (12), (13), (14), (15), (16), (17), (18), (19), (20), (21), (22), (23), (24), (25) or (26), wherein:

the azo chromophoric group (2), (3), (4), (5), (6), (7), (8), (9), (10), (11), (12), (13), (14), (15), (16), (17), (18) or (19) has a structure as below:

The chromophoric group (2) is:

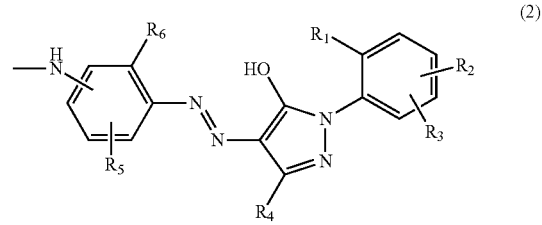
(2)

in formula (2): $R_1$ is H or Cl; $R_2$ is H, Cl, CN, $SO_3Na$, $SO_2NHR$, $SO_2CH_2CH_2Y_1$ or $SO_2NHCH_2CH_2Y_1$; $R_3$ is H, Cl, CN, CONHR or COOR; $R_4$ is H, $CH_3$, CN, COOR or $C_6H_5$; $R_5$ is H, Cl, NHR, CN, $SO_3Na$, $SO_2NHR$, CONHR, COOR, NHCOR,

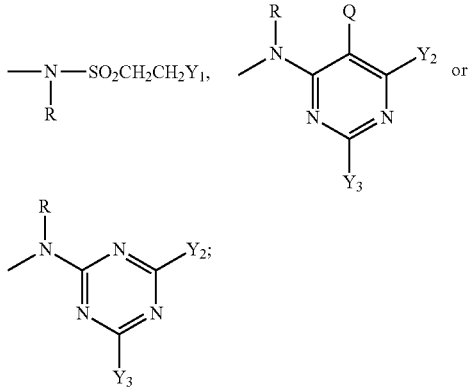

$Y_1$ is Cl, $OSO_3X$ or $N(CH_3)CH_2CH_2SO_3X$; $Y_2$ is Cl, F, OR, $NHCH_2SO_3X$, $N(R)_2$, $N(CH_2OH)_2$, $N(C_2H_4OH)_2$

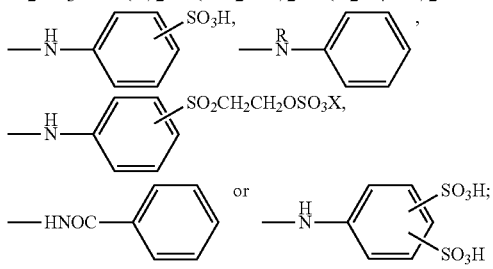

$Y_3$ is Cl, F, OR, $NHCH_2SO_3X$, $N(R)_2$, $N(CH_2OH)_2$, $N(C_2H_4OH)_2$,

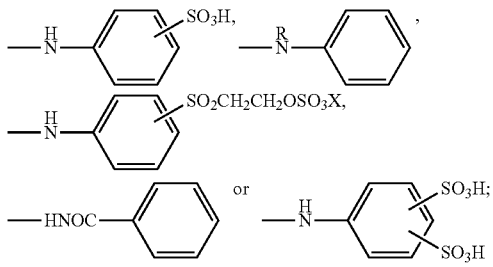

Q is Cl or $CH_3$; $R_6$ is H, Cl, CN, $NO_2$, $SO_2NHR$, CONHR or COOR; R is H, or a linear, saturated alkyl of $C_pH_{2p+1}$, wherein: p is an integer with the proviso of $1 \leq p \leq 18$; and X is H, Na or K;

the chromophoric group (3) is:

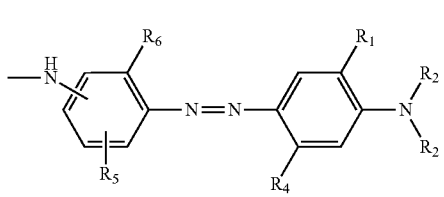

in formula (3): $R_1$ is H, $OCH_3$ or $OCH_2CH_3$; $R_2$ is $CH_3$, $CH_2CH_3$, $CH_2CH_2OH$, $CH_2CH_2OCH_3$, $CH_2CH_2Cl$, $CH_2CH_2CN$ or $CH_2CH_2OCOCH_3$; $R_3$ is $CH_3$, $CH_2CH_3$, $CH_2CH_2OH$, $CH_2CH_2OCH_3$, $CH_2CH_2Cl$, $CH_2CH_2CN$ or $CH_2CH_2OCOCH_3$; $R_4$ is H, $NHCOCH_3$, $NHCOC_2H_5$,

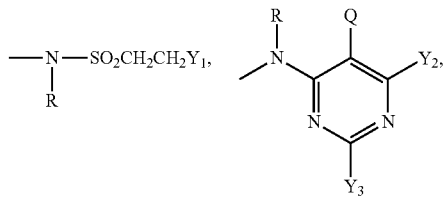

$NHCOCY_4=CHY_5$ or $NHCOCHY_4CH_2Y_6$; $Y_1$ is Cl, $OSO_3X$ or $N(CH_3)CH_2CH_2SO_3X$; $Y_2$ is Cl or F; $Y_3$ is Cl, F, OR, $NHCH_2SO_3X$, $N(R)_2$, $N(CH_2OH)_2$, $N(C_2H_4OH)_2$,

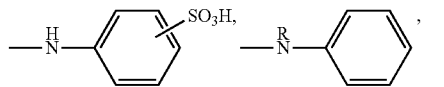
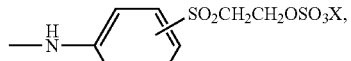
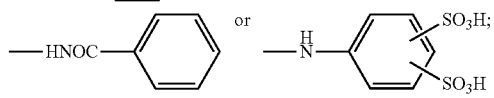

$Y_4$ is H or Br; $Y_5$ is H, Cl or Br; $Y_6$ is Br or $OSO_3X$; Q is Cl or $CH_3$; $R_5$ is H, Cl, Br, CN, $NO_2$, $SO_3Na$, $SO_2NHR$, CONHR or COOR; $R_6$ is H, Cl, Br, CN, $NO_2$, $CH_3$, $OCH_3$, $OC_2H_5$, $CONH_2$, $COOCH_3$ or $COOC_2H_5$; R is H, or a linear, saturated alkyl of $C_pH_{2p+1}$, wherein: p is an integer with the proviso of $1 \leq p \leq 18$; and X is H, Na or K;

the chromophoric group (4) is:

(4)

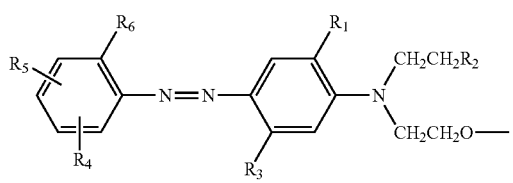

in formula (4): $R_1$ is H, $OCH_3$ or $OCH_2CH_3$; $R_2$ is H, OH, $OCH_3$, Cl, CN or $OCOCH_3$; $R_3$ is H, $NHCOCH_3$, $NHCOC_2H_5$,

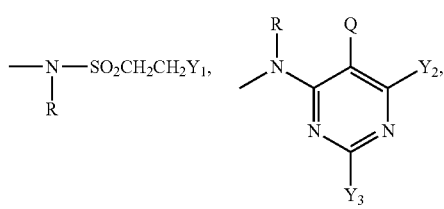

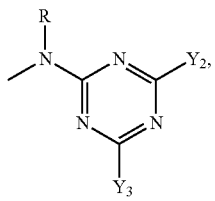

NHCOCY$_4$=CHY$_5$ or NHCOCHY$_4$CH$_2$Y$_6$; R$_4$ is H, Cl, Br, CN, NO$_2$, SO$_3$Na, SO$_2$NHR, CONHR or COOR; R$_5$ is H, Cl, Br, CN, NO$_2$, SO$_2$NHR, CONHR, SO$_2$CH$_2$CH$_2$Y$_1$, SO$_2$NHCH$_2$CH$_2$Y$_1$,

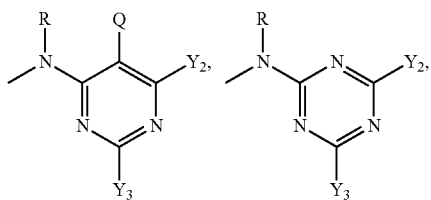

NHCOCY$_4$=CHY$_5$ or NHCOCHY$_4$CH$_2$Y$_6$; Y$_1$ is Cl, OSO$_3$X or N(CH$_3$)CH$_2$CH$_2$SO$_3$X; Y$_2$ is Cl or F; Y$_3$ is Cl, F, OR, NHCH$_2$SO$_3$X, N(R)$_2$, N(CH$_2$OH)$_2$, N(C$_2$H$_4$OH)$_2$,

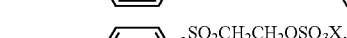
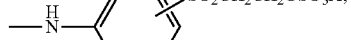
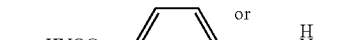

Y$_4$ is H or Br; Y$_5$ is H, Cl or Br; Y$_6$ is Br or OSO$_3$X; Q is Cl or CH$_3$; R$_6$ is H, Cl, Br, CN, NO$_2$, CH$_3$, OCH$_3$, OC$_2$H$_5$, CONH$_2$, COOCH$_3$ or COOC$_2$H$_5$; R is H, or a linear, saturated alkyl of C$_p$H$_{2p+1}$, wherein: p is an integer with the proviso of 1≤p≤18; and X is H, Na or K;

the chromophoric group (5) is:

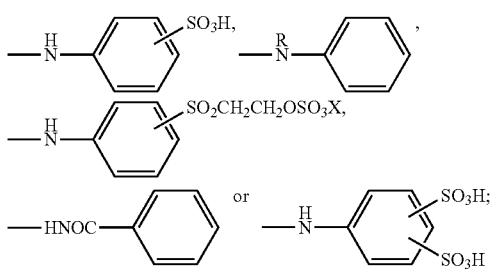

in formula (5): R$_1$ is H, OCH$_3$ or OCH$_2$CH$_3$; R$_2$ is H, OH, OCH$_3$, Cl, CN or OCOCH$_3$; R$_3$ is H, OH, OCH$_3$, Cl, CN or OCOCH$_3$; R$_4$ is H, Cl, Br, CN, NO$_2$, SO$_3$Na, SO$_2$NHR, CONHR or COOR; R$_5$ is H, Cl, Br, CN, NO$_2$, SO$_2$NHR, CONHR, SO$_2$CH$_2$CH$_2$Y$_1$, SO$_2$NHCH$_2$CH$_2$Y$_1$,

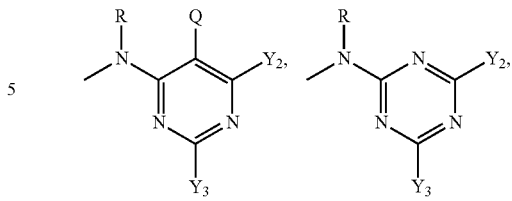

NHCOCY$_4$=CHY$_5$ or NHCOCHY$_4$CH$_2$Y$_6$; Y$_1$ is Cl, OSO$_3$X or N(CH$_3$)CH$_2$CH$_2$SO$_3$X; Y$_2$ is Cl or F; Y$_3$ is Cl, F, OR, NHCH$_2$SO$_3$X, N(R)$_2$, N(CH$_2$OH)$_2$, N(C$_2$H$_4$OH)$_2$,

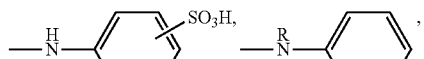

Y$_4$ is H or Br; Y$_5$ is H, Cl or Br; Y$_6$ is Br or OSO$_3$X; Q is Cl or CH$_3$; R$_6$ is H, Cl, Br, CN, NO$_2$, CH$_3$, OCH$_3$, OC$_2$H$_5$, CONH$_2$, COOCH$_3$ or COOC$_2$H$_5$; R is H, or a linear, saturated alkyl of C$_p$H$_{2p+1}$, wherein: p is an integer with the proviso of 1≤p≤18; and X is H, Na or K;

the chromophoric group (6) is:

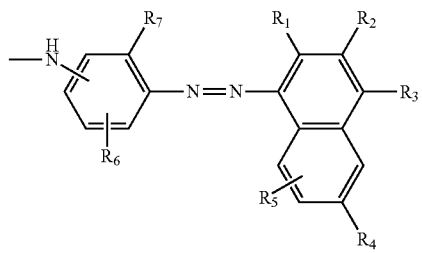

(6)

in formula (6): R$_1$ is H, OH or NH$_2$; R$_2$ is H, SO$_3$Na or SO$_2$NHR; R$_3$ is H, Cl, CN, SO$_2$NHR, CONHR, COOR, NHR, NHCOR, SO$_2$CH$_2$CH$_2$Y$_1$, SO$_2$NHCH$_2$CH$_2$Y$_1$,

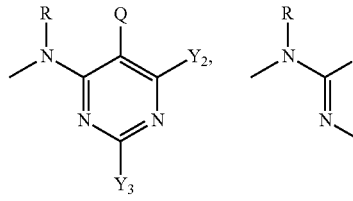

NHCOCY$_4$=CHY$_5$ or NHCOCHY$_4$CH$_2$Y$_6$; Y$_1$ is Cl, OSO$_3$X or N(CH$_3$)CH$_2$CH$_2$SO$_3$X; Y$_2$ is Cl or F; Y$_3$ is Cl, F, OR, NHCH$_2$SO$_3$X, N(R)$_2$, N(CH$_2$OH)$_2$, N(C$_2$H$_4$OH)$_2$,

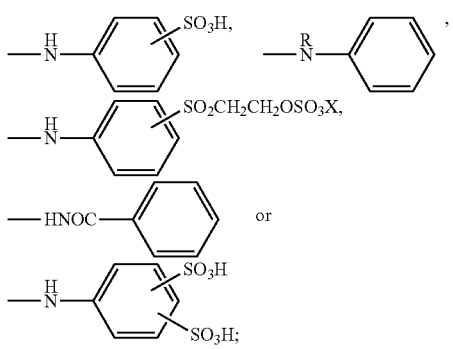

$Y_4$ is H or Br; $Y_5$ is H, Cl or Br; $Y_6$ is Br or $OSO_3X$; Q is Cl or $CH_3$; $R_4$ is H, $SO_3Na$, $SO_2NHR$, NHR or NHCOR; $R_5$ is H, $SO_2NHR$, NHR or NHCOR; $R_6$ is H, Cl, NHR, CN, $SO_3Na$, $SO_2NHR$, CONHR, COOR or NHCOR; $R_7$ is H, Cl, $CH_3$, $OCH_3$, $OC_2H_5$, OH, CN, $CONH_2$, $COOCH_3$ or $COOC_2H_5$; R is H, or a linear, saturated alkyl of $C_pH_{2p+1}$, wherein: p is an integer with the proviso of $1 \leq p \leq 18$; and X is H, Na or K;

the chromophoric group (7) is:

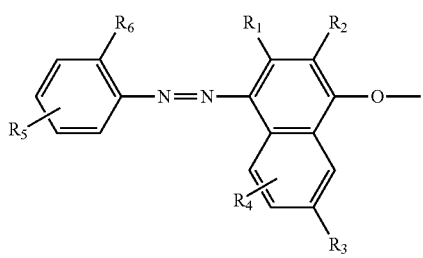

(7)

in formula (7): $R_1$ is H, $OCH_3$ or NHR; $R_2$ is H, $SO_3Na$ or $SO_2NHR$; $R_3$ is H, Cl, CN, $SO_3Na$, $SO_2NHR$, CONHR, COOR, NHR or NHCOR; $R_4$ is H, $SO_2NHR$, NHR or NHCOR; $R_5$ is H, $SO_3Na$, $SO_2NHR$, NHR, CONHR, COOR, NHCOR, $SO_2CH_2CH_2Y_1$, $SO_2NHCH_2CH_2Y_1$,

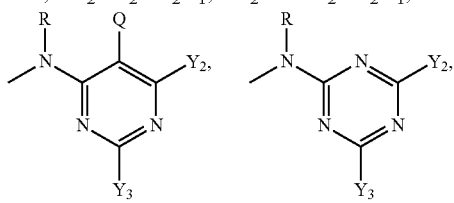

$NHCOCY_4$=$CHY_5$ or $NHCOCHY_4CH_2Y_6$; $Y_1$ is Cl, $OSO_3X$ or $N(CH_3)CH_2CH_2SO_3X$; $Y_2$ is Cl or F; $Y_3$ is Cl, F, OR, $NHCH_2SO_3X$, $N(R)_2$, $N(CH_2OH)_2$, $N(C_2H_4OH)_2$,

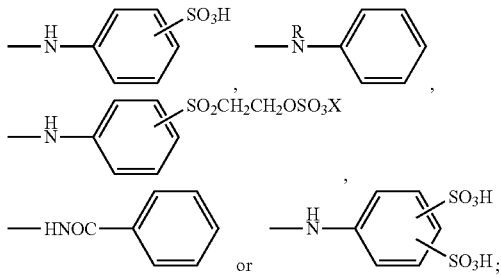

$Y_4$ is H or Br; $Y_5$ is H, Cl or Br; $Y_6$ is Br or $OSO_3X$; Q is Cl or $CH_3$; $R_6$ is H, Cl, $CH_3$, $OCH_3$, $OC_2H_5$, OH, CN, $CONH_2$, $COOCH_3$ or $COOC_2H_5$; R is H, or a linear, saturated alkyl of $C_pH_{2p+1}$, wherein: p is an integer with the proviso of $1 \leq p \leq 18$; and X is H, Na or K;

the chromophoric group (8) is:

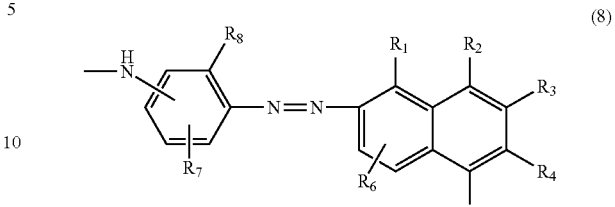

(8)

in formula (8): $R_1$ is H, OH or $NH_2$; $R_2$ is H, NHR, NHCOR,

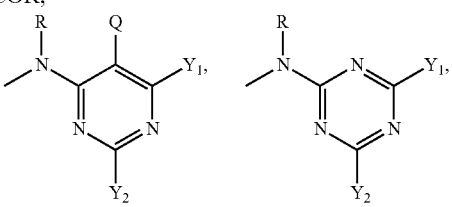

$NHCOCY_3$=$CHY_4$ or $NHCOCHY_4CH_2Y_5$; $Y_1$ is Cl or F; Q is Cl or $CH_3$; $Y_2$ is Cl, F, OR, $NHCH_2SO_3X$, $N(R)_2$, $N(CH_2OH)_2$, $N(C_2H_4OH)_2$,

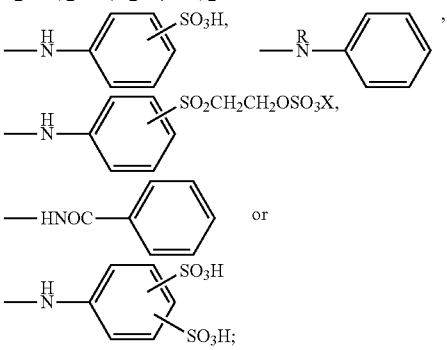

$Y_3$ is H or Br; $Y_4$ is H, Cl or Br; $Y_5$ is Br or $OSO_3X$; $R_3$ is H, NHR, $SO_3Na$, $SO_2NHR$, NHCOR or

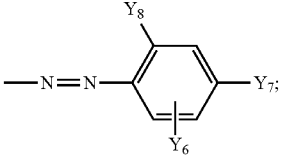

$Y_6$ is H, Cl, NHR, OR, CN, $SO_3Na$, $SO_2NHR$, CONHR, COOR or NHCOR; $Y_7$ is H, Cl, OR, CN, $NO_2$, $SO_3Na$, $SO_2NHR$, $SO_2CH_2CH_2Y_9$, $SO_2NHCH_2CH_2Y_9$, CONHR or COOR; $Y_8$ is H, OH, Cl, $CH_3$, $OCH_3$, $OC_2H_5$, CN, $CONH_2$, $COOCH_3$ or $COOC_2H_5$; $Y_9$ is Cl, $OSO_3X$ or $N(CH_3)CH_2CH_2SO_3X$; $R_4$ is H, NHR, $SO_3Na$, $SO_2NHR$ or NHCOR; $R_5$ is H, NHR, $SO_3Na$, $SO_2NHR$ or NHCOR; $R_6$ is H, $SO_3Na$ or $SO_2NHR$; $R_7$ is H, Cl, NHR, CN, $SO_3Na$, $SO_2NHR$, CONHR or COOR; $R_8$ is H, Cl, $CH_3$, $OCH_3$, $OC_2H_5$, OH, CN, $CONH_2$, $COOCH_3$ or $COOC_2H_5$; R is H, or a linear, saturated alkyl of $C_pH_{2p+1}$, wherein: p is an integer with the proviso of $1 \leq p \leq 18$; and X is H, Na or K;

the chromophoric group (9) is:

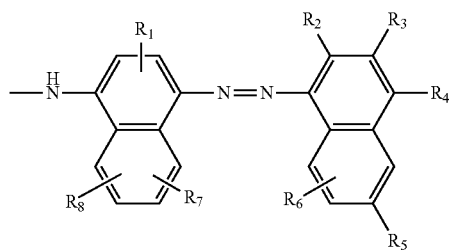
(9)

in formula (9): $R_1$ is H, Cl, $CH_3$, $OCH_3$, $OC_2H_5$, OH, CN, $CONH_2$, $COOCH_3$ or $COOC_2H_5$; $R_2$ is H or OH; $R_3$ is H, NHR or NHCOR; $R_4$ is H, NHR, $SO_3Na$, $SO_2NHR$, NHCOR,

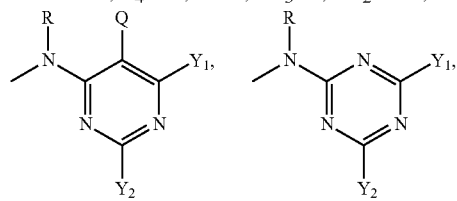

$NHCOCY_3=CHY_3$, $NHCOCHY_4CH_2Y_5$ or

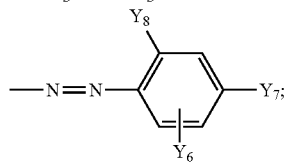

$Y_1$ is Cl or F; Q is Cl or $CH_3$; $Y_2$ is Cl, F, OR, $NHCH_2SO_3X$, $N(R)_2$, $N(CH_2OH)_2$, $N(C_2H_4OH)_2$,

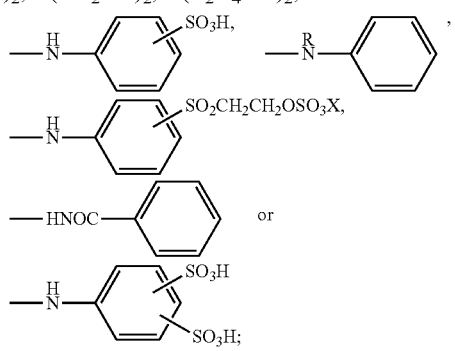

$Y_3$ is H or Br; $Y_4$ is H, Cl or Br; $Y_5$ is Br or $OSO_3X$; $Y_6$ is H, Cl, NHR, OR, CN, $SO_3Na$, $SO_2NHR$, CONHR, COOR or NHCOR; $Y_7$ is H, Cl, OR, CN, $NO_2$, $SO_3Na$, $SO_2NHR$, $SO_2CH_2CH_2Y_9$, $SO_2NHCH_2CH_2Y_9$, CONHR or COOR; $Y_8$ is H, OH, Cl, $CH_3$, $OCH_3$, $OC_2H_5$, CN, $CONH_2$, $COOCH_3$ or $COOC_2H_5$; $Y_9$ is Cl, $OSO_3X$ or $N(CH_3)CH_2CH_2SO_3X$; $R_5$ is H, NHR, $SO_3Na$, $SO_2NHR$ or NHCOR; $R_6$ is H, $SO_3Na$ or $SO_2NHR$; $R_7$ is H, Cl, R, NHR, CN, $SO_3Na$, $SO_2NHR$ or COOR; $R_8$ is H, Cl, $CH_3$, $OCH_3$, $OC_2H_5$, OH, CN, $CONH_2$, $COOCH_3$ or $COOC_2H_5$; R is H, or a linear, saturated alkyl of $C_pH_{2p+1}$, wherein: p is an integer with the proviso of $1 \le p \le 18$; and X is H, Na or K;

the chromophoric group (10) is:

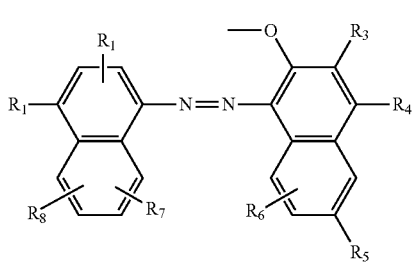
(10)

in formula (10): $R_1$, $R_4$ is H, Cl, $CH_3$, $OCH_3$, $OC_2H_5$, OH, CN, $CONH_2$, $COOCH_3$, $COOC_2H_5$, NHCOR,

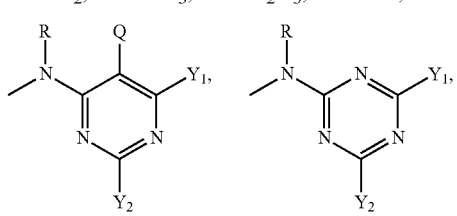

$NHCOCY_3=CHY_3$, $NHCOCHY_4CH_2Y_5$ or

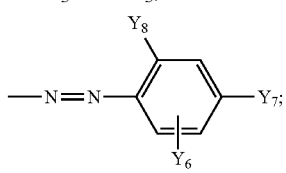

$Y_1$ is Cl or F; Q is Cl or $CH_3$; $Y_2$ is Cl, F, OR, $NHCH_2SO_3X$, $N(R)_2$, $N(CH_2OH)_2$, $N(C_2H_4OH)_2$,

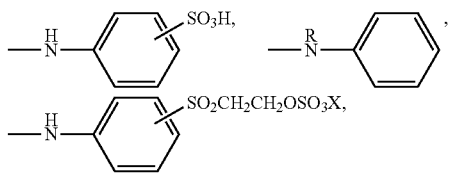

$Y_3$ is H or Br; $Y_4$ is H, Cl or Br; $Y_5$ is Br or $OSO_3X$; $Y_6$ is H, Cl, NHR, OR, CN, $SO_3Na$, $SO_2NHR$, CONHR, COOR or NHCOR; $Y_7$ is H, Cl, OR, CN, $NO_2$, $SO_3Na$, $SO_2NHR$, $SO_2CH_2CH_2Y_9$, $SO_2NHCH_2CH_2Y_9$, CONHR or COOR; $Y_8$ is H, OH, Cl, $CH_3$, $OCH_3$, $OC_2H_5$, CN, $CONH_2$, $COOCH_3$, $COOC_2H_5$; $Y_9$ is Cl, $OSO_3X$ or $N(CH_3)CH_2CH_2SO_3X$; $R_2$ is H, NHR, $SO_3Na$, $SO_2NHR$ or NHCOR; $R_3$ is H, $SO_3Na$ or $SO_2NHR$; $R_5$ is H, NHR, $SO_3Na$ or $SO_2NHR$; $R_6$ is H, NHR, $SO_3Na$, $SO_2NHR$ or NHCOR; $R_7$ is H, $SO_3Na$ or $SO_2NHR$; $R_8$ is H, Cl, NHR, CN, $SO_3Na$, $SO_2NHR$ or COOR; R is H, or a linear, saturated alkyl of $C_pH_{2p+1}$, wherein: p is an integer with the proviso of $1 \le p \le 18$; and X is H, Na or K;

the chromophoric group (11) is:

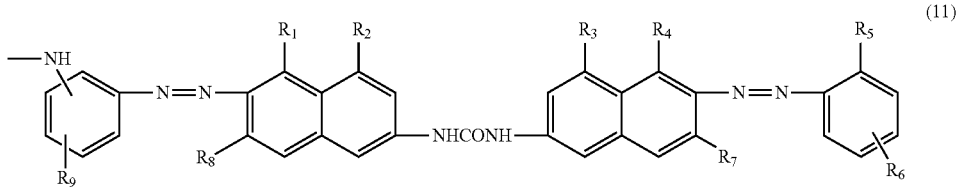

in formula (11): $R_1$ is OH or $NH_2$; $R_2$, $R_3$ is H, $SO_3Na$, $SO_2NHR$, NHCOR,

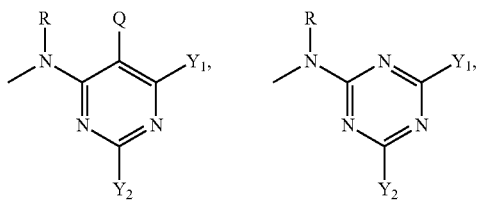

$NHCOCY_3$=$CHY_3$, $NHCOCHY_4CH_2Y_5$ or

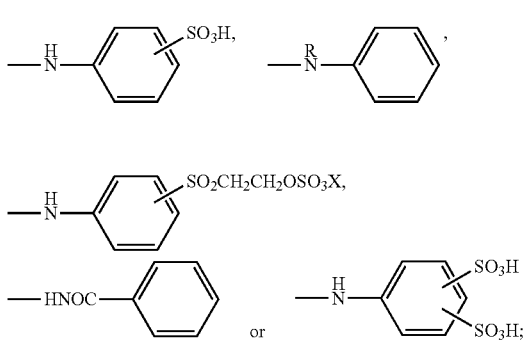

$Y_1$ is Cl or F; Q is Cl or $CH_3$; $Y_2$ is Cl, F, OR, $NHCH_2SO_3X$, $N(R)_2$, $N(CH_2OH)_2$, $N(C_2H_4OH)_2$,

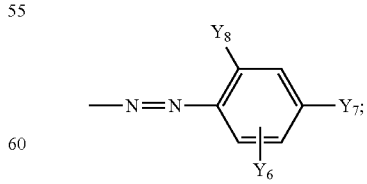

$Y_3$ is H or Br; $Y_4$ is H, Cl or Br; $Y_5$ is Br or $OSO_3X$; $Y_6$ is H, Cl, NHR, OR, CN, $SO_3Na$, $SO_2NHR$, CONHR, COOR or NHCOR; $Y_7$ is H, Cl, OR, CN, $NO_2$, $SO_3Na$, $SO_2NHR$, $SO_2CH_2CH_2Y_9$, $SO_2NHCH_2CH_2Y_9$, CONHR or COOR; $Y_8$ is H, OH, Cl, $CH_3$, $OCH_3$, $OC_2H_5$, CN, $CONH_2$, $COOCH_3$ or $COOC_2H_5$; $Y_9$ is Cl, $OSO_3X$ or $N(CH_3)CH_2CH_2SO_3X$; $R_4$ is H, OH or $NH_2$; $R_5$ is H, NHR, $SO_3Na$, $SO_2NHR$; $R_6$ is H, NHR, $SO_3Na$, $SO_2NHR$ or NHCOR; $R_7$ is H, Cl, NHR, CN, $SO_3Na$, $SO_2NHR$ or COOR; $R_8$ is H, Cl, NHR, CN, $SO_3Na$, $SO_2NHR$ or COOR; $R_9$ is H, Cl, $CH_3$, $OCH_3$, $OC_2H_5$, OH, CN, $CONH_2$, $COOCH_3$ or $COOC_2H_5$; R is H, or a linear, saturated alkyl of $C_pH_{2p+1}$, wherein: p is an integer with the proviso of $1 \leq p \leq 18$; and X is H, Na or K;

the chromophoric group (12) is:

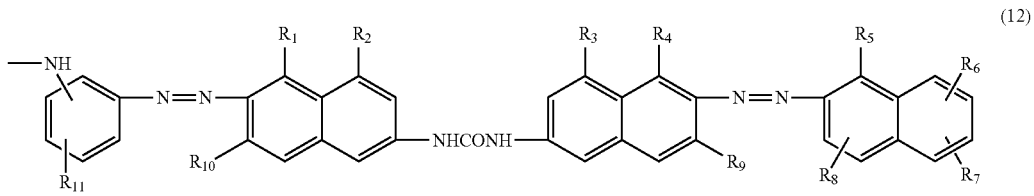

in formula (12): $R_1$ is OH or $NH_2$; $R_2$, $R_3$ is H, $SO_3Na$, $SO_2NHR$, NHCOR,

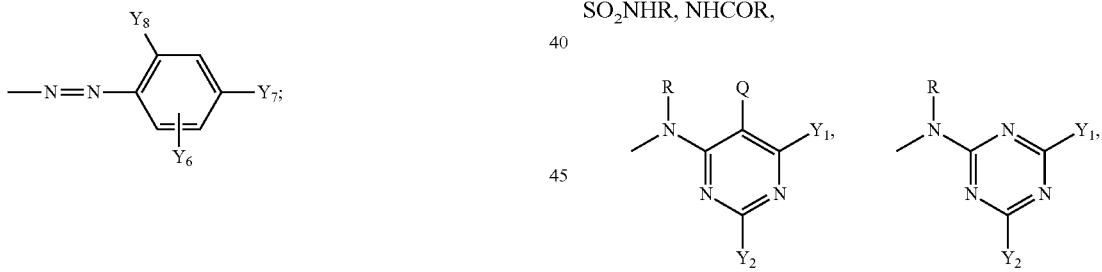

$NHCOCY_3$=$CHY_3$, $NHCOCHY_4CH_2Y_5$ or

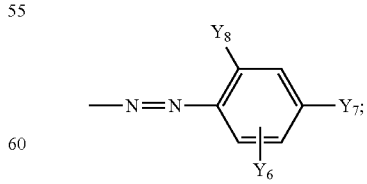

$Y_1$ is Cl or F; Q is Cl or $CH_3$; $Y_2$ is Cl, F, OR, $NHCH_2SO_3X$, $N(R)_2$, $N(CH_2OH)_2$, $N(C_2H_4OH)_2$,

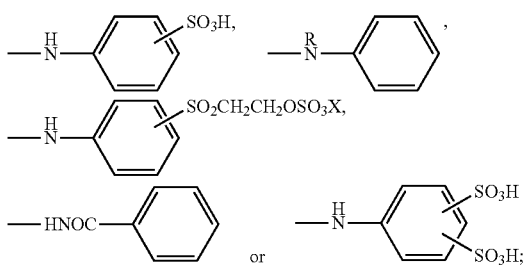

$Y_3$ is H or Br; $Y_4$ is H, Cl or Br; $Y_5$ is Br or $OSO_3X$; $Y_6$ is H, Cl, NHR, OR, CN, $SO_3Na$, $SO_2NHR$, CONHR, COOR or NHCOR; $Y_7$ is H, Cl, OR, CN, $NO_2$, $SO_3Na$, $SO_2NHR$, $SO_2CH_2CH_2Y_9$, $SO_2NHCH_2CH_2Y_9$, CONHR or COOR; $Y_8$ is H, OH, Cl, $CH_3$, $OCH_3$, $OC_2H_5$, CN, $CONH_2$, $COOCH_3$ or $COOC_2H_5$; $Y_9$ is Cl, $OSO_3X$ or $N(CH_3)CH_2CH_2SO_3X$; $R_4$ is H, OH or $NH_2$; $R_5$ is H, NHR, $SO_3Na$ or $SO_2NHR$; $R_6$ is H, NHR, $SO_3Na$, $SO_2NHR$ or NHCOR; $R_7$ is H, NHR, $SO_3Na$ or $SO_2NHR$; $R_8$ is H, NHR, $SO_3Na$, $SO_2NHR$ or NHCOR; $R_9$ is H, Cl, NHR, CN, $SO_3Na$, $SO_2NHR$ or COOR; $R_{10}$ is H, Cl, NHR, CN, $SO_3Na$, $SO_2NHR$ or COOR; $R_{11}$ is H, Cl, $CH_3$, $OCH_3$, $OC_2H_5$, OH, CN, $CONH_2$, $COOCH_3$ or $COOC_2H_5$; R is H, or a linear, saturated alkyl of $C_pH_{2p+1}$, wherein: p is an integer with the proviso of $1 \le p \le 18$; and X is H, Na or K;

the chromophoric group (13) is:

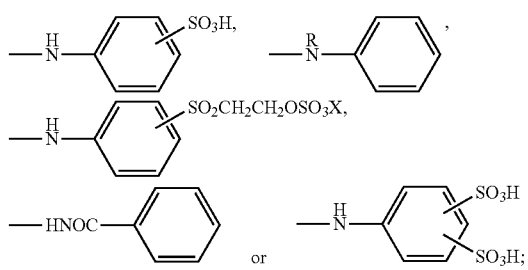

in formula (13): $R_1$ is OH or $NH_2$; $R_2$, $R_3$ is H, $SO_3Na$, $SO_2NHR$, NHCOR,

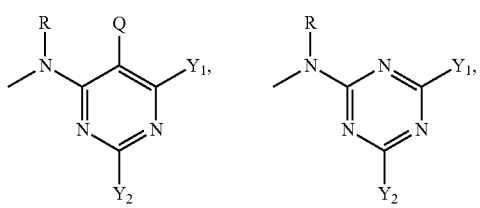

$NHCOCY_3$=$CHY_3$, $NHCOCHY_4CH_2Y_5$ or

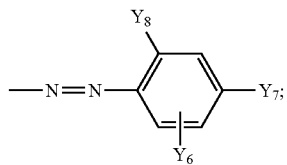

$Y_1$ is Cl or F; Q is Cl or $CH_3$; $Y_2$ is Cl, F, OR, $NHCH_2SO_3X$, $N(R)_2$, $N(CH_2OH)_2$, $N(C_2H_4OH)_2$,

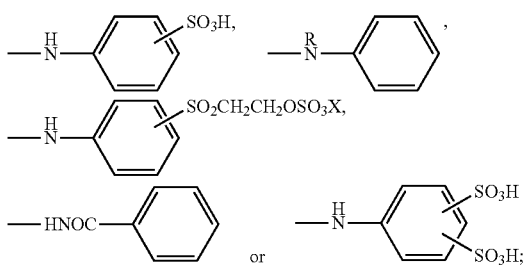

$Y_3$ is H or Br; $Y_4$ is H, Cl or Br; $Y_5$ is Br or $OSO_3X$; $Y_6$ is H, Cl, NHR, OR, CN, $SO_3Na$, $SO_2NHR$, CONHR, COOR or NHCOR; $Y_7$ is H, Cl, OR, CN, $NO_2$, $SO_3Na$, $SO_2NHR$, $SO_2CH_2CH_2Y_9$, $SO_2NHCH_2CH_2Y_9$, CONHR or COOR; $Y_8$ is H, OH, Cl, $CH_3$, $OCH_3$, $OC_2H_5$, CN, $CONH_2$, $COOCH_3$ or $COOC_2H_5$; $Y_9$ is Cl, $OSO_3X$ or $N(CH_3)CH_2CH_2SO_3X$; $R_4$ is H, OH or $NH_2$; $R_5$ is H, NHR, $SO_3Na$ or $SO_2NHR$; $R_6$ is H, NHR, $SO_3Na$, $SO_2NHR$ or NHCOR; $R_7$ is H, NHR, $SO_3Na$ or $SO_2NHR$; $R_8$ is H, NHR, $SO_3Na$, $SO_2NHR$ or NHCOR; $R_9$ is H, Cl, NHR, CN, $SO_3Na$, $SO_2NHR$ or COOR; $R_{10}$ is H, Cl, NHR, CN, $SO_3Na$, $SO_2NHR$ or COOR; $R_{11}$ is H, Cl, $CH_3$, $OCH_3$, $OC_2H_5$, OH, NHR, CN, $CONH_2$, $COOCH_3$ or $COOC_2H_5$; R is H, or a linear, saturated alkyl of $C_pH_{2p+1}$, wherein: p is an integer with the proviso of $1 \le p \le 18$; and X is H, Na or K;

the chromophoric group (14) is:

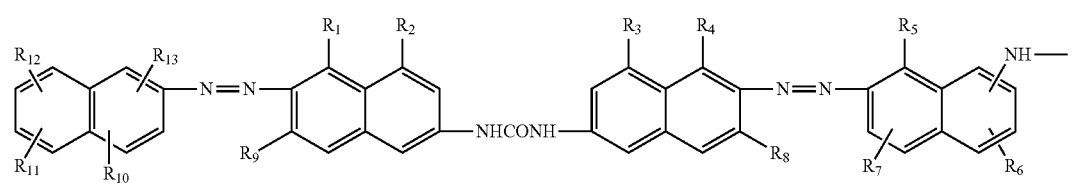

in formula (14): $R_1$ is OH or $NH_2$; $R_2$, $R_3$ is H, $SO_3Na$, $SO_2NHR$, NHCOR,

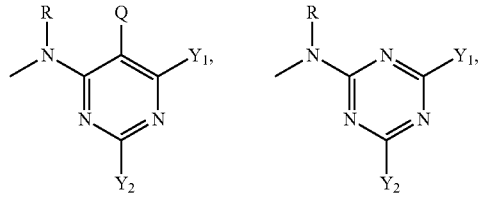

$NHCOCY_3$=$CHY_3$, $NHCOCHY_4CH_2Y_5$ or

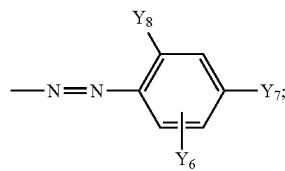

$Y_1$ is Cl or F; Q is Cl or $CH_3$; $Y_2$ is Cl, F, OR, $NHCH_2SO_3X$, $N(R)_2$, $N(CH_2OH)_2$, $N(C_2H_4OH)_2$,

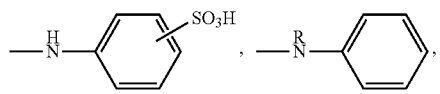

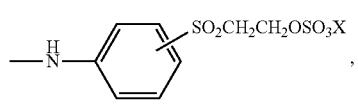

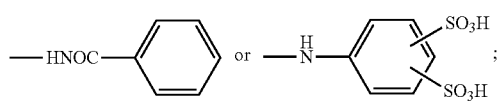

$Y_3$ is H or Br; $Y_4$ is H, Cl or Br; $Y_5$ is Br or $OSO_3X$; $Y_6$ is H, Cl, NHR, OR, CN, $SO_3Na$, $SO_2NHR$, CONHR, COOR or NHCOR; $Y_7$ is H, Cl, OR, CN, $NO_2$, $SO_3Na$, $SO_2NHR$, $SO_2CH_2CH_2Y_9$, $SO_2NHCH_2CH_2Y_9$, CONHR or COOR; $Y_8$ is H, OH, Cl, $CH_3$, $OCH_3$, $OC_2H_5$, CN, $CONH_2$, $COOCH_3$ or $COOC_2H_5$; $Y_9$ is Cl, $OSO_3X$ or $N(CH_3)CH_2CH_2SO_3X$; $R_4$ is H, OH or $NH_2$; $R_5$ is H, NHR, $SO_3Na$ or $SO_2NHR$; $R_6$ is H, NHR, $SO_3Na$, $SO_2NHR$ or NHCOR; $R_7$ is H, NHR, $SO_3Na$ or $SO_2NHR$; $R_8$ is H, NHR, $SO_3Na$, $SO_2NHR$ or NHCOR; $R_9$ is H, Cl, NHR, CN, $SO_3Na$, $SO_2NHR$ or COOR; $R_{10}$ is H, Cl, NHR, CN, $SO_3Na$, $SO_2NHR$ or COOR; $R_{11}$ is H, Cl, $CH_3$, $OCH_3$, $OC_2H_5$, OH, NHR, CN, $CONH_2$, $COOCH_3$ or $COOC_2H_5$; $R_{12}$ is H, Cl, $CH_3$, $OCH_3$, $OC_2H_5$, OH, NHR, CN, $CONH_2$, $COOCH_3$ or $COOC_2H_5$; $R_{13}$ is H, Cl, $CH_3$, $OCH_3$, $OC_2H_5$, OH, NHR, CN, $CONH_2$, $COOCH_3$ or $COOC_2H_5$; R is H, or a linear, saturated alkyl of $C_pH_{2p+1}$, wherein: p is an integer with the proviso of $1 \leq p \leq 18$; and X is H, Na or K;

the chromophoric group (15) is:

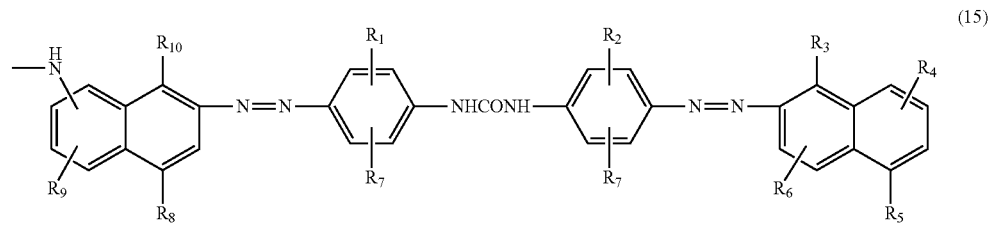

in formula (15): $R_1$ is H, $CH_3$, Cl, OR, CN, $NO_2$, $SO_3Na$ or $SO_2NHR$; $R_2$ is H, $CH_3$, Cl, OR, CN, $NO_2$, $SO_3Na$ or $SO_2NHR$; $R_3$ is H, NHR or NHCOR; $R_4$, $R_9$ is H, $CH_3$, Cl, OR, CN, $NO_2$, $SO_3Na$, $SO_2NHR$, NHR,

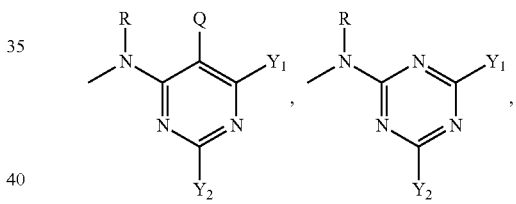

$NHCOCY_3$=$CHY_3$, $NHCOCHY_4CH_2Y_5$ or

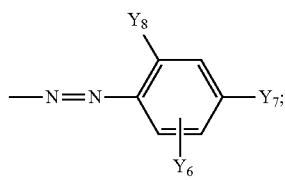

$Y_1$ is Cl or F; Q is Cl or $CH_3$; $Y_2$ is Cl, F, OR, $NHCH_2SO_3X$, $N(R)_2$, $N(CH_2OH)_2$, $N(C_2H_4OH)_2$,

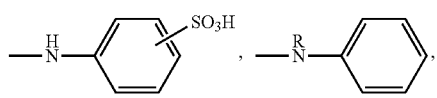

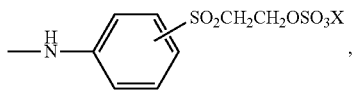

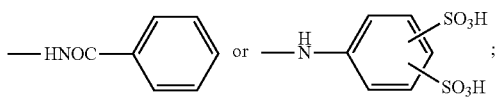

$Y_3$ is H or Br; $Y_4$ is H, Cl or Br; $Y_5$ is Br or $OSO_3X$; $Y_6$ is H, Cl, NHR, OR, CN, $SO_3Na$, $SO_2NHR$, CONHR, COOR or NHCOR; $Y_7$ is H, Cl, OR, CN, $NO_2$, $SO_3Na$, $SO_2NHR$, $SO_2CH_2CH_2Y_9$, $SO_2NHCH_2CH_2Y_9$, CONHR or COOR; $Y_8$ is H, OH, Cl, $CH_3$, $OCH_3$, $OC_2H_5$, CN, $CONH_2$, $COOCH_3$ or $COOC_2H_5$; $Y_9$ is Cl, $OSO_3X$ or $N(CH_3)CH_2CH_2SO_3X$; $R_5$ is H, $SO_3Na$, $SO_2NHR$ or NHCOR; $R_6$ is H, $SO_3Na$ or $SO_2NHR$; $R_7$ is H, $SO_3Na$ or $SO_2NHR$; $R_8$ is H, $SO_3Na$, $SO_2NHR$ or NHCOR; $R_{10}$ is H, OH, $NH_2$, NHR, CN, $SO_3Na$, $SO_2NHR$ or COOR; R is H, or a linear, saturated alkyl of $C_pH_{2p+1}$, wherein: p is an integer with the proviso of $1 \leq p \leq 18$; and X is H, Na or K;

the chromophoric group (16) is:

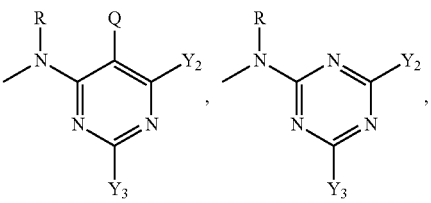

$NHCOCY_4{=}CHY_5$ or $NHCOCHY_4CH_2Y_6$; $Y_1$ is Cl, $OSO_3X$ or $N(CH_3)CH_2CH_2SO_3X$; Q is Cl or $CH_3$; $Y_2$ is Cl or F; $Y_3$ is Cl, F, OR, $NHCH_2SO_3X$, $N(R)_2$, $N(CH_2OH)_2$, $N(C_2H_4OH)_2$,

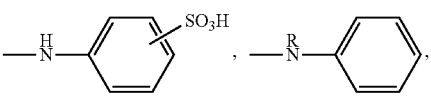

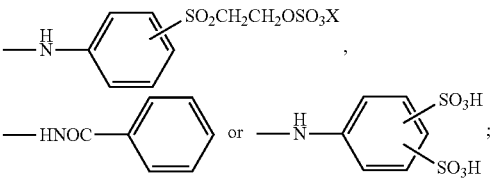

$Y_4$ is H or Br; $Y_5$ is H, Cl or Br; $Y_6$ is Br or $OSO_3X$; $R_5$ is H, $SO_3Na$, $SO_2NHR$ or NHCOR; $R_6$ is H, $SO_3Na$ or $SO_2NHR$; $R_7$ is H, $SO_3Na$ or $SO_2NHR$; $R_8$ is H, $SO_3Na$, $SO_2NHR$ or NHCOR; $R_{10}$ is H, OH, $NH_2$, NHR, CN, $SO_3Na$, $SO_2NHR$ or COOR; R is H, or a linear, saturated alkyl of $C_pH_{2p+1}$, wherein: p is an integer with the proviso of $1 \leq p \leq 18$; and X is H, Na or K;

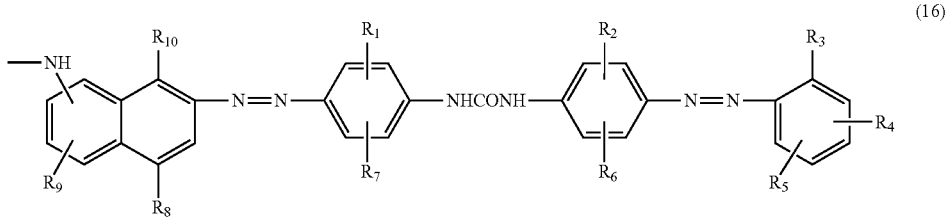

(16)

in formula (16): $R_1$ is H, $CH_3$, Cl, OR, CN, $NO_2$, $SO_3Na$ or $SO_2NHR$; $R_2$ is H, $CH_3$, Cl, OR, CN, $NO_2$, $SO_3Na$ or $SO_2NHR$; $R_3$ is H, NHR or NHCOR; $R_4$, $R_9$ is H, NHR, $SO_3Na$, $SO_2NHR$, NHCOR, $SO_2CH_2CH_2Y_1$, $SO_2NHCH_2CH_2Y_1$, the chromophoric group (17) is:

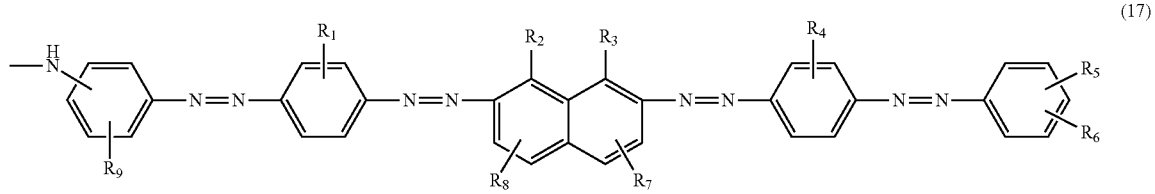

in formula (17): $R_1$ is H, $CH_3$, Cl, OR, CN, $NO_2$, $SO_3Na$ or $SO_2NHR$; $R_2$ is $NH_2$, OH or OR; $R_3$ is $NH_2$, OH or OR; $R_4$ is H, $CH_3$, Cl, OR, CN, $NO_2$, $SO_3Na$ or $SO_2NHR$; $R_5$, $R_9$ is H, NHR, $SO_3Na$, $SO_2NHR$, NHCOR, $SO_2CH_2CH_2Y_1$, $SO_2NHCH_2CH_2Y_1$,

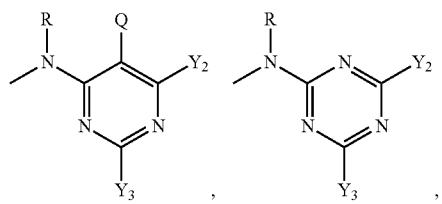

$NHCOCY_4=CHY_5$ or $NHCOCHY_4CH_2Y_6$; $Y_1$ is Cl, $OSO_3X$ or $N(CH_3)CH_2CH_2SO_3X$; Q is Cl or $CH_3$; $Y_2$ is Cl or F; $Y_3$ is Cl, F, OR, $NHCH_2SO_3X$, $N(R)_2$, $N(CH_2OH)_2$, $N(C_2H_4OH)_2$,

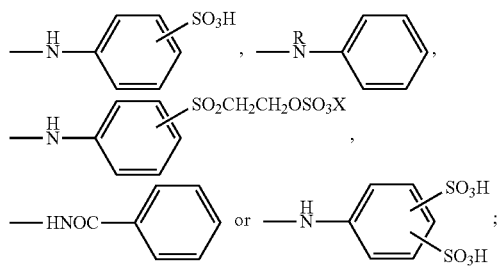

$Y_4$ is H or Br; $Y_5$ is H, Cl or Br; $Y_6$ is Br or $OSO_3X$; $R_6$ is H, $SO_3Na$, $SO_2NHR$ or NHCOR; $R_7$ is H, $SO_3Na$ or $SO_2NHR$; $R_8$ is H, $SO_3Na$ or $SO_2NHR$; R is H, or a linear, saturated alkyl of $C_pH_{2p+1}$, wherein: p is an integer with the proviso of $1 \leq p \leq 18$; and X is H, Na or K;

the chromophoric group (18) is:

in formula (18): $R_1$ is H, $CH_3$, Cl, OR, CN, $NO_2$, $SO_3Na$ or $SO_2NHR$; $R_2$ is H, $CH_3$, Cl, OR, CN, $NO_2$, $SO_3Na$ or $SO_2NHR$; $R_3$ is $NH_2$, OH or OR; $R_4$ is $NH_2$, OH or OR; $R_5$ is H, $CH_3$, Cl, OR, CN, $NO_2$, $SO_3Na$, $SO_2NHR$, NHR,

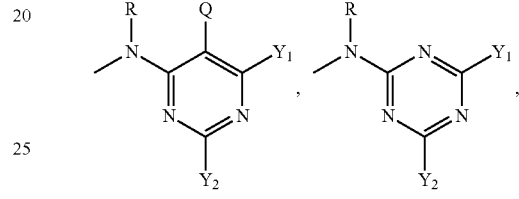

$NHCOCY_3=CHY_3$, $NHCOCHY_4CH_2Y_5$ or

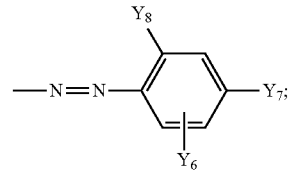

$Y_1$ is Cl or F; Q is Cl or $CH_3$; $Y_2$ is Cl, F, OR, $NHCH_2SO_3X$, $N(R)_2$, $N(CH_2OH)_2$, $N(C_2H_4OH)_2$,

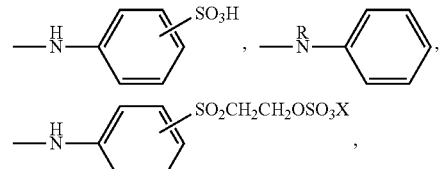

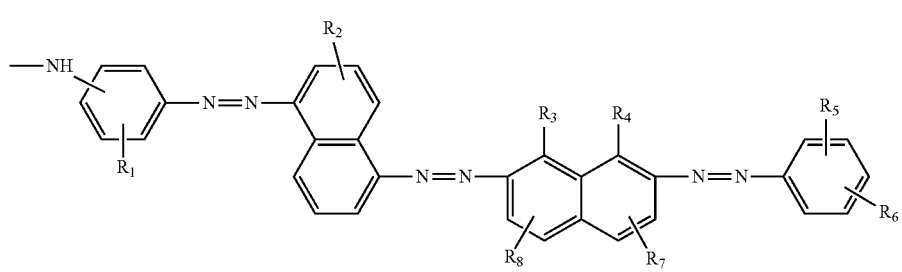

-continued

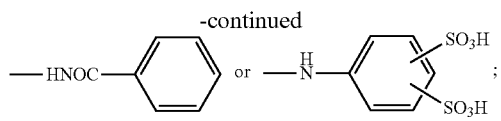;

$Y_3$ is H or Br; $Y_4$ is H, Cl or Br; $Y_5$ is Br or $OSO_3X$; $Y_6$ is H, Cl, NHR, OR, CN, $SO_3Na$, $SO_2NHR$, CONHR, COOR or NHCOR; $Y_7$ is H, Cl, OR, CN, $NO_2$, $SO_3Na$, $SO_2NHR$, $SO_2CH_2CH_2Y_9$, $SO_2NHCH_2CH_2Y_9$, CONHR or COOR; $Y_8$ is H, OH, Cl, $CH_3$, $OCH_3$, $OC_2H_5$, CN, $CONH_2$, $COOCH_3$ or $COOC_2H_5$; $Y_9$ is Cl, $OSO_3X$ or $N(CH_3)CH_2CH_2SO_3X$; $R_6$ is H, $SO_3Na$, $SO_2NHR$ or NHCOR; $R_7$ is H, $SO_3Na$ or $SO_2NHR$; $R_8$ is H, $SO_3Na$ or $SO_2NHR$; R is H, or a linear, saturated alkyl of $C_pH_{2p+1}$, wherein: p is an integer with the proviso of $1 \leq p \leq 18$; and X is H, Na or K;

the chromophoric group (19) is:

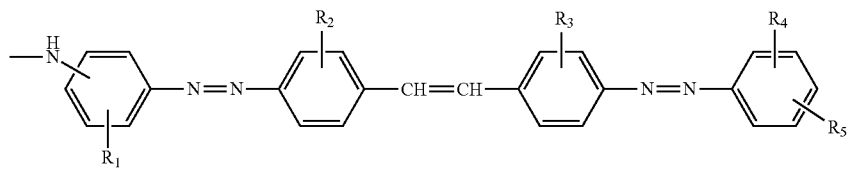

in formula (19): $R_1$ is H, $CH_3$, Cl, OR, CN, $NO_2$, $SO_3Na$ or $SO_2NHR$; $R_2$ is H, $CH_3$, Cl, OR, CN, $NO_2$, $SO_3Na$ or $SO_2NHR$; $R_3$ is H, $CH_3$, Cl, OR, CN, $NO_2$, $SO_3Na$ or $SO_2NHR$; $R_4$ is $NH_2$, OH or OR; $R_5$ is H, $CH_3$, Cl, OR, CN, $NO_2$, $SO_3Na$, $SO_2NHR$, NHR,

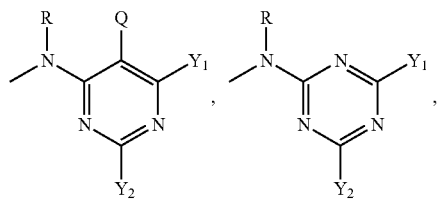

$NHCOCY_3$=$CHY_3$, $NHCOCHY_4CH_2Y_5$ or

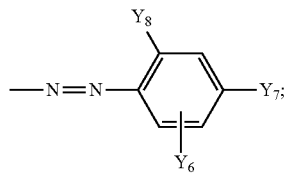;

$Y_1$ is Cl or F; Q is Cl or $CH_3$; $Y_2$ is Cl, F, OR, $NHCH_2SO_3X$, $N(R)_2$, $N(CH_2OH)_2$, $N(C_2H_4OH)_2$,

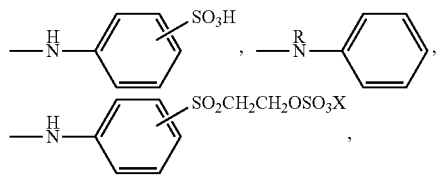

-continued

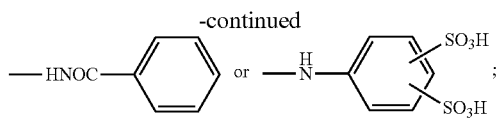;

$Y_3$ is H or Br; $Y_4$ is H, Cl or Br; $Y_5$ is Br or $OSO_3X$; $Y_6$ is H, Cl, NHR, OR, CN, $SO_3Na$, $SO_2NHR$, CONHR, COOR or NHCOR; $Y_7$ is H, Cl, OR, CN, $NO_2$, $SO_3Na$, $SO_2NHR$, $SO_2CH_2CH_2Y_9$, $SO_2NHCH_2CH_2Y_9$, CONHR or COOR; $Y_8$ is H, OH, Cl, $CH_3$, $OCH_3$, $OC_2H_5$, CN, $CONH_2$, $COOCH_3$ or $COOC_2H_5$; $Y_9$ is Cl, $OSO_3X$ or $N(CH_3)CH_2CH_2SO_3X$; R is H, or a linear, saturated alkyl of $C_pH_{2p+1}$, wherein: p is an integer with the proviso of $1 \leq p \leq 18$; and X is H, Na or K;

The azo-metal complexation chromophoric group (20), (21), (22) or (23) has a structure as below:

the chromophoric group (20) is:

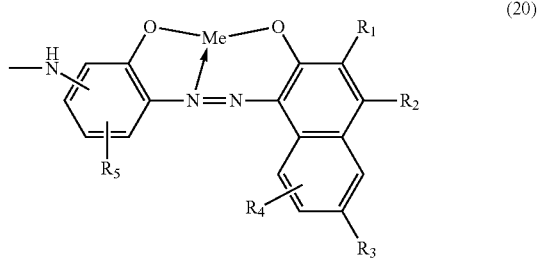

in formula (20): $R_1$ is H, $SO_3Na$ or $SO_2NHR$; $R_2$ is H, Cl, CN, $SO_2NHR$, CONHR, COOR, NHR, NHCOR, $SO_2CH_2CH_2Y_1$, $SO_2NHCH_2CH_2Y_1$,

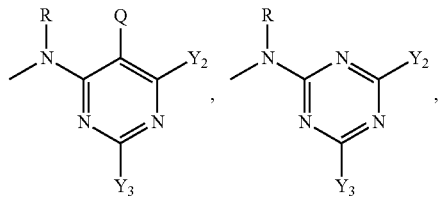

$NHCOCY_4$=$CHY_5$ or $NHCOCHY_4CH_2Y_6$; $Y_1$ is Cl, $OSO_3X$ or $N(CH_3)CH_2CH_2SO_3X$; $Y_2$ is Cl or F; $Y_3$ is Cl, F, OR, $NHCH_2SO_3X$, $N(R)_2$, $N(CH_2OH)_2$, $N(C_2H_4OH)_2$,

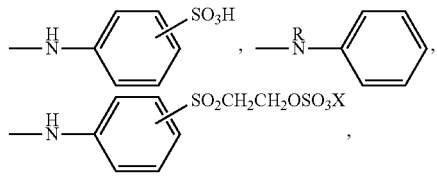

-continued

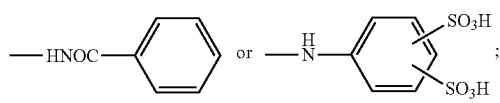

$Y_4$ is H or Br; $Y_5$ is H, Cl or Br; $Y_6$ is Br or $OSO_3X$; Q is Cl or $CH_3$; $R_3$ is H, $SO_3Na$, $SO_2NHR$, NHR or NHCOR; $R_4$ is H, $SO_2NHR$, NHR or NHCOR; $R_5$ is H, Cl, NHR, CN, $SO_3Na$, $SO_2NHR$, CONHR, COOR or NHCOR; R is H, or a linear, saturated alkyl of $C_pH_{2p+1}$, wherein: p is an integer with the proviso of $1 \leq p \leq 18$; and X is H, Na or K; Me is Cu, Co, Ni, Cr or Fe;

the chromophoric group (21) is:

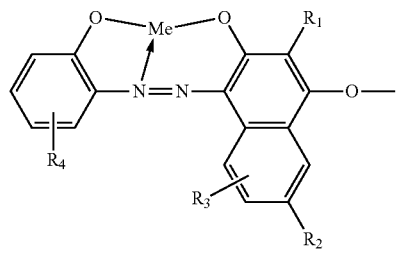

in formula (21): $R_1$ is H, $SO_3Na$ or $SO_2NHR$; $R_2$ is H, Cl, CN, $SO_3Na$, $SO_2NHR$, CONHR, COOR, NHR or NHCOR; $R_3$ is H, $SO_2NHR$, NHR or NHCOR; $R_4$ is H, $SO_3Na$, $SO_2NHR$, NHR, CONHR, COOR, NHCOR, $SO_2CH_2CH_2Y_1$, $SO_2NHCH_2CH_2Y_1$,

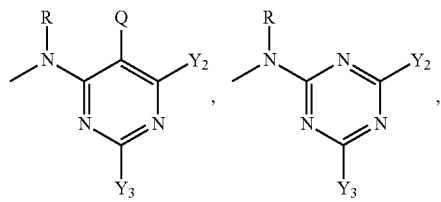

$NHCOCY_4=CHY_5$ or $NHCOCHY_4CH_2Y_6$; $Y_1$ is Cl, $OSO_3X$ or $N(CH_3)CH_2CH_2SO_3X$; $Y_2$ is Cl or F; $Y_3$ is Cl, F, OR, $NHCH_2SO_3X$, $N(R)_2$, $N(CH_2OH)_2$, $N(C_2H_4OH)_2$,

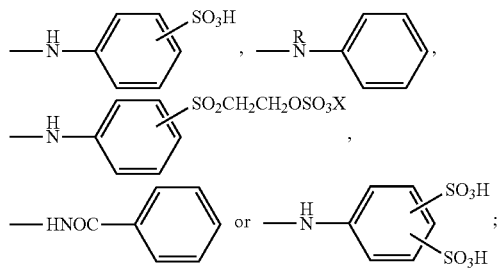

$Y_4$ is H or Br; $Y_5$ is H, Cl or Br; $Y_6$ is Br or $OSO_3X$; Q is Cl or $CH_3$; R is H, or a linear, saturated alkyl of $C_pH_{2p+1}$, wherein: p is an integer with the proviso of $1 \leq p \leq 18$; and X is H, Na or K; Me is Cu, Co, Ni, Cr or Fe;

the chromophoric group (22) is:

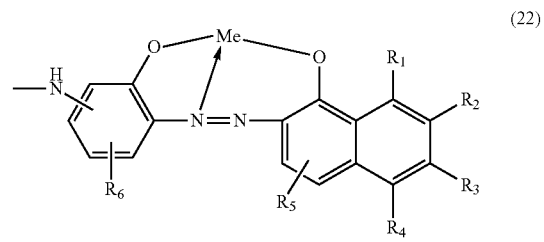

in formula (22): $R_1$ is H, OH, NHR, NHCOR,

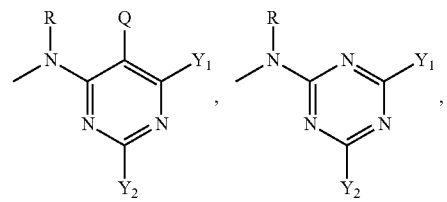

$NHCOCY_3=CHY_3$ or $NHCOCHY_4CH_2Y_5$; $Y_1$ is Cl or F; Q is Cl or $CH_3$; $Y_2$ is Cl, F, OR, $NHCH_2SO_3X$, $N(R)_2$, $N(CH_2OH)_2$, $N(C_2H_4OH)_2$,

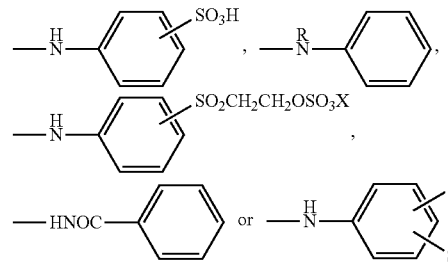

$Y_3$ is H or Br; $Y_4$ is H, Cl or Br; $Y_5$ is Br or $OSO_3X$; $R_2$ is H, NHR, $SO_3Na$, $SO_2NHR$, NHCOR or

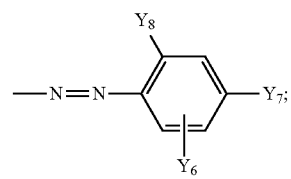

$Y_6$ is H, Cl, NHR, OR, CN, $SO_3Na$, $SO_2NHR$, CONHR, COOR or NHCOR; $Y_7$ is H, Cl, OR, CN, $NO_2$, $SO_3Na$, $SO_2NHR$, $SO_2CH_2CH_2Y_9$, $SO_2NHCH_2CH_2Y_9$, CONHR or COOR; $Y_8$ is H, OH, Cl, $CH_3$, $OCH_3$, $OC_2H_5$, CN, $CONH_2$, $COOCH_3$ or $COOC_2H_5$; $Y_9$ is Cl, $OSO_3X$ or $N(CH_3)CH_2CH_2SO_3X$; $R_3$ is H, NHR, $SO_3Na$, $SO_2NHR$ or NHCOR; $R_4$ is H, NHR, $SO_3Na$, $SO_2NHR$ or NHCOR; $R_5$ is H, $SO_3Na$ or $SO_2NHR$; $R_6$ is H, Cl, NHR, CN, $SO_3Na$, $SO_2NHR$, CONHR or COOR; R is H, or a linear, saturated alkyl of $C_pH_{2p+1}$, wherein: p is an integer with the proviso of $1 \leq p \leq 18$; and X is H, Na or K; Me is Cu, Co, Ni, Cr or Fe;

the chromophoric group (23) is:

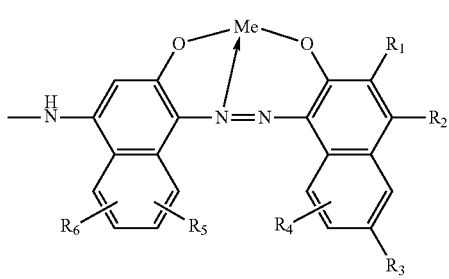

in formula (23): $R_1$ is H, Cl, $CH_3$, $OCH_3$, $OC_2H_5$, OH, CN, $CONH_2$, $COOCH_3$ or $COOC_2H_5$; $R_2$ is H, OH, $NH_2$,

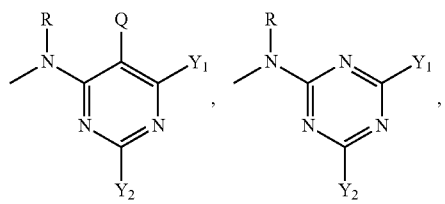

$NHCOCY_3$=$CHY_3$, $NHCOCHY_4CH_2Y_5$ or

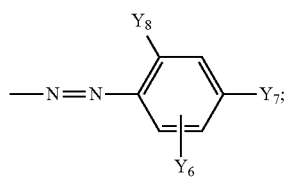

$Y_1$ is Cl or F; Q is Cl or $CH_3$; $Y_2$ is Cl, F, OR, $NHCH_2SO_3X$, $N(R)_2$, $N(CH_2OH)_2$, $N(C_2H_4OH)_2$,

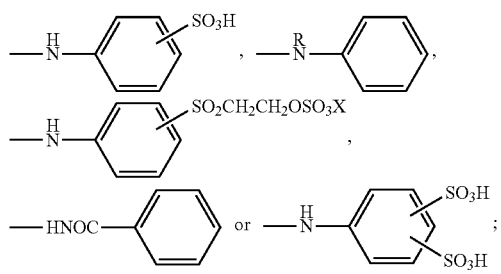

$Y_3$ is H or Br; $Y_4$ is H, Cl or Br; $Y_5$ is Br or $OSO_3X$; $Y_6$ is H, Cl, NHR, OR, CN, $SO_3Na$, $SO_2NHR$, CONHR, COOR or NHCOR; $Y_7$ is H, Cl, OR, CN, $NO_2$, $SO_3Na$, $SO_2NHR$, $SO_2CH_2CH_2Y_9$, $SO_2NHCH_2CH_2Y_9$, CONHR or COOR; $Y_8$ is H, OH, Cl, $CH_3$, $OCH_3$, $OC_2H_5$, CN, $CONH_2$, $COOCH_3$ or $COOC_2H_5$; $Y_9$ is Cl, $OSO_3X$ or $N(CH_3)CH_2CH_2SO_3X$; $R_3$ is H, NHR, $SO_3Na$, $SO_2NHR$ or NHCOR; $R_4$ is H, $SO_3Na$ or $SO_2NHR$; $R_5$ is H, Cl, NHR, CN, $SO_3Na$, $SO_2NHR$ or COOR; $R_6$ is H, Cl, $CH_3$, $OCH_3$, $OC_2H_5$, OH, CN, $CONH_2$, $COOCH_3$ or $COOC_2H_5$; R is H, or a linear, saturated alkyl of $C_pH_{2p+1}$, wherein: p is an integer with the proviso of $1 \leq p \leq 18$; and X is H, Na or K; Me is Cu, Co, Ni, Cr or Fe;

The anthraquinone chromophoric group (24), (25) or (26) has a structure as below:
the chromophoric group (24) is:

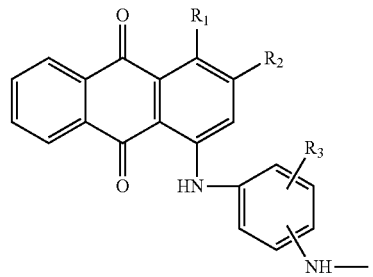

in formula (24): $R_1$ is H, Cl, Br, $CH_3$, $OCH_3$, $OC_2H_5$, OH, NHR, $NO_2$, CN, $CONH_2$, NHCOR,

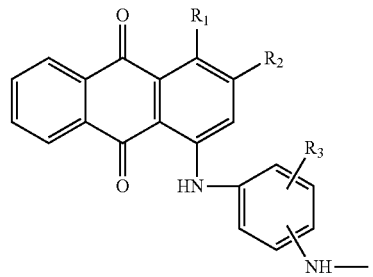

$R_2$ is H, $SO_3Na$, $SO_2NHR$ or

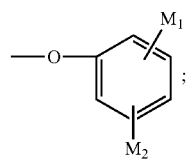

$M_1$ is H, Cl, OR, CN, $NO_2$, $SO_3Na$ or $SO_2NHR$; $M_2$ is H, Cl, OR, CN, $NO_2$, $SO_3Na$ or $SO_2NHR$; $R_3$ is H, $CH_3$, Cl, OR, CN, $NO_2$, $SO_3Na$, $SO_2NHR$, $SO_2CH_2CH_2Y_1$, $SO_2NHCH_2CH_2Y_1$,

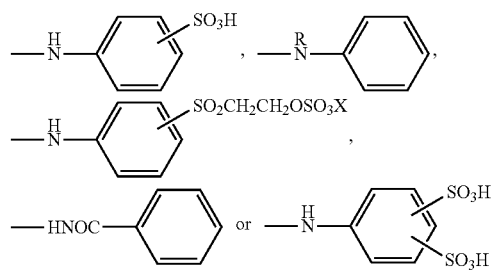

$NHCOCY_4$=$CHY_5$ or $NHCOCHY_4CH_2Y_6$; $Y_1$ is Cl, $OSO_3X$ or $N(CH_3)CH_2CH_2SO_3X$; $Y_2$ is Cl or F; $Y_3$ is Cl, F, OR, $NHCH_2SO_3X$, $N(R)_2$, $N(CH_2OH)_2$, $N(C_2H_4OH)_2$,

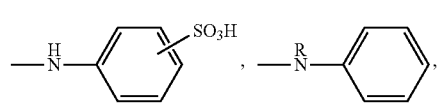

-continued

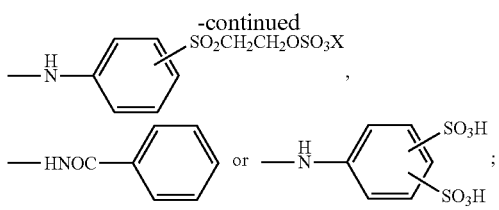

$Y_4$ is H or Br; $Y_5$ is H, Cl or Br; $Y_6$ is Br or $OSO_3X$; Q is Cl or $CH_3$; R is H, or a linear, saturated alkyl of $C_pH_{2p+1}$, wherein: p is an integer with the proviso of $1 \leq p \leq 18$; and X is H, Na or K;

the chromophoric group (25) is:

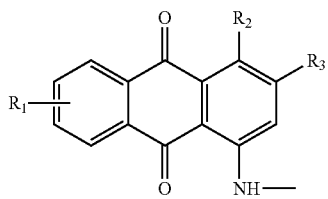

(25)

in formula (25): $R_1$ is H, Cl, Br, $CH_3$, $OCH_3$, $OC_2H_5$, OH, NHR, $NO_2$, CN, $CONH_2$, NHCOR, $SO_3Na$, $SO_2NHR$,

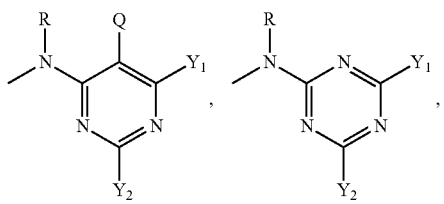

$NHCOCY_3=CHY_3$, $NHCOCHY_4CH_2Y_5$ or

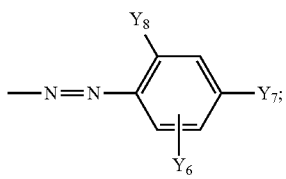

$Y_1$ is Cl or F; Q is Cl or $CH_3$; $Y_2$ is Cl, F, OR, $NHCH_2SO_3X$, $N(R)_2$, $N(CH_2OH)_2$, $N(C_2H_4OH)_2$,

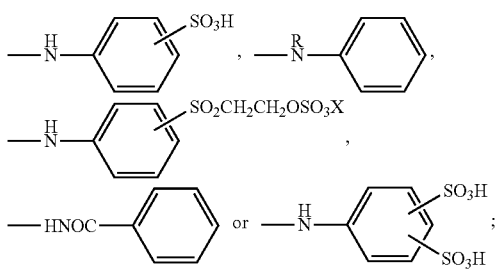

$Y_3$ is H or Br; $Y_4$ is H, Cl or Br; $Y_5$ is Br or $OSO_3X$; $Y_6$ is H, Cl, NHR, OR, CN, $SO_3Na$, $SO_2NHR$, CONHR, COOR or NHCOR; $Y_7$ is H, Cl, OR, CN, $NO_2$, $SO_3Na$, $SO_2NHR$, $SO_2CH_2CH_2Y_9$, $SO_2NHCH_2CH_2Y_9$, CONHR or COOR; $Y_8$ is H, OH, Cl, $CH_3$, $OCH_3$, $OC_2H_5$, CN, $CONH_2$, $COOCH_3$ or $COOC_2H_5$; $Y_9$ is Cl, $OSO_3X$ or $N(CH_3)CH_2CH_2SO_3X$; $R_2$ is H, Cl, Br, $CH_3$, $OCH_3$, $OC_2H_5$, OH, NHR, $NO_2$, CN, $CONH_2$, NHCOR, $SO_3Na$, $SO_2NHR$,

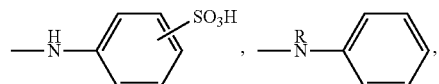

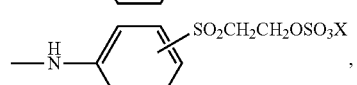

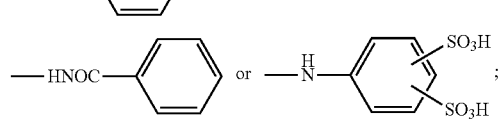

$R_3$ is H, $SO_3Na$, $SO_2NHR$ or

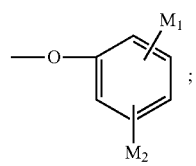

$M_1$ is H, Cl, OR, CN, $NO_2$, $SO_3Na$ or $SO_2NHR$; $M_2$ is H, Cl, OR, CN, $NO_2$, $SO_3Na$ or $SO_2NHR$; R is H, or a linear, saturated alkyl of $C_pH_{2p+1}$, wherein: p is an integer with the proviso of $1 \leq p \leq 18$; and X is H, Na or K;

the chromophoric group (26) is:

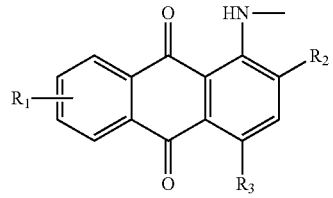

(26)

in formula (26): $R_1$ is H, Cl, Br, $CH_3$, $OCH_3$, $OC_2H_5$, OH, NHR, $NO_2$, CN, $CONH_2$, NHCOR, $SO_3Na$, $SO_2NHR$,

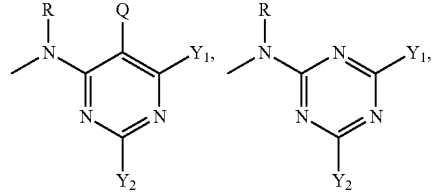

$NHCOCY_3=CHY_3$, $NHCOCHY_4CH_2Y_5$ or

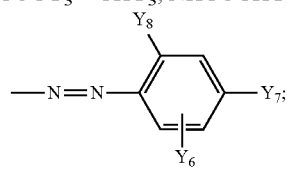

$Y_1$ is Cl or F; Q is Cl or $CH_3$; $Y_2$ is Cl, F, OR, $NHCH_2SO_3X$, $N(R)_2$, $N(CH_2OH)_2$, $N(C_2H_4OH)_2$,

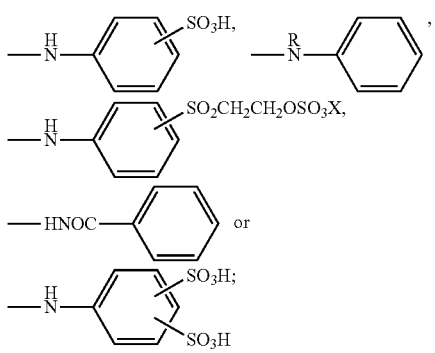

$Y_3$ is H or Br; $Y_4$ is H, Cl or Br; $Y_5$ is Br or $OSO_3X$; $Y_6$ is H, Cl, NHR, OR, CN, $SO_3Na$, $SO_2NHR$, CONHR, COOR or NHCOR; $Y_7$ is H, Cl, OR, CN, $NO_2$, $SO_3Na$, $SO_2NHR$, $SO_2CH_2CH_2Y_9$, $SO_2NHCH_2CH_2Y_9$, CONHR or COOR; $Y_8$ is H, OH, Cl, $CH_3$, $OCH_3$, $OC_2H_5$, CN, $CONH_2$, $COOCH_3$, $COOC_2H_5$; $Y_9$ is Cl, $OSO_3X$ or $N(CH_3)CH_2CH_2SO_3X$; $R_2$ is H, $SO_3Na$, $SO_2NHR$ or

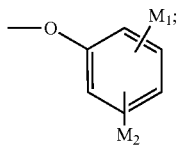

$M_1$ is H, Cl, OR, CN, $NO_2$, $SO_3Na$ or $SO_2NHR$; $M_2$ is H, Cl, OR, CN, $NO_2$, $SO_3Na$ or $SO_2NHR$; $R_3$ is H, Cl, Br, $CH_3$, $OCH_3$, $OC_2H_5$, OH, NHR, $NO_2$, CN, $CONH_2$, NHCOR, $SO_3Na$, $SO_2NHR$,

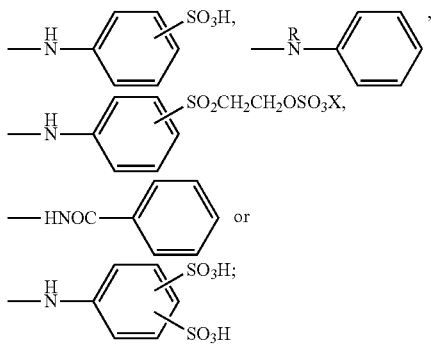

R is H, or a linear, saturated alkyl of $C_pH_{2p+1}$, wherein: p is an integer with the proviso of $1 \leq p \leq 18$; and X is H, Na or K.

The polycarboxylic acid dye with low polymerization degree according to the present invention is prepared by a process comprising: adding 1-10 g of a dye containing aromatic primary amino group or arylhydroxyl group, 1-100 g of polymaleic anhydride and 10-500 ml of solvent into a three-necked flask equipped with stirring, reacting at a temperature of 20-150° C. for 1-72 hours, distillating out the solvent under a reduced pressure, taking out the solid, and drying to obtain the product. The solvent used in the process is the one or a mixture of two or more of tetrahydrofuran, petroleum ether, acetone, butanone, chloroform, methylene chloride, carbon tetrachloride, carbon disulfide, DMF, DMSO, benzene, toluene, xylene, nitrobenzene, chlorobenzene, cyclohexane or n-hexane, such as a mixture of 2 or 3 of the solvents.

Due to the incorporation of polycarboxyl in the dye structure, the polycarboxylic acid dye with low polymerization degree according to the present invention not only endues the dye good water-solubility, but also increases the binding force between the dye and fiber to improve the application performance by means of forming a salt bond or amido bond between the carboxyl and amine compound, or forming a hydrogen bond or ester bond between the carboxyl and polyhydroxyl compound. The polycarboxylic acid dye with low polymerization degree developed is useful for dyeing and printing leather, cotton fiber, protein fiber and synthetic fiber, so as to has comprehensively potential application.

EMBODIMENTS

Measurement of Dye Fastness
The measurement of wash fastness is carried out according to GB/T 3921-97.
The measurement of friction color fastness is carried out according to GB/T 3920-97.
The measurement of color fastness to daylight exposure is carried out according to GB/T 8427-98.

EXAMPLE 1

1-20 g of maleic anhydride monomer and 10-100 ml of toluene were added into a three-necked flask equipped with a stirrer, a thermometer and an Allihn condenser, stirred and warmed to a temperature of 50-110° C. 0.01-5 g of BPO or AIBN was dissolved in 1-50 ml of toluene, and added dropwise into the three-necked flask with a constant pressure dropping funnel over a dropping period of 1-100 min. After the addition, stirring was made for 1-72 h. The stirring was stopped, the reaction product which was still hot was poured into a beaker, stirred, stood, and cooled followed by suction filtered. The filter cake was taken out and vacuum dried at 60° C. for 24 h, so as to obtain a polymaleic anhydride product.

1-13.8 g of p-nitroaniline was taken up in 5-50 ml of water, into which 1-25 ml of concentrated hydrochloric acid was added and heated to be dissolved, which was cooled to 0-5° C. rapidly with stirring after completion of dissolution. 0.5-7.25 g of sodium nitrite was dissolved in 5-30 ml of water, which was added into the p-nitroaniline solution. The reaction was stopped after 30 min, and 0.1 g of sulfamic acid was then added, during which period, 1-17.4 g of 1-phenyl-3 methyl-5-pyrazolone was taken up in 200 ml of water, heated and adjusted to a pH=9 with 15% of sodium carbonate solution, which was cooled to below 5° C. after completion of dissolution. Then, the coupling component was placed in an ice-water mixture and stirred. The diazo salt was added dropwise to the coupling component. The pH of the solution was adjusted to 9. An orange substance precipitated. After 4 h, the coupling reaction was stopped. Filtrating and drying provided an azo dye of pyrazolone comprising nitro group.

1-5 g of the azo dye of pyrazolone comprising nitro group was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel.

After completion of addition, the reaction was carried out at a constant temperature for 1-8 h. A red substance precipitated. The reaction was cooled to 20° C. and filtered. The filter cake was dried to obtain an azo dye of pyrazolone comprising amino group.

1-2.9 g of the azo dye of pyrazolone comprising amino group in 10-40 ml of butanone was added with 1-2.45 g of polymaleic anhydride and stirred at 30-80° C. for 1-24 h. The reaction was cooled and filtered, and the filter cake was dried. A yellow polycarboxylic acid dye with low polymerization degree was obtained.

Figure 1:
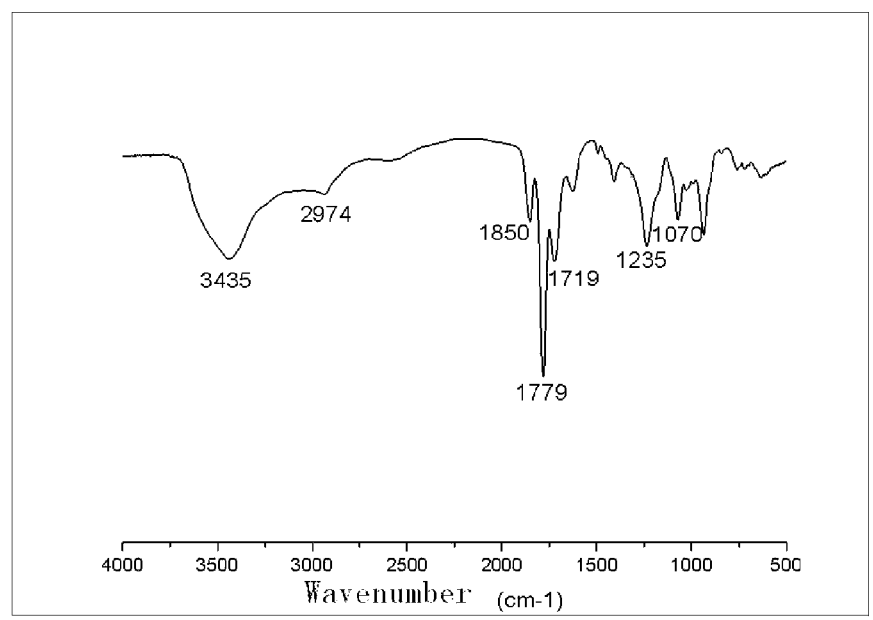
FIG. 1 is an infrared spectrogram for the polymaleic anhydride obtained in example 1 according to the present invention.
Figure 2:
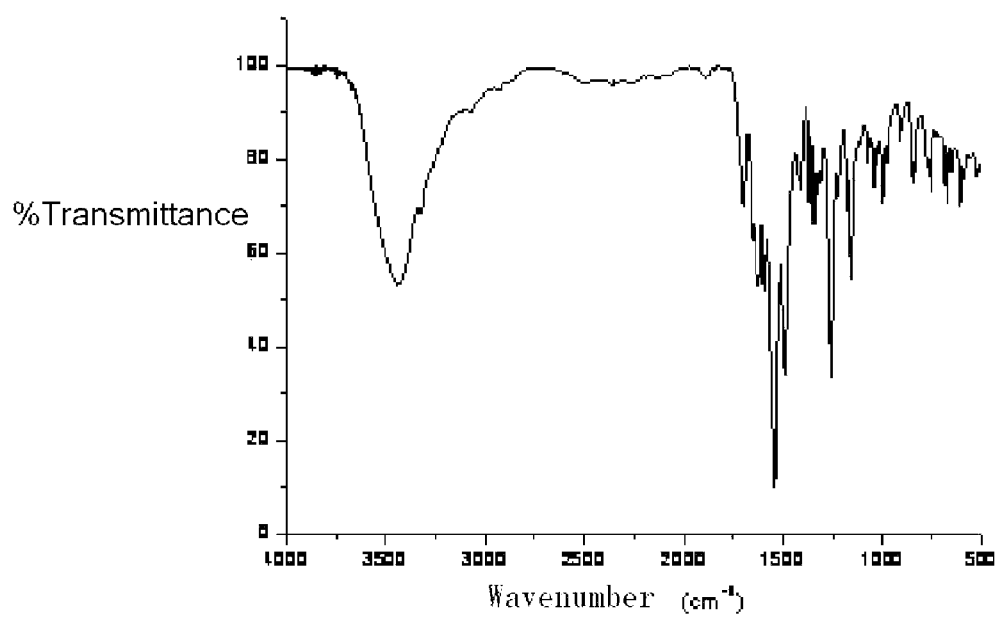
FIG. 2 is an infrared spectrogram for the dye obtained in example 1 according to the present invention.

Infrared characterizations (potassium bromide pellet) were made for the polymaleic anhydride and for the polymaleic acid-type dye, whose spectrograms were showed in FIG. 1 and FIG. 2 respectively, and the analytical results were showed in table 1 and table 2.

TABLE 1

Infrared spectrogram analysis for the polymaleic anhydride obtained in example 1.

| Wave number (cm−1) | Functional group |
| --- | --- |
| 3434 | O—H stretching vibration |
| 2974 | C—H stretching vibration |
| 1779, 1850 | Five-membered cyclic anhydride (C=O) |
| 1716 | Carboxylic acid (C=O) |
| 1235, 1070 | C-o-C stretching vibration on cyclic anhydride |

TABLE 2

Infrared spectrum analysis for the dye obtained in example 1

| No. | Wave number (cm−1) | Functional group |
| --- | --- | --- |
| 1 | 3442 | O—H stretching vibration |
| 2 | 1779, 1850 | Five-membered cyclic anhydride (C=O) |
| 3 | 1700 | C=O carboxylic acid stretch |
| 4 | 1655 | Amide (C=O stretch) |
| 5 | 1596, 1500, 1489 | Vibration of the phenyl ring skeleton |

EXAMPLES 2-3

O-nitroaniline and m-nitroaniline were used in place of p-nitroaniline to be reacted with the sodium nitrite of example 1, then reacted with 1,3,5-pyrazolone. The nitro-comprising pyrazolone dye obtained was reacted with the sodium sulfide of example 1. The corresponding amino-comprising pyrazolone dye obtained was further reacted with the polymaleic anhydride of example 1, to obtain a yellow polycarboxylic acid dye with low polymerization degree. The other conditions were same as example 1.

EXAMPLE 4

2-(4-(5-hydroxy-3-methyl-1-pyrazolyl)benzene sulfonamido) ethyl sulfate was used in place of 1-phenyl-3 methyl-5-pyrazolone to be coupled with the p-nitroaniline diazo salt of example 1, to obtain an azo dye of pyrazolone comprising nitro group and sulfate group.

1-5 g of the azo dye of pyrazolone comprising nitro group and sulfate group was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. A red substance precipitated. The reaction was cooled to 20° C. and filtered. The filter cake was dried to obtain an azo dye of pyrazolone comprising amino group and sulfate group.

1-2.9 g of the azo dye of pyrazolone comprising amino group and sulfate group in 10-40 ml of butanone was added with 1-2.45 g of polymaleic anhydride and stirred at 30-80° C. for 1-24 h. The reaction was cooled and filtered, and the filter cake was dried. A yellow polycarboxylic acid dye with low polymerization degree was obtained.

EXAMPLES 5-6

O-nitroaniline and m-nitroaniline were used in place of p-nitroaniline to be reacted with the sodium nitrite of example 1 and further reacted with 2-(4-(5-hydroxy-3-methyl-1-pyrazolyl)benzene sulfonamido) ethyl sulfate of example 4. The nitro-comprising azo dye obtained was reacted with the sodium sulfide of example 4. The corresponding amino-comprising pyrazolone dye obtained was further reacted with the polymaleic anhydride of example 4, to obtain a yellow polycarboxylic acid dye with low polymerization degree. The other conditions were same as example 4.

EXAMPLE 7

1-18.4 g of cyanuric chloride was placed into a beaker. A small amount of crushed ice and water were added for pulping for 0.1-1 h; during which 1-11 g of 2,4-diamino benzene sulfonic acid was added into the cyanuric chloride. Condensation was made for 4-5 h to obtain a primary condensation liquor.

The primary condensation liquor was added into 1-25 ml of concentrated hydrochloric acid for complete dissolution while stirring. 0.5-7.25 g of sodium nitrite was dissolved in 5-30 ml of water, and added into the primary condensation solution. The reaction was stopped after 30 min, and 0.1 g of sulfamic acid was then added; during which period, 1-5 g of 1-phenyl-3 methyl-5-pyrazolone was taken up in 200 ml of water, which was cooled to below 5° C. after completion of dissolution. Then, the coupling component was placed in an ice-water mixture and stirred. The diazo salt was added dropwise to the coupling component. After 4 h, the coupling reaction was stopped. The temperature was increased to 40° C. 1-2 g of p-phenylene diamine was added and the di-condensation was made. 3 hours later, the reaction was stopped, and an amino-comprising pyrazolone dye was obtained.

1-2.9 g of the azo dye of pyrazolone comprising amino group in 10-40 ml of butanone was added with 1-2.45 g of polymaleic anhydride and stirred at 30-80° C. for 1-24 h. The reaction was cooled and filtered, and the filter cake was dried. A polycarboxylic acid dye with low polymerization degree was obtained.

EXAMPLES 8-17

2-hydroxy-4,6-dichloro-cyanuric chloride, 2-methoxy-4,6-dichloro-cyanuric chloride, 2-ethoxy-4,6-dichloro-cyanuric chloride, 2-anilino-4,6-dichloro-cyanuric chloride, 2-p-sulfoanilino-4,6-dichloro-cyanuric chloride, 2-m-sulfoanilino-4,6-dichloro-cyanuric chloride, 2-o-sulfoanilino-4,6-dichloro-cyanuric chloride, 2-p-methylanilino-4,6-dichloro-cyanuric chloride, 2-p-chloroanilino-4,6-dichloro-cyanuric chloride, 2-(2,5-sulfoanilino)-4,6-dichloro-cyanuric chloride in place of the cyanuric chloride of example 7 were condensed with 2,4-diamino benzene sulfonic acid at 40° C., followed by diazotization, and coupled with 1-phenyl-3 methyl-5-pyrazolone, warmed to 90° C. and further condensed with p-phenylene diamine. The azo dye comprising triazinyl group and amino group obtained was finally reacted with polymaleic anhydride to obtain a polycarboxylic acid dye with low polymerization degree. The other conditions are same as example 7.

EXAMPLE 18

1-13.8 g of p-nitroaniline in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the p-nitroaniline solution. The reaction was stopped after 30 min, and 0.1 g of sulfamic acid was then added; during which period, 1-12 g of N-ethyl-N-ethyl aniline was taken up in 200 ml of water, then added dropwise to the solution of the diazo salt of p-nitroaniline. A red substance precipitated. After 4 h, the coupling reaction was stopped, filtered and dried to obtain a nitro-comprising azo dye.

1-5 g of the nitro-comprising azo dye was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. An amaranth substance precipitated. The reaction was cooled to 20° C. and filtered. The filter cake was dried to obtain an amino-comprising azo dye.

1-2.9 g of the amino-comprising azo dye in 10-40 ml of butanone was added with 1-2.45 g of polymaleic anhydride and stirred at 30-80° C. for 1-24 h. The reaction was cooled and filtered, and the filter cake was dried. A red polycarboxylic acid dye with low polymerization degree was obtained.

EXAMPLES 19-22

O-nitroaniline, m-nitroaniline, 2,4-dinitroaniline, 2,6-dibromo-4-nitroaniline were used in place of p-nitroaniline to be reacted with the sodium nitrite of example 18, and then reacted with N-ethyl-N-ethyl aniline. The nitro-comprising azo dye obtained was reacted with the sodium sulfide of example 18. The corresponding amino-comprising azo dye obtained was further reacted with the polymaleic anhydride of example 18, to obtain a polycarboxylic acid dye with low polymerization degree. The other conditions were same as example 18.

EXAMPLES 23-39

Tetrahydrofuran, petroleum ether, acetone, chloroform, methylene chloride, carbon tetrachloride, carbon disulfide, DMF, DMSO, benzene, toluene, xylene, nitrobenzene, chlorobenzene, cyclohexane, dioxane or n-hexane was used in place of the butanone of example 1 as the solvent for reaction of polymaleic anhydride with the amino-comprising dye of example 1, to obtain a polycarboxylic acid dye with low polymerization degree. The other conditions were same as example 1.

EXAMPLE 40

1-18.4 g of cyanuric chloride was placed into a beaker. A small amount of crushed ice and water were added for pulping for 0.1-1 h; during which, 1-17.4 g of N,N-diethyl m-acetoamido aniline was taken up in 200 ml of water. 2-7.4 g of sodium hydroxide was dissolved in 10-50 ml of water. The reaction was carried out at a constant temperature of 40-90° C. for 1-8 h, cooled to 20° C., added with cyanuric chloride and condensed for 4-5 h, to obtain a triazinyl-comprising coupling component.

1-13.8 g of p-nitroaniline in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the p-nitroaniline solution. The reaction was stopped after 30 min, and 0.1 g of sulfamic acid was then added. This diazo salt was added into the triazinyl-comprising coupling component above, coupled for 4-10 h, and filtered. The filter cake was dried to obtain a nitro-comprising azo dye.

1-5 g of the nitro-comprising azo dye was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. An amaranth substance precipitated. The reaction was cooled to 20° C. and filtered. The filter cake was dried to obtain an amino-comprising azo dye.

1-2.9 g of the amino-comprising azo dye in 10-40 ml of butanone was added with 1-2.45 g of polymaleic anhydride and stirred at 30-80° C. for 1-24 h. The reaction was cooled and filtered. The filter cake was dried to obtain a polycarboxylic acid dye with low polymerization degree.

EXAMPLES 41-60

2-hydroxy-4,6-dichloro-cyanuric chloride, 2-methoxy-4,6-dichloro-cyanuric chloride, 2-ethoxy-4,6-dichloro-cyanuric chloride, 2-anilino-4,6-dichloro-cyanuric chloride, 2-p-sulfoanilino-4,6-dichloro-cyanuric chloride, 2-m-sulfoanilino-4,6-dichloro-cyanuric chloride, 2-o-sulfoanilino-4,6-dichloro-cyanuric chloride, 2-p-methylanilino-4,6-dichloro-cyanuric chloride, 2-p-chloroanilino-4,6-dichloro-cyanuric chloride, 2-(2,5-sulfoanilino)-4,6-dichloro-cyanuric chloride, 2-hydroxy-4-hydroxy-6-chloro-cyanuric chloride, 2-methoxy-4-methoxy-6-chloro-cyanuric chloride, 2-ethoxy-4-ethoxy-6-chloro-cyanuric chloride, 2-anilino-4-anilino-6-chloro-cyanuric chloride, 2-p-sulfoanilino-4-anilino-6-chloro-cyanuric chloride, 2-m-sulfoanilino-4-(p-vinylsulfone sulfate anilino)-6-chloro-cyanuric chloride, 2-o-sulfoanilino-4-(p-vinylsulfone sulfate anilino)-6-chloro-cyanuric chloride, 2-p-methylanilino-4-(p-vinylsulfone sulfate anilino)-6-chloro-cyanuric chloride, 2-p-chloroanilino-4-(p-vinylsulfone sulfate anilino)-6-chloro-cyanuric chloride, 2-(2,5-sulfoanilino)-4-(p-vinylsulfone sulfate anilino)-6-chloro-cyanuric chloride were used in place of the cyanuric chloride of example 40 to be condensed with the hydrolysate of N,N-diethyl m-acetyl aniline. The triazinyl-comprising coupling component obtained was coupled with the p-nitroaniline diazo salt of example 40, and reduced with sodium sulfide. The triazinyl-comprising amino group dye obtained was finally reacted with polymaleic anhydride to obtain a polycarboxylic acid dye with low polymerization degree. The other conditions were same as example 40.

EXAMPLE 61

1-13.8 g of p-nitroaniline in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the p-nitroaniline solution. The reaction was stopped after 30 min, and 0.1 g of sulfamic acid was then added; during which period, 1-17.4 g of N-ethyl-N-hydroxyethylaniline was taken up in 200 ml of water, which was cooled to below 5° C. after completion of dissolution. Then, the coupling component was placed in an ice-water mixture and stirred. The diazo salt was added dropwise to the coupling component. The pH of the solution was adjusted to 5. An orange-red substance precipitated. After 4 h, the coupling reaction was stopped. Filtrating and drying provided a hydroxy-comprising azo dye.

1-2.9 g of the hydroxy-comprising azo dye in 10-40 ml of butanone was added with 1-2.45 g of polymaleic anhydride and stirred at 30-80° C. for 1-24 h. The reaction was cooled and filtered, and the filter cake was dried. A red polycarboxylic acid dye with low polymerization degree was obtained.

EXAMPLES 62-71

O-nitroaniline, m-nitroaniline, aniline, o-chloroaniline, p-chloroaniline, m-chloroaniline, p-methylaniline, p-anisidine, 2,4-dinitroaniline, 2,6-dibromo-4-nitroaniline were used in place of p-nitroaniline to be reacted with the sodium nitrite of example 61, and then reacted with N-ethyl-N-hydroxyethylaniline. The hydroxy-comprising azo dye obtained was reacted with the polymaleic anhydride of example 61, to obtain a polycarboxylic acid dye with low polymerization degree. The other conditions were same as example 61.

EXAMPLE 72

1-18.4 g of cyanuric chloride was placed into a beaker. A small amount of crushed ice and water were added for pulping for 0.1-1 h; during which, 1-11 g of N-ethyl-N-hydroxyethyl m-acetoamido aniline was taken up in 200 ml of water. 2-7.4 g of sodium hydroxide was dissolved in 10-50 ml of water. The reaction was carried out at a constant temperature of 40-90° C. for 1-8 h, cooled to 20° C., added with cyanuric chloride and condensed for 4-5 h, to obtain a triazinyl-comprising coupling component.

1-13.8 g of p-nitroaniline in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the p-nitroaniline solution. The reaction was stopped after 30 min, and 0.1 g of sulfamic acid was then added; this diazo salt was added into the triazinyl-comprising coupling component above, coupled for 4-10 h, and filtered. The filter cake was dried to obtain hydroxy-comprising azo dye.

1-2.9 g of the hydroxy-comprising azo dye in 10-40 ml of butanone was added with 1-2.45 g of polymaleic anhydride and stirred at 30-80° C. for 1-24 h. The reaction was cooled and filtered. The filter cake was dried to obtain a polycarboxylic acid dye with low polymerization degree.

EXAMPLES 73-79

2-hydroxy-4,6-dichloro-cyanuric chloride, 2-methoxy-4,6-dichloro-cyanuric chloride, 2-ethoxy-4,6-dichloro-cyanuric chloride, 2-anilino-4-anilino-6-chloro-cyanuric chloride, 2-m-sulfoanilino-4-(pvinylsulfone sulfate anilino)-6-chloro-cyanuric chloride, 2-o-sulfoanilino-4-(pvinylsulfone sulfate anilino)-6-chloro-cyanuric chloride, 2-(2,5-sulfoanilino)-4-(pvinylsulfone sulfate anilino)-6-chloro-cyanuric chloride were used in place of the cyanuric chloride of example 72, and condensed with the hydrolysate of N-ethyl-N-hydroxyethyl m-acetoamido benzene. The triazinyl-comprising coupling component obtained was coupled with the p-nitroaniline diazo salt of example 72. The triazinyl-comprising hydroxyl dye obtained was finally reacted with polymaleic anhydride to obtain a polycarboxylic acid dye with low polymerization degree. The other conditions were same as example 72.

EXAMPLE 80

1-13.8 g of p-nitroaniline in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the p-nitroaniline solution. The reaction was stopped after 30 min, and 0.1 g of sulfamic acid was then added; during which period, 1-11 g of N,N-diethyl m-acetyl aniline was taken up in 200 ml of water, which was cooled to below 5° C. after completion of dissolution. Then, the coupling component was placed in an ice-water mixture and stirred. The diazo salt was added dropwise to the coupling component. The pH of the solution was adjusted to 5. An orange-red substance precipitated. After 4 h, the coupling reaction was stopped. Filtrating and drying provided an amido-comprising azo dye.

1-5 g of the amido-comprising azo dye was dissolved in 10-100 ml of water and heated to 50-100° C. 2-7.4 g of sodium hydroxide was dissolved in 10-50 ml of water, which was added dropwise with a constant pressure dropping funnel. After completion of addition, the reaction was carried out at a constant temperature for 1-8 h. The reaction was cooled to 20° C. and filtered. The filter cake was dried to obtain an amino-comprising azo dye.

1-2.9 g of the amino-comprising azo dye in 10-40 ml of butanone was added with 1-2.45 g of polymaleic anhydride and stirred at 30-80° C. for 1-24 h. The reaction was cooled and filtered, and the filter cake was dried. A red polycarboxylic acid dye with low polymerization degree was obtained.

EXAMPLES 81-83

Aniline, o-nitroaniline and m-nitroaniline were used in place of p-nitroaniline to be reacted with the sodium nitrite of example 80, then reacted with N,N-diethyl m-acetyl aniline. The amido-comprising azo dye obtained was reacted with the sodium hydroxide of example 80. The corresponding amino-comprising pyrazolone dye obtained was further reacted with the polymaleic anhydride of example 80, to obtain a polycarboxylic acid dye with low polymerization degree. The other conditions were same as example 80.

EXAMPLE 84

1-18.4 g of cyanuric chloride was placed into a beaker. A small amount of crushed ice and water were added for pulping for 0.1-1 h; during which 1-11 g of 2,4-diamino benzene sulfonic acid was added into the cyanuric chloride. Condensation was made for 4-5 h to obtain a primary condensation liquor.

The primary condensation liquor was added into 1-25 ml of concentrated hydrochloric acid for complete dissolution while stirring. 0.5-7.25 g of sodium nitrite was dissolved in 5-30 ml of water, and added into the primary condensation solution. The reaction was stopped after 30 min, and 0.1 g of sulfamic acid was then added; during which period, 1-5 g of N,N-diethyl m-acetyl aniline was taken up in 200 ml of water, which was cooled to below 5° C. after completion of dissolution. Then, the coupling component was placed in an ice-water mixture and stirred. The diazo salt was added dropwise to the coupling component. After 4 h, the coupling reaction was stopped. The temperature was increased to 40° C., and 1-2 g of aniline was added for condensation for 4-5 h, to obtain an amido-comprising pyrazolone dye.

1-5 g of the amido-comprising azo dye was dissolved in 10-100 ml of water and heated to 50-100° C. 2-7.4 g of sodium hydroxide was dissolved in 10-50 ml of water, which was added dropwise with a constant pressure dropping funnel. After completion of addition, the reaction was carried out at a constant temperature for 1-8 h. The reaction was cooled to 20° C. and filtered. The filter cake was dried to obtain an amino-comprising azo dye.

1-2.9 g of the amino-comprising azo dye in 10-40 ml of butanone was added with 1-2.45 g of polymaleic anhydride and stirred at 30-80° C. for 1-24 h. The reaction was cooled and filtered, and the filter cake was dried. A red polycarboxylic acid dye with low polymerization degree was obtained.

EXAMPLES 85-88

2-anilino-4-anilino-6-chloro-cyanuric chloride, 2-m-sulfoanilino-4-(p-vinylsulfone sulfate anilino)-6-chloro-cyanuric chloride, 2-o-sulfoanilino-4-(pvinylsulfone sulfate anilino)-6-chloro-cyanuric chloride, 2-(2,5-sulfoanilino)-4-(pvinylsulfone sulfate anilino)-6-chloro-cyanuric chloride were used in place of the cyanuric chloride of example 84, and condensed with 2,4-diamino benzene sulfonic acid. The triazinyl-comprising diazo component obtained was coupled with N,N-diethyl m-acetyl aniline of example 84. The triazinyl-comprising amido dye obtained was hydrolyzed and then reacted with polymaleic anhydride to obtain a polycarboxylic acid dye with low polymerization degree. The other conditions were same as example 84.

EXAMPLE 89

1-13.8 g of p-nitroaniline in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the p-nitroaniline solution. The reaction was stopped after 30 min, and 0.1 g of sulfamic acid was then added; during which period, 1-17.4 g of 2-naphthol was taken up in 200 ml of water. The pH was adjusted to about 9, and then the diazo salt of p-nitroaniline was added. After 4 h, the coupling reaction was stopped, filtered and dried to obtain a nitro-comprising azo dye.

1-5 g of the nitro-comprising azo dye was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. An amaranth substance precipitated. The reaction was cooled to 20° C. and filtered. The filter cake was dried to obtain an amino-comprising azo dye.

1-2.9 g of the amino-comprising azo dye in 10-40 ml of butanone was added with 1-2.45 g of polymaleic anhydride and stirred at 30-80° C. for 1-24 h. The reaction was cooled and filtered. The filter cake was dried to obtain a polycarboxylic acid dye with low polymerization degree.

EXAMPLES 90-93

O-nitroaniline, m-nitroaniline, 2,4-dinitroaniline, 2,6-dibromo-4-nitroaniline were used in place of p-nitroaniline to be reacted with sodium nitrite of example 89 and then reacted with 2-naphthol. The nitro-comprising dye obtained was reduced with sodium sulfide and further reacted with polymaleic anhydride of example 89 to obtain a polycarboxylic acid dye with low polymerization degree. The other conditions were same as example 89.

EXAMPLE 94

1-13.8 g of p-nitroaniline in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the p-nitroaniline solution. The reaction was stopped after 30 min, and 0.1 g of sulfamic acid was then added; during which period, 1-17.4 g of 2-hydroxy-1-naphthylamine was taken up in 200 ml of water, which was cooled to below 5° C. after completion of dissolution. Then, the coupling component was placed in an ice-water mixture and stirred. The diazo salt was added dropwise to the coupling component. After 4 h, the coupling reaction was stopped to obtain an amino-comprising azo dye.

1-18.4 g of cyanuric chloride was placed into a beaker. A small amount of crushed ice and water were added for pulping for 0.1-1 h. The amino-comprising azo dye above was added and condensed for 4-5 h to obtain an azo dye comprising triazinyl group and nitro group.

1-5 g of the nitro-comprising azo dye was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. The reaction was cooled to 20° C. and filtered. The filter cake was dried to obtain an amino-comprising azo dye.

1-2.9 g of the amino-comprising azo dye in 10-40 ml of butanone was added with 1-2.45 g of polymaleic anhydride and stirred at 30-80° C. for 1-24 h. The reaction was cooled and filtered, and the filter cake was dried. A red polycarboxylic acid dye with low polymerization degree was obtained.

EXAMPLES 95-99

2-anilino-4,6-dichloro-cyanuric chloride, 2-p-sulfoanilino-4,6-dichloro-cyanuric chloride, 2-anilino-4-anilino-6-chloro-cyanuric chloride, 2-p-methylanilino-4-(pvinylsulfone sulfate anilino)-6-chloro-cyanuric chloride, 2-(2,5-sulfoanilino)-4-(pvinylsulfone sulfate anilino)-6-chloro-cyanuric chloride were used in place of cyanuric chloride of example 94 to be condensed with the amino-comprising azo dye. The azo dye comprising triazinyl group and nitro group obtained was reduced with sodium sulfide and finally reacted with polymaleic anhydride, to obtain a polycarboxylic acid dye with low polymerization degree. The other conditions were same as example 94.

EXAMPLE 100

1-13.8 g of p-nitro o-hydroxy aniline in 5-50 ml of water was added with 1-25 ml of concentrated hydrochloric acid. 0.5-7.25 g of sodium nitrite was dissolved in 5-30 ml of water and added into the solution of the p-nitro o-hydroxy aniline. The reaction was stopped after 30 min, and 0.1 g of sulfamic acid was then added; during which period, 1-17.4 g of 2-naphthol was taken up in 200 ml of water, which was cooled to below 5° C. after completion of dissolution. Then, the coupling component was placed in an ice-water mixture and stirred. The diazo salt was added dropwise to the coupling component. The coupling reaction was stopped to obtain a hydroxy-comprising azo dye.

The precipitate of chromic hydroxide was added with water and stirred to produce a 8-10% pulp. Formic acid was then added. The reaction was heated gradually to 90° C. to obtain a transparent liquor of chromium formate, to which the azo dye above was added at the boiling temperature over 12-24 h. Filtrating provided a chromium-complexed dye.

1-5 g of the chromium-complexed azo dye was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. An amaranth substance precipitated. The reaction was cooled to 20° C. and filtered. The filter cake was dried to obtain an amino-comprising chromium-azo dye.

1-2.9 g (0.01 mol) of the amino-comprising chromium-complexed azo dye in 10-40 ml of butanone was added with 1-2.45 g of polymaleic anhydride and stirred at 30-80° C. for 1-24 h. The reaction was cooled and filtered, and the filter cake was dried. A polycarboxylic acid dye with low polymerization degree was obtained.

EXAMPLES 101-103

Cobalt chloride, copper sulfate, iron chloride were used in place of chromium formate to be complexed with the azo dye of example 100. The cobalt complexed, copper complexed and iron complexed dyes obtained respectively were then reduced with nitro group and condensed with polymaleic anhydride to obtain a metal complexed-polycarboxylic acid dye with low polymerization degree

EXAMPLE 104

1-13.8 g of p-nitro o-hydroxy aniline in 5-50 ml of water was added with 1-25 ml of concentrated hydrochloric acid. 0.5-7.25 g of sodium nitrite was dissolved in 5-30 ml of water and added into the solution of the p-nitro o-hydroxy aniline. The reaction was stopped after 30 min, and 0.1 g of sulfamic acid was then added; during which period, 1-17.4 g of 2-hydroxy-1-amino naphthalene was taken up in 200 ml of water, which was cooled to below 5° C. after completion of dissolution. Then, the coupling component was placed in an ice-water mixture and stirred. The diazo salt was added dropwise to the coupling component. After 4 h, the coupling reaction was stopped to obtain an azo dye.

The precipitate of chromic hydroxide was added with water and stirred to produce a 8-10% pulp. Formic acid was then added. The reaction was heated gradually to 90° C. to obtain a transparent liquor of chromium formate, to which the azo dye above was added at the boiling temperature over 12-24 h. Filtrating provided a chromium-complexed dye.

1-18.4 g of cyanuric chloride was placed into a beaker. A small amount of crushed ice and water were added for pulping for 0.1-1 h; during which 1-17.4 g of azo dye above was added into the cyanuric chloride and condensed for 4-5 h. The temperature was increased to 40° C. Aniline was added and condensed for 4-5 h to obtain a dye comprising triazinyl group and nitro group.

1-5 g of the nitro-comprising azo dye was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. An amaranth substance precipitated. The reaction was cooled to 20° C. and filtered. The filter cake was dried to obtain an amino-comprising azo dye.

1-2.9 g of the amino-comprising chromium-complexed azo dye in 10-40 ml of butanone was added with 1-2.45 g of polymaleic anhydride and stirred at 30-80° C. for 1-24 h. The reaction was cooled and filtered, and the filter cake was dried. A polycarboxylic acid dye with low polymerization degree was obtained.

EXAMPLES 105-124

2-hydroxy-4,6-dichloro-cyanuric chloride, 2-methoxy-4,6-dichloro-cyanuric chloride, 2-ethoxy-4,6-dichloro-cyanuric chloride, 2-anilino-4,6-dichloro-cyanuric chloride, 2-p-sulfoanilino-4,6-dichloro-cyanuric chloride, 2-m-sulfoanilino-4,6-dichloro-cyanuric chloride, 2-o-sulfoanilino-4,6-dichloro-cyanuric chloride, 2-p-methylanilino-4,6-dichloro-cyanuric chloride, 2-p-chloroanilino-4,6-dichloro-cyanuric chloride, 2-(2,5-sulfoanilino)-4,6-dichloro-cyanuric chloride, 2-hydroxy-4-hydroxy-6-chloro-cyanuric chloride, 2-methoxy-4-methoxy-6-chloro-cyanuric chloride, 2-ethoxy-4-ethoxy-6-chloro-cyanuric chloride, 2-anilino-4-anilino-6-chloro-cyanuric chloride, 2-p-sulfoanilino-4-anilino-6-chloro-cyanuric chloride, 2-m-sulfoanilino-4-(p-vinylsulfate anilino)-6-chloro-cyanuric chloride, 2-o-sulfoanilino-4-(p-vinylsulfone sulfate anilino)-6-chloro-cyanuric chloride, 2-p-methylanilino-4-(p-vinylsulfone sulfate anilino)-6-chloro-cyanuric chloride, 2-p-chloroanilino-4-(p-vinylsulfone sulfate anilino)-6-chloro-cyanuric chloride, 2-(2,5-sulfoanilino)-4-(p-vinylsulfone sulfate anilino)-6-chloro-cyanuric chloride were used in place of cyanuric chloride of example 104 to be condensed with the amino-comprising azo dye. The triazinyl-comprising azo dye obtained was reduced with sodium sulfide and finally reacted with polymaleic anhydride, to obtain a polycarboxylic acid dye with low polymerization degree. The other conditions were same as example 104.

EXAMPLE 125

1-13.8 g of p-nitroaniline in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the p-nitroaniline solution. The reaction was stopped after 30 min, and 0.1 g of sulfamic acid was then added; during which period, 1-17.4 g of 1-naphthol was taken up in 200 ml of water. The pH was adjusted to about 9, and then the diazo salt of p-nitroaniline was added. After 4 h, the coupling reaction was stopped, filtered and dried to obtain a hydroxy-comprising azo dye.

1-2.9 g (0.01 mol) of the hydroxy-comprising azo dye in 10-40 ml of butanone was added with 1-2.45 g of polymaleic anhydride and stirred at 30-80° C. for 1-24 h. The reaction was cooled and filtered. The filter cake was dried to obtain a polycarboxylic acid dye with low polymerization degree.

EXAMPLES 126-135

O-nitroaniline, m-nitroaniline, aniline, o-chloroaniline, p-chloroaniline, m-chloroaniline, p-methylaniline, p-anisidine, 2,4-dinitroaniline, 2,6-dibromo-4-nitroaniline were used in place of p-nitroaniline to be reacted with sodium nitrite of example 125 and then reacted with 1-naphthol. The hydroxy-comprising dye obtained was further reacted with polymaleic anhydride of example 125 to obtain a polycarboxylic acid dye with low polymerization degree. The other conditions were same as example 125.

EXAMPLE 136

1-13.8 g of p-nitroaniline in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the p-nitroaniline solution. The reaction was stopped after 30 min, and 0.1 g of sulfamic acid was then added; during which period, 1-17.4 g of 1-naphthol was taken up in 200 ml of water, which was cooled to below 5° C. after completion of dissolution. Then, the coupling component was placed in an ice-water mixture and stirred. The diazo salt was added dropwise to the coupling component to obtain an azo dye comprising nitro group and hydroxy group.

1-5 g of the nitro-comprising azo dye was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. An amaranth substance precipitated. The reaction was cooled to 20° C. and filtered. The filter cake was dried to obtain an amino-comprising azo dye.

1-18.4 g of cyanuric chloride was placed into a beaker. A small amount of crushed ice and water were added for pulping for 0.1-1 h. The amino-comprising azo dye was added and condensed for 4-5 h to obtain an azo dye comprising triazinyl group and hydroxy group.

1-2.9 g of the hydroxy-comprising azo dye in 10-40 ml of butanone was added with 1-2.45 g of polymaleic anhydride and stirred at 30-80° C. for 1-24 h. The reaction was cooled and filtered, and the filter cake was dried. A polycarboxylic acid dye with low polymerization degree was obtained.

EXAMPLES 137-142

2-hydroxy-4,6-dichloro-cyanuric chloride, 2-p-methylanilino-4,6-dichloro-cyanuric chloride, 2-anilino-4-anilino-6-chloro-cyanuric chloride, 2-p-sulfoanilino-4-anilino-6-chloro-cyanuric chloride, 2-p-chloroanilino-4-(p-vinylsulfone sulfate anilino)-6-chloro-cyanuric chloride, 2-(2,5-sulfoanilino)-4-(pvinylsulfone sulfate anilino)-6-chloro-cyanuric chloride were used in place of cyanuric chloride of example 136 to be condensed with the amino-comprising azo dye. The azo dye comprising triazinyl group and hydroxy group obtained was finally reacted with polymaleic anhydride, to obtain a polycarboxylic acid dye with low polymerization degree. The other conditions were same as example 136.

EXAMPLE 143

1-13.8 g of p-nitro o-hydroxy aniline in 5-50 ml of water was added with 1-25 ml of concentrated hydrochloric acid. 0.5-7.25 g of sodium nitrite was dissolved in 5-30 ml of water and added into the solution of the p-nitro o-hydroxy aniline. The reaction was stopped after 30 min, and 0.1 g of sulfamic acid was then added; during which period, 1-17.4 g of 2-hydroxy-4-hydroxy-naphthalene was taken up in 200 ml of water, which was cooled to below 5° C. after completion of dissolution. Then, the coupling component was placed in an ice-water mixture and stirred. The diazo salt was added dropwise to the coupling component. After 4 h, the coupling reaction was stopped to obtain an azo dye.

The precipitate of chromic hydroxide was added with water and stirred to produce a 8-10% pulp. Formic acid was then added. The reaction was heated gradually to 90° C. to obtain a transparent liquor of chromium formate, to which the azo dye above was added at the boiling temperature over 12-24 h. Filtrating provided a chromium-complexed dye.

1-5 g of the nitro-comprising azo dye was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. An amaranth substance precipitated. The reaction was cooled to 20° C. and filtered. The filter cake was dried to obtain an amino-comprising azo dye.

1-18.4 g of cyanuric chloride was placed into a beaker. A small amount of crushed ice and water were added for pulping for 0.1-1 h; during which 1-17.4 g of the azo dye above was added into the cyanuric chloride and condensed for 4-5 h. The temperature was increased to 40° C. Aniline was added and condensed for 4-5 h to obtain a dye comprising triazinyl group and hydroxy group.

1-2.9 g of the hydroxy-comprising chromium-complexed azo dye in 10-40 ml of butanone was added with 1-2.45 g of polymaleic anhydride and stirred at 30-80° C. for 1-24 h. The reaction was cooled and filtered, and the filter cake was dried. A polycarboxylic acid dye with low polymerization degree was obtained.

EXAMPLES 144-163

2-hydroxy-4,6-dichloro-cyanuric chloride, 2-methoxy-4,6-dichloro-cyanuric chloride, 2-ethoxy-4,6-dichloro-cyanuric chloride, 2-anilino-4,6-dichloro-cyanuric chloride, 2-p-sulfoanilino-4,6-dichloro-cyanuric chloride, 2-m-sulfoanilino-4,6-dichloro-cyanuric chloride, 2-o-sulfoanilino-4,6-dichloro-cyanuric chloride, 2-p-methylanilino-4,6-dichloro-cyanuric chloride, 2-p-chloroanilino-4,6-dichloro-cyanuric chloride, 2-(2,5-sulfoanilino)-4,6-dichloro-cyanuric chloride, 2-hydroxy-4-hydroxy-6-chloro-cyanuric chloride, 2-methoxy-4-methoxy-6-chloro-cyanuric chloride, 2-ethoxy-4-ethoxy-6-chloro-cyanuric chloride, 2-anilino-4-anilino-6-chloro-cyanuric chloride, 2-p-sulfoanilino-4-anilino-6-chloro-cyanuric chloride, 2-m-sulfoanilino-4-(p-vinylsulfone sulfate anilino)-6-chloro-cyanuric chloride, 2-o-sulfoanilino-4-(p-vinylsulfone sulfate anilino)-6-chloro-cyanuric chloride, 2-p-methylanilino-4-(p-vinylsulfone sulfate anilino)-6-chloro-cyanuric chloride, 2-p-chloroanilino-4-(p-vinylsulfone sulfate anilino)-6-chloro-cyanuric chloride, 2-(2,5-sulfoanilino)-4-(p-vinylsulfone sulfate anilino)-6-chloro-cyanuric chloride were used in place of cyanuric chloride of example 143 to be condensed with the amino-comprising azo dye. The azo dye comprising triazinyl group and hydroxy group obtained was finally reacted with polymaleic anhydride, to obtain a polycarboxylic acid dye with low polymerization degree. The other conditions were same as example 143.

EXAMPLE 164

1-13.8 g of p-nitroaniline in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the p-nitroaniline solution. The reaction was stopped after 30 min, and 0.1 g of sulfamic acid was then added; during which period, 1-10 g of 1-amino-8-naphthol-3,6-disulfonic acid was taken up in 200 ml of water, and the pH was adjusted to about 4. The diazo salt of p-nitroaniline was then added. After 4 h, the coupling reaction was stopped to obtain a primary coupling liquor. 1-7.8 g of aniline in 50 ml of water was added with 1-25 ml of concentrated hydrochloric acid, which was cooled to 0-5° C. after completion of dissolution. 0.5-7.25 g of sodium nitrite was dissolved in 5-30 ml of water and added into the aniline solution. After 30 min, the reaction was stopped. 0.1 g of sulfamic acid was then added. The diazo salt of aniline was added into the primary coupling liquor, the pH was adjusted to about 9, and coupling was carried out for 4-10 h to obtain a bisazo dye.

1-5 g of the nitro-comprising bisazo dye was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. A red substance precipitated. The reaction was cooled to 20° C. and filtered. The filter cake was dried to obtain an amino-comprising bisazo dye.

1-2.9 g of the amino-comprising bisazo dye in 10-40 ml of butanone was added with 1-2.45 g of polymaleic anhydride and stirred at 30-80° C. for 1-24 h. The reaction was cooled and filtered, and the filter cake was dried. A blue-black polycarboxylic acid dye with low polymerization degree was obtained.

EXAMPLES 165-166

O-nitroaniline and m-nitroaniline were used in place of p-nitroaniline to be reacted with the sodium nitrite of example 164 and then reacted with 1-amino-8-naphthol-3,6-disulfonic acid. The nitro-comprising monoazo dye obtained was coupled secondarily with the diazo salt of aniline of example 164. The corresponding nitro-comprising bisazo dye obtained was further reacted with the sodium sulfide of example 164. The amino-comprising bisazo dye obtained was finally reacted with polymaleic anhydride of example 164, to obtain a blue-black polycarboxylic acid dye with low polymerization degree. The other conditions were same as example 164.

EXAMPLE 167

1-18.4 g of cyanuric chloride was placed into a beaker. A small amount of crushed ice and water were added for pulping for 0.1-1 h; during which, 1-17.4 g of 1-amino-8-naphthol-3, 6-disulfonic acid was taken up in 200 ml of water. 2-7.4 g of sodium hydroxide was dissolved in 10-50 ml of water. The reaction was added with the cyanuric chloride and condensed for 4-5 h, to obtain a triazinyl-comprising coupling component.

1-13.8 g of p-nitroaniline in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the p-nitroaniline solution. The reaction was stopped after 30 min, and 0.1 g of sulfamic acid was then added. This diazo salt was added into the triazinyl-comprising coupling component above, coupled for 4-10 h, and filtered. The filter cake was dried to obtain a nitro-comprising azo dye.

1-5 g of the nitro-comprising azo dye was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. An amaranth substance precipitated. The reaction was cooled to 20° C. and filtered. The filter cake was dried to obtain an amino-comprising azo dye.

1-2.9 g of the amino-comprising azo dye in 10-40 ml of butanone was added with 1-2.45 g of polymaleic anhydride and stirred at 30-80° C. for 1-24 h. The reaction was cooled and filtered, and the filter cake was dried. A polycarboxylic acid dye with low polymerization degree was obtained.

EXAMPLES 168-187

2-hydroxy-4,6-dichloro-cyanuric chloride, 2-methoxy-4, 6-dichloro-cyanuric chloride, 2-ethoxy-4,6-dichloro-cyanuric chloride, 2-anilino-4,6-dichloro-cyanuric chloride, 2-p-sulfoanilino-4,6-dichloro-cyanuric chloride, 2-m-sulfoanilino-4,6-dichloro-cyanuric chloride, 2-o-sulfoanilino-4,6-dichloro-cyanuric chloride, 2-p-methylanilino-4,6-dichloro-cyanuric chloride, 2-p-chloroanilino-4,6-dichloro-cyanuric chloride, 2-(2,5-sulfoanilino)-4,6-dichloro-cyanuric chloride, 2-hydroxy-4-hydroxy-6-chloro-cyanuric chloride, 2-methoxy-4-methoxy-6-chloro-cyanuric chloride, 2-ethoxy-4-ethoxy-6-chloro-cyanuric chloride, 2-anilino-4-anilino-6-chloro-cyanuric chloride, 2-p-sulfoanilino-4-anilino-6-chloro-cyanuric chloride, 2-m-sulfoanilino-4-(p-vinylsulfone sulfate anilino)-6-chloro-cyanuric chloride, 2-o-sulfoanilino-4-(p-vinylsulfone sulfate anilino)-6-chloro-cyanuric chloride, 2-p-methylanilino-4-(p-vinylsulfone sulfate anilino)-6-chloro-cyanuric chloride, 2-p-chloroanilino-4-(p-vinylsulfone sulfate anilino)-6-chloro-cyanuric chloride, 2-(2,5-sulfoanilino)-4-(p-vinylsulfone sulfate anilino)-6-chloro-cyanuric chloride were used in place of cyanuric chloride of example 167 to be condensed with the 1-amino-8-naphthol-3,6-disulfonic acid and reduced with sodium sulfide. The azo dye comprising triazinyl group and amino group obtained was finally reacted with polymaleic anhydride, to obtain a polycarboxylic acid dye with low polymerization degree. The other conditions were same as example 167.

EXAMPLE 188

1-13.8 g of p-nitro o-hydroxy aniline in 5-50 ml of water was added with 1-25 ml of concentrated hydrochloric acid. 0.5-7.25 g of sodium nitrite was dissolved in 5-30 ml of water and added into the solution of the p-nitro o-hydroxy aniline. The reaction was stopped after 30 min, and 0.1 g of sulfamic acid was then added; during which period, 1-17.4 g of 1-amino-8-hydroxy-3,6-dinaphthyl sulfonic acid was taken up in 200 ml of water, which was cooled to below 5° C. after completion of dissolution. Then, the coupling component was placed in an ice-water mixture and stirred. The diazo salt was added dropwise to the coupling component. The pH of the solution was controlled to be 9. After 4 h, the coupling reaction was stopped. Filtrating and drying provided a hydroxy-comprising azo dye.

The precipitate of chromic hydroxide was added with water and stirred to produce a 8-10% pulp. Formic acid was then added. The reaction was heated gradually to 90° C. to obtain a transparent liquor of chromium formate, to which the azo dye above was added at the boiling temperature over 12-24 h. Filtrating provided a chromium-complexed dye.

1-5 g of the chromium-complexed azo dye was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. An amaranth substance precipitated. The reaction was cooled to 20° C. and filtered. The filter cake was dried to obtain an amino-comprising chromium-azo dye.

1-2.9 g of the amino-comprising chromium-complexed azo dye in 10-40 ml of butanone was added with 1-2.45 g of polymaleic anhydride and stirred at 30-80° C. for 1-24 h. The reaction was cooled and filtered, and the filter cake was dried. A polycarboxylic acid dye with low polymerization degree was obtained.

EXAMPLES 189-191

Cobalt chloride, copper sulfate, iron chloride were used in place of chromium formate to be complexed with the azo dye of example 188. The cobalt complexed, copper complexed and iron complexed dyes obtained respectively were then reduced with nitro group and condensed with polymaleic anhydride to obtain a metal complexed-polycarboxylic acid dye with low polymerization degree

EXAMPLE 192

1-13.8 g of p-nitro o-hydroxy aniline in 5-50 ml of water was added with 1-25 ml of concentrated hydrochloric acid. 0.5-7.25 g of sodium nitrite was dissolved in 5-30 ml of water and added into the solution of the p-nitro o-hydroxy aniline. The reaction was stopped after 30 min, and 0.1 g of sulfamic acid was then added; during which period, 1-17.4 g of 1-amino-8-hydroxy-3,6-dinaphthyl sulfonic acid was taken up in 200 ml of water, which was cooled to below 5° C. after completion of dissolution. Then, the coupling component was placed in an ice-water mixture and stirred. The diazo salt was added dropwise to the coupling component. The pH of the solution was adjusted to 9. After 4 h, the coupling reaction was stopped. Filtrating and drying provided a hydroxy-comprising azo dye.

The precipitate of chromic hydroxide was added with water and stirred to produce a 8-10% pulp. Formic acid was then added. The reaction was heated gradually to 90° C. to obtain a transparent liquor of chromium formate, to which the azo dye above was added at the boiling temperature over 12-24 h. Filtrating provided a chromium-complexed dye.

1-18.4 g of cyanuric chloride was placed into a beaker. A small amount of crushed ice and water were added for pulping for 0.1-1 h; during which 1-17.4 g of the chromium-complexed azo dye above was added into the cyanuric chloride and condensed for 4-5 h. The temperature was increased to 40° C. Aniline was added and condensed for 4-5 h to obtain a dye comprising triazinyl group and nitro group.

1-5 g of the nitro-comprising azo dye was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. An amaranth substance precipitated. The reaction was cooled to 20° C. and filtered. The filter cake was dried to obtain an amino-comprising azo dye.

1-2.9 g of the amino-comprising chromium-complexed azo dye in 10-40 ml of butanone was added with 1-2.45 g of polymaleic anhydride and stirred at 30-80° C. for 1-24 h. The reaction was cooled and filtered, and the filter cake was dried. A polycarboxylic acid dye with low polymerization degree was obtained.

EXAMPLES 193-212

2-hydroxy-4,6-dichloro-cyanuric chloride, 2-methoxy-4,6-dichloro-cyanuric chloride, 2-ethoxy-4,6-dichloro-cyanuric chloride, 2-anilino-4,6-dichloro-cyanuric chloride, 2-p-sulfoanilino-4,6-dichloro-cyanuric chloride, 2-m-sulfoanilino-4,6-dichloro-cyanuric chloride, 2-o-sulfoanilino-4,6-dichloro-cyanuric chloride, 2-p-methylanilino-4,6-dichloro-cyanuric chloride, 2-p-chloroanilino-4,6-dichloro-cyanuric chloride, 2-(2,5-sulfoanilino)-4,6-dichloro-cyanuric chloride, 2-hydroxy-4-hydroxy-6-chloro-cyanuric chloride, 2-methoxy-4-methoxy-6-chloro-cyanuric chloride, 2-ethoxy-4-ethoxy-6-chloro-cyanuric chloride, 2-anilino-4-anilino-6-chloro-cyanuric chloride, 2-p-sulfoanilino-4-anilino-6-chloro-cyanuric chloride, 2-m-sulfoanilino-4-(p-vinylsulfone sulfate anilino)-6-chloro-cyanuric chloride, 2-o-sulfoanilino-4-(p-vinylsulfone sulfate anilino)-6-chloro-cyanuric chloride, 2-p-methylanilino-4-(p-vinylsulfone sulfate anilino)-6-chloro-cyanuric chloride, 2-p-chloroanilino-4-(p-vinylsulfone sulfate anilino)-6-chloro-cyanuric chloride, 2-(2,5-sulfoanilino)-4-(p-vinylsulfone sulfate anilino)-6-chloro-cyanuric chloride were used in place of cyanuric chloride of example 192 to be condensed with the amino-comprising azo dye. The azo dye comprising triazinyl group and nitro group obtained was reduced with sodium sulfide and finally reacted with polymaleic anhydride, to obtain a polycarboxylic acid dye with low polymerization degree. The other conditions were same as example 192.

EXAMPLE 213

1-13.8 g of 1-naphthylamine in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the naphthylamine. The reaction was stopped after 30 min, and 0.1 g of sulfamic acid was then added; during which period, 1-17.4 g of 1-naphthylamine was taken up in 200 ml of water. The diazo salt of 1-naphthylamine was added. After 4 h, the coupling reaction was stopped, filtered and dried to obtain an amino-comprising azo dye.

1-2.9 g of the amino-comprising azo dye in 10-40 ml of butanone was added with 1-2.45 g of polymaleic anhydride and stirred at 30-80° C. for 1-24 h. The reaction was cooled and filtered. The filter cake was dried to obtain a polycarboxylic acid dye with low polymerization degree.

EXAMPLES 214-218

4-bromo-1-naphthylamine, sodium 4-amino-1-naphthalene sulfonate, 1-naphthylamine-6-sulfonic acid, 1-naphthylamine-7-sulfonic acid, 1-naphthylamine-5-sulfonic acid were used in place of 1-naphthylamine to be reacted with sodium nitrite of example 213 and then reacted with 1-naphthylamine. The amino-comprising azo dye obtained was further reacted with polymaleic anhydride of example 213 to obtain a polycarboxylic acid dye with low polymerization degree. The other conditions were same as example 213.

EXAMPLE 219

1-13.8 g of 1-nitro-4-aminonaphthalene in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the 1-nitro-4-aminonaphthalene solution. The reaction was stopped after 30 min, and 0.1 g of sulfamic acid was then added. This diazo salt was added into the 1-naphthylamine and coupled for 4-10 h, to obtain an azo dye comprising nitro group and amino group.

1-18.4 g of cyanuric chloride was placed into a beaker. A small amount of crushed ice and water were added for pulping for 0.1-1 h. The azo dye solution above was added and condensed for 4-5 h to obtain an azo dye comprising triazinyl group and nitro group.

1-5 g of the nitro-comprising azo dye was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. An amaranth substance precipitated. The reaction was cooled to 20° C. and filtered. The filter cake was dried to obtain an amino-comprising azo dye.

1-2.9 g of the amino-comprising azo dye in 10-40 ml of butanone was added with 1-2.45 g of polymaleic anhydride and stirred at 30-80° C. for 1-24 h. The reaction was cooled and filtered, and the filter cake was dried. A polycarboxylic acid dye with low polymerization degree was obtained.

EXAMPLES 220-239

2-hydroxy-4,6-dichloro-cyanuric chloride, 2-methoxy-4,6-dichloro-cyanuric chloride, 2-ethoxy-4,6-dichloro-cyanuric chloride, 2-anilino-4,6-dichloro-cyanuric chloride, 2-p-sulfoanilino-4,6-dichloro-cyanuric chloride, 2-m-sulfoanilino-4,6-dichloro-cyanuric chloride, 2-o-sulfoanilino-4,6-dichloro-cyanuric chloride, 2-p-methylanilino-4,6-dichloro-cyanuric chloride, 2-p-chloroanilino-4,6-dichloro-cyanuric chloride, 2-(2,5-sulfoanilino)-4,6-dichloro-cyanuric chloride, 2-hydroxy-4-hydroxy-6-chloro-cyanuric chloride, 2-methoxy-4-methoxy-6-chloro-cyanuric chloride, 2-ethoxy-4-ethoxy-6-chloro-cyanuric chloride, 2-anilino-4-anilino-6-chloro-cyanuric chloride, 2-p-sulfoanilino-4-anilino-6-chloro-cyanuric chloride, 2-m-sulfoanilino-4-(p-vinylsulfone sulfate anilino)-6-chloro-cyanuric chloride, 2-o-sulfoanilino-4-(p-vinylsulfone sulfate anilino)-6-chloro-cyanuric chloride, 2-p-methylanilino-4-(p-vinylsulfone sulfate anilino)-6-chloro-cyanuric chloride, 2-p-chloroanilino-4-(pvinylsulfone sulfate anilino)-6-chloro-cyanuric chloride, 2-(2,5-sulfoanilino)-4-(p-vinylsulfone sulfate anilino)-6-chloro-cyanuric chloride were used in place of cyanuric chloride of example 167 to be condensed with the 1-amino-8-naphthol-3,6-disulfonic acid and reduced with sodium sulfide. The azo dye comprising triazinyl group and amino group obtained was finally reacted with polymaleic anhydride, to obtain a polycarboxylic acid dye with low polymerization degree. The other conditions were same as example 167.

EXAMPLE 240

1-15 g of 2-hydroxy-1-naphthylamine in 5-50 ml of water was added with 1-25 ml of concentrated hydrochloric acid to be dissolved completely while stirring. 0.5-7.25 g of sodium nitrite was dissolved in 5-30 ml of water, and added into the 2-hydroxy-1-naphthylamine. The reaction was stopped after 30 min, and 0.1 g of sulfamic acid was then added; during which period, 1-15 g of 2-hydroxy-1-naphthylamine was taken up in 200 ml of water. The diazo salt of 2-hydroxy-1-naphthylamine was added. After 4 h, the coupling reaction was stopped to obtain an azo dye comprising hydroxy group and amino group.

The precipitate of chromic hydroxide was added with water and stirred to produce a 8-10% pulp. Formic acid was then added. The reaction was heated gradually to 90° C. to obtain a transparent liquor of chromium formate, to which the azo dye above was added at the boiling temperature over 12-24 h. Filtrating provided a chromium-complexed dye.

1-2.9 g of the amino-comprising chromium-complexed azo dye in 10-40 ml of butanone was added with 1-2.45 g of polymaleic anhydride and stirred at 30-80° C. for 1-24 h. The reaction was cooled and filtered, and the filter cake was dried. A polycarboxylic acid dye with low polymerization degree was obtained.

EXAMPLES 241-243

Cobalt chloride, copper sulfate, iron chloride were used in place of chromium formate to be complexed with the azo dye of example 240. The cobalt complexed, copper complexed and iron complexed dyes obtained respectively were then condensed with polymaleic anhydride to obtain a metal complexed-polycarboxylic acid dye with low polymerization degree

EXAMPLE 244

1-15 g of 2-hydroxy-4-nitro-1-naphthylamine in 5-50 ml of water was added with 1-25 ml of concentrated hydrochloric acid to be dissolved completely while stirring. 0.5-7.25 g of sodium nitrite was dissolved in 5-30 ml of water, and added into the 2-hydroxy-4-nitro-1-naphthylamine. The reaction was stopped after 30 min, and 0.1 g of sulfamic acid was then added; during which period, 1-15 g of 2-hydroxy-1-amino naphthalene was taken up in 200 ml of water. The diazo salt of 2-hydroxy-4-nitro-1-naphthylamine was added. After 4 h, the coupling reaction was stopped to obtain an azo dye comprising hydroxy group and amino group.

The precipitate of chromic hydroxide was added with water and stirred to produce a 8-10% pulp. Formic acid was then added. The reaction was heated gradually to 90° C. to obtain a transparent liquor of chromium formate, to which the azo dye above was added at the boiling temperature over 12-24 h. Filtrating provided a chromium-complexed dye.

1-18.4 g of cyanuric chloride was placed into a beaker. A small amount of crushed ice and water were added for pulping for 0.1-1 h; during which 1-17.4 g of the chromium-complexed azo dye above was added into the cyanuric chloride and condensed for 4-5 h. The temperature was increased to 40° C. Aniline was added and condensed for 4-5 h to obtain a dye comprising triazinyl group and nitro group.

1-5 g of the nitro-comprising azo dye was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. An amaranth substance precipitated. The reaction was cooled to 20° C. and filtered. The filter cake was dried to obtain an amino-comprising azo dye.

1-2.9 g of the amino-comprising chromium-complexed azo dye in 10-40 ml of butanone was added with 1-2.45 g of polymaleic anhydride and stirred at 30-80° C. for 1-24 h. The reaction was cooled and filtered, and the filter cake was dried. A polycarboxylic acid dye with low polymerization degree was obtained.

EXAMPLES 245-264

2-hydroxy-4,6-dichloro-cyanuric chloride, 2-methoxy-4,6-dichloro-cyanuric chloride, 2-ethoxy-4,6-dichloro-cyanuric chloride, 2-anilino-4,6-dichloro-cyanuric chloride, 2-p-sulfoanilino-4,6-dichloro-cyanuric chloride, 2-m-sulfoanilino-4,6-dichloro-cyanuric chloride, 2-o-sulfoanilino-4,6-dichloro-cyanuric chloride, 2-p-methylanilino-4,6-dichloro-cyanuric chloride, 2-p-chloroanilino-4,6-dichloro-cyanuric chloride, 2-(2,5-sulfoanilino)-4,6-dichloro-cyanuric chloride, 2-hydroxy-4-hydroxy-6-chloro-cyanuric chloride, 2-methoxy-4-methoxy-6-chloro-cyanuric chloride, 2-ethoxy-4-ethoxy-6-chloro-cyanuric chloride, 2-anilino-4-anilino-6-chloro-cyanuric chloride, 2-p-sulfoanilino-4-anilino-6-chloro-cyanuric chloride, 2-m-sulfoanilino-4-(p-vinylsulfone sulfate anilino)-6-chloro-cyanuric chloride, 2-o-sulfoanilino-4-(p-vinylsulfone sulfate anilino)-6-chloro-cyanuric chloride, 2-p-methylanilino-4-(p-vinylsulfone sulfate anilino)-6-chloro-cyanuric chloride, 2-p-chloroanilino-4-(p-vinylsulfone sulfate anilino)-6-chloro-cyanuric chloride, 2-(2,5-sulfoanilino)-4-(p-vinylsulfone sulfate anilino)-6-chloro-cyanuric chloride were used in place of cyanuric chloride of example 244 to be condensed with the amino-comprising azo dye. The azo dye comprising triazinyl group and nitro group obtained was reduced with sodium sulfide and finally reacted with polymaleic anhydride, to obtain a polycarboxylic acid dye with low polymerization degree. The other conditions were same as example 244.

EXAMPLE 265

1-11 g of 1-naphthylamine in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the 1-naphthylamine. The reaction was stopped after 30 min, and 0.1 g of sulfamic acid was then added; during which period, 1-12 g 2-naphthol was taken up in 200 ml of water. The diazo salt of 1-naphthylamine was added. After 4 h, the coupling reaction was stopped, filtered and dried to obtain a hydroxy-comprising azo dye.

1-2.9 g of the hydroxy-comprising azo dye in 10-40 ml of butanone was added with 1-2.45 g of polymaleic anhydride and stirred at 30-80° C. for 1-24 h. The reaction was cooled and filtered. The filter cake was dried to obtain a polycarboxylic acid dye with low polymerization degree.

EXAMPLES 266-270

4-bromo-1-naphthylamine, sodium 4-amino-1-naphthalene sulfonate, 1-naphthylamine-6-sulfonic acid, 1-naphthylamine-7-sulfonic acid, 1-naphthylamine-5-sulfonic acid were used in place of 1-naphthylamine to be reacted with sodium nitrite of example 265 and then reacted with 2-naphthol. The hydroxy-comprising azo dye obtained was further reacted with polymaleic anhydride of example 265 to obtain a polycarboxylic acid dye with low polymerization degree. The other conditions were same as example 265.

EXAMPLE 271

1-11 g of 1-nitro-4-naphthylamine in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the 1-naphthylamine. The reaction was stopped after 30 min, and 0.1 g of sulfamic acid was then added; during which period, 1-12 g of 2-naphthol was taken up in 200 ml of water. The diazo salt of 1-naphthylamine was added. After 4 h, the coupling reaction was stopped, filtered and dried to obtain an azo dye comprising hydroxy group and nitro group.

1-5 g of the nitro-comprising azo dye was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. An amaranth substance precipitated. The reaction was cooled to 20° C. and filtered. The filter cake was dried to obtain an amino-comprising azo dye.

1-18.4 g of cyanuric chloride was placed into a beaker. A small amount of crushed ice and water were added for pulping for 0.1-1 h; during which 1-17.4 g of the amino-comprising azo dye above was added into the cyanuric chloride and condensed for 4-5 h. The temperature was increased to 40° C. Aniline was added and condensed for 4-5 h to obtain a dye comprising triazinyl group and hydroxy group.

1-2.9 g of the hydroxy-comprising azo dye in 10-40 ml of butanone was added with 1-2.45 g of polymaleic anhydride and stirred at 30-80° C. for 1-24 h. The reaction was cooled and filtered. The filter cake was dried to obtain a polycarboxylic acid dye with low polymerization degree.

EXAMPLES 272-291

2-hydroxy-4,6-dichloro-cyanuric chloride, 2-methoxy-4,6-dichloro-cyanuric chloride, 2-ethoxy-4,6-dichloro-cyanuric chloride, 2-anilino-4,6-dichloro-cyanuric chloride, 2-p-sulfoanilino-4,6-dichloro-cyanuric chloride, 2-m-sulfoanilino-4,6-dichloro-cyanuric chloride, 2-o-sulfoanilino-4,6-dichloro-cyanuric chloride, 2-p-methylanilino-4,6-dichloro-cyanuric chloride, 2-p-chloroanilino-4,6-dichloro-cyanuric chloride, 2-(2,5-sulfoanilino)-4,6-dichloro-cyanuric chloride, 2-hydroxy-4-hydroxy-6-chloro-cyanuric chloride, 2-methoxy-4-methoxy-6-chloro-cyanuric chloride, 2-ethoxy-4-ethoxy-6-chloro-cyanuric chloride, 2-anilino-4-anilino-6-chloro-cyanuric chloride, 2-p-sulfoanilino-4-anilino-6-chloro-cyanuric chloride, 2-m-sulfoanilino-4-(p-vinylsulfone sulfate anilino)-6-chloro-cyanuric chloride, 2-o-sulfoanilino-4-(p-vinylsulfone sulfate anilino)-6-chloro-cyanuric chloride, 2-p-methylanilino-4-(p-vinylsulfone sulfate anilino)-6-chloro-cyanuric chloride, 2-p-chloroanilino-4-(pvinylsulfone sulfate anilino)-6-chloro-cyanuric chloride, 2-(2,5-sulfoanilino)-4-(p-vinylsulfone sulfate anilino)-6-chloro-cyanuric chloride were used in place of cyanuric chloride of example 271 to be condensed with the amino-comprising azo dye. The azo dye comprising triazinyl group and hydroxy group obtained was finally reacted with polymaleic anhydride, to obtain a polycarboxylic acid dye with low polymerization degree. The other conditions were same as example 271.

EXAMPLE 292

1-13.8 g of p-nitroaniline in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the p-nitroaniline solution. The reaction was stopped after 30 min, and 0.1 g of sulfamic acid was then added; during which period, 1-17.4 g of 1,1'-dihydroxy-3,3'-sulfonic-6-dinaphthyl urea was taken up in 200 ml of water. The pH was adjusted to about 9, and then the diazo salt of p-nitroaniline was added. After 4 h, the coupling reaction was stopped to obtain an azo dye.

1-5 g of the nitro-comprising azo dye was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. There was a precipitate. The reaction was cooled to 20° C. and filtered. The filter cake was dried to obtain an amino-comprising azo dye.

1-2.9 g of the amino-comprising bisazo dye in 10-40 ml of butanone was added with 1-2.45 g of polymaleic anhydride and stirred at 30-80° C. for 1-24 h. The reaction was cooled and filtered, and the filter cake was dried. A polycarboxylic acid dye with low polymerization degree was obtained.

EXAMPLES 293-295

O-nitroaniline, m-nitroaniline, 1-nitro-4-naphthylamine were used in place of p-nitroaniline to be reacted with the sodium nitrite of example 292, then reacted with 1,1'-dihydroxy-3,3'-sulfonic-6-dinaphthyl urea. The nitro-comprising monoazo dye obtained was reacted with the sodium sulfide of example 292. The amino-comprising azo dye obtained was finally reacted with the polymaleic anhydride of example 292, to obtain a polycarboxylic acid dye with low polymerization degree. The other conditions were same as example 292.

EXAMPLE 296

1-13.8 g of p-nitroaniline in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the p-nitroaniline solution. The reaction was stopped after 30 min, and 0.1 g of sulfamic acid was then added; during which period, 1-17.4 g of 1,1'-dihydroxy-3,3'-sulfonic-8,8'-diamino-6-dinaphthyl urea was taken up in 200 ml of water. The pH was adjusted to about 9, and then the diazo salt of p-nitroaniline was added. After 4 h, the coupling reaction was stopped to obtain an azo dye.

1-18.4 g of cyanuric chloride was placed into a beaker. A small amount of crushed ice and water were added for pulping for 0.1-1 h; during which 1-17.4 g of the amino-comprising azo dye above was added into the cyanuric chloride and condensed for 4-5 h. The temperature was increased to 40° C. Aniline was added and condensed for 4-5 h to obtain a dye comprising triazinyl group and nitro group.

1-5 g of the nitro-comprising azo dye was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. The reaction was cooled to 20° C. and filtered. The filter cake was dried to obtain an amino-comprising azo dye.

1-2.9 g of the amino-comprising bisazo dye in 10-40 ml of butanone was added with 1-2.45 g of polymaleic anhydride and stirred at 30-80° C. for 1-24 h. The reaction was cooled and filtered, and the filter cake was dried. A polycarboxylic acid dye with low polymerization degree was obtained.

EXAMPLES 297-316

2-hydroxy-4,6-dichloro-cyanuric chloride, 2-methoxy-4,6-dichloro-cyanuric chloride, 2-ethoxy-4,6-dichloro-cyanuric chloride, 2-anilino-4,6-dichloro-cyanuric chloride, 2-p-sulfoanilino-4,6-dichloro-cyanuric chloride, 2-m-sulfoanilino-4,6-dichloro-cyanuric chloride, 2-o-sulfoanilino-4,6-dichloro-cyanuric chloride, 2-p-methylanilino-4,6-dichloro-cyanuric chloride, 2-p-chloroanilino-4,6-dichloro-cyanuric chloride, 2-(2,5-sulfoanilino)-4,6-dichloro-cyanuric chloride, 2-hydroxy-4-hydroxy-6-chloro-cyanuric chloride, 2-methoxy-4-methoxy-6-chloro-cyanuric chloride, 2-ethoxy-4-ethoxy-6-chloro-cyanuric chloride, 2-anilino-4-anilino-6-chloro-cyanuric chloride, 2-p-sulfoanilino-4-anilino-6-chloro-cyanuric chloride, 2-m-sulfoanilino-4-(p-vinylsulfone sulfate anilino)-6-chloro-cyanuric chloride, 2-o-sulfoanilino-4-(p-vinylsulfone sulfate anilino)-6-chloro-cyanuric chloride, 2-p-methylanilino-4-(p-vinylsulfone sulfate anilino)-6-chloro-cyanuric chloride, 2-p-chloroanilino-4-(pvinylsulfone sulfate anilino)-6-chloro-cyanuric chloride, 2-(2,5-sulfoanilino)-4-(p-vinylsulfone sulfate anilino)-6-chloro-cyanuric chloride were used in place of cyanuric chloride of example 296 to be condensed with the amino-comprising azo dye. The azo dye comprising triazinyl group and nitro group obtained was reduced with sodium sulfide and finally reacted with polymaleic anhydride, to obtain a polycarboxylic acid dye with low polymerization degree. The other conditions were same as example 296.

EXAMPLE 317

1-6 g of p-nitroaniline in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the p-nitroaniline solution. After 30 min, 0.1 g of sulfamic acid was then added. 1-5 g of 2-naphthylamine-6-sulfonic acid in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the 2-naphthylamine-6-sulfonic acid. The reaction was stopped after 30 min, and 0.1 g of sulfamic acid was then added; during which period, 1-17.4 g of 1,1'-dihydroxy-3,3'-sulfonic-6-dinaphthyl urea was taken up in 200 ml of water. The pH was adjusted to about 9, and then the diazo salt of p-nitroaniline was added. After 4 h, the diazo salt of 2-naphthylamine-6-sulfonic acid was added, and the coupling reaction was stopped, to obtain an azo dye.

1-5 g of the nitro-comprising azo dye was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. There was a precipitate. The reaction was cooled to 20° C. and filtered. The filter cake was dried to obtain an amino-comprising azo dye.

1-2.9 g of the amino-comprising bisazo dye in 10-40 ml of butanone was added with 1-2.45 g of polymaleic anhydride and stirred at 30-80° C. for 1-24 h. The reaction was cooled and filtered, and the filter cake was dried. A polycarboxylic acid dye with low polymerization degree was obtained.

EXAMPLE 318

1-6 g of p-nitroaniline in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the p-nitroaniline solution. After 30 min, 0.1 g of sulfamic acid was then added. 1-5 g of 2-naphthylamine-6-sulfonic acid in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the 2-naphthylamine-6-sulfonic acid. The reaction was stopped after 30 min, and 0.1 g of sulfamic acid was then added; during which period, 1-17.4 g of 1,1'-dihydroxy-3,3'-sulfonic-8,8'-diamino-6-dinaphthyl urea was taken up in 200 ml of water. The pH was adjusted to about 9, and then the diazo salt of p-nitroaniline was added. After 4 h, the diazo salt of 2-naphthylamine-6-sulfonic acid was added, and the coupling reaction was stopped, to obtain an azo dye.

1-18.4 g of cyanuric chloride was placed into a beaker. A small amount of crushed ice and water were added for pulping for 0.1-1 h; during which 1-17.4 g of the amino-comprising azo dye above was added into the cyanuric chloride and condensed for 4-5 h. The temperature was increased to 40° C. Aniline was added and condensed for 4-5 h to obtain a dye comprising triazinyl group and nitro group.

1-5 g of the nitro-comprising azo dye was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. There was a precipitate. The reaction was cooled to 20° C. and filtered. The filter cake was dried to obtain an amino-comprising azo dye.

1-2.9 g of the amino-comprising bisazo dye in 10-40 ml of butanone was added with 1-2.45 g of polymaleic anhydride and stirred at 30-80° C. for 1-24 h. The reaction was cooled and filtered, and the filter cake was dried. A polycarboxylic acid dye with low polymerization degree was obtained.

EXAMPLES 319-338

2-hydroxy-4,6-dichloro-cyanuric chloride, 2-methoxy-4,6-dichloro-cyanuric chloride, 2-ethoxy-4,6-dichloro-cyanuric chloride, 2-anilino-4,6-dichloro-cyanuric chloride, 2-p-sulfoanilino-4,6-dichloro-cyanuric chloride, 2-m-sulfoanilino-4,6-dichloro-cyanuric chloride, 2-o-sulfoanilino-4,6-dichloro-cyanuric chloride, 2-p-methylanilino-4,6-dichloro-cyanuric chloride, 2-p-chloroanilino-4,6-dichloro-cyanuric chloride, 2-(2,5-sulfoanilino)-4,6-dichloro-cyanuric chloride, 2-hydroxy-4-hydroxy-6-chloro-cyanuric chloride, 2-methoxy-4-methoxy-6-chloro-cyanuric chloride, 2-ethoxy-4-ethoxy-6-chloro-cyanuric chloride, 2-anilino-4-anilino-6-chloro-cyanuric chloride, 2-p-sulfoanilino-4-anilino-6-chloro-cyanuric chloride, 2-m-sulfoanilino-4-(p-vinylsulfone sulfate anilino)-6-chloro-cyanuric chloride, 2-o-sulfoanilino-4-(p-vinylsulfone sulfate anilino)-6-chloro-cyanuric chloride, 2-p-methylanilino-4-(p-vinylsulfone sulfate anilino)-6-chloro-cyanuric chloride, 2-p-chloroanilino-4-(pvinylsulfone sulfate anilino)-6-chloro-cyanuric chloride, 2-(2,5-sulfoanilino)-4-(p-vinylsulfone sulfate anilino)-6-chloro-cyanuric chloride were used in place of cyanuric chloride of example 318 to be condensed with the amino-comprising azo dye. The azo dye comprising triazinyl group and nitro group obtained was reduced with sodium sulfide and finally reacted with polymaleic anhydride, to obtain a polycarboxylic acid dye with low polymerization degree. The other conditions were same as example 318.

EXAMPLE 339

1-6 g of aniline in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the p-nitroaniline solution. After 30 min, 0.1 g of sulfamic acid was then added. 1-5 g of 2-amino-5-nitro-naphthalene in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the 2-amino-5-nitro-naphthalene. The reaction was stopped after 30 min, and 0.1 g of sulfamic acid was then added; during which period, 1-17.4 g of 1,1'-dihydroxy-3,3'-sulfonic-6-dinaphthyl urea was taken up in 200 ml of water. The pH was adjusted to about 9, and then the diazo salt of aniline was added. After 4 h, the diazo salt of 2-amino-5-nitro-naphthalene was added, and the coupling reaction was stopped to obtain an azo dye.

1-5 g of the nitro-comprising azo dye was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. There was a precipitate. The reaction was cooled to 20° C. and filtered. The filter cake was dried to obtain an amino-comprising azo dye.

1-2.9 g of the amino-comprising bisazo dye in 10-40 ml of butanone was added with 1-2.45 g of polymaleic anhydride and stirred at 30-80° C. for 1-24 h. The reaction was cooled and filtered, and the filter cake was dried. A polycarboxylic acid dye with low polymerization degree was obtained.

EXAMPLE 340

1-6 g of aniline in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the p-nitroaniline solution. After 30 min, 0.1 g of sulfamic acid was then added. 1-5 g of 2-amino-5-nitro-naphthalene in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the 2-amino-5-nitro-naphthalene. The reaction was stopped after 30 min, and 0.1 g of sulfamic acid was then added; during which period, 1-17.4 g of 1,1'-dihydroxy-3,3'-sulfonic-8,8'-diamino-6-dinaphthyl urea was taken up in 200 ml of water. The pH was adjusted to about 9, and then the diazo salt of aniline was added. After 4 h, the diazo salt of 2-amino-5-nitro-naphthalene was added, and the coupling reaction was stopped, to obtain an azo dye.

1-18.4 g of cyanuric chloride was placed into a beaker. A small amount of crushed ice and water were added for pulping for 0.1-1 h; during which 1-17.4 g of the amino-comprising azo dye above was added into the cyanuric chloride and condensed for 4-5 h. The temperature was increased to 40° C. Aniline was added and condensed for 4-5 h to obtain a dye comprising triazinyl group and nitro group.

1-5 g of the nitro-comprising azo dye was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. There was a precipitate. The reaction was cooled to 20° C. and filtered. The filter cake was dried to obtain an amino-comprising azo dye.

1-2.9 g of the amino-comprising bisazo dye in 10-40 ml of butanone was added with 1-2.45 g of polymaleic anhydride and stirred at 30-80° C. for 1-24 h. The reaction was cooled and filtered, and the filter cake was dried. A polycarboxylic acid dye with low polymerization degree was obtained.

EXAMPLES 341-360

2-hydroxy-4,6-dichloro-cyanuric chloride, 2-methoxy-4,6-dichloro-cyanuric chloride, 2-ethoxy-4,6-dichloro-cyanuric chloride, 2-anilino-4,6-dichloro-cyanuric chloride, 2-p-sulfoanilino-4,6-dichloro-cyanuric chloride, 2-m-sulfoanilino-4,6-dichloro-cyanuric chloride, 2-o-sulfoanilino-4,6-dichloro-cyanuric chloride, 2-p-methylanilino-4,6-dichloro-cyanuric chloride, 2-p-chloroanilino-4,6-dichloro-cyanuric chloride, 2-(2,5-sulfoanilino)-4,6-dichloro-cyanuric chloride, 2-hydroxy-4-hydroxy-6-chloro-cyanuric chloride, 2-methoxy-4-methoxy-6-chloro-cyanuric chloride, 2-ethoxy-4-ethoxy-6-chloro-cyanuric chloride, 2-anilino-4-anilino-6-chloro-cyanuric chloride, 2-p-sulfoanilino-4-anilino-6-chloro-cyanuric chloride, 2-m-sulfoanilino-4-(p-vinylsulfone sulfate anilino)-6-chloro-cyanuric chloride, 2-o-sulfoanilino-4-(pvinylsulfone sulfate anilino)-6-chloro-cyanuric chloride, 2-p-methylanilino-4-(p-vinylsulfone sulfate anilino)-6-chloro-cyanuric chloride, 2-p-chloroanilino-4-(p-vinylsulfone sulfate anilino)-6-chloro-cyanuric chloride, 2-(2,5-sulfoanilino)-4-(p-vinylsulfone sulfate anilino)-6-chloro-cyanuric chloride were used in place of cyanuric chloride of example 340 to be condensed with the amino-comprising azo dye. The azo dye comprising triazinyl group and nitro group obtained was reduced with sodium sulfide and finally reacted with polymaleic anhydride, to obtain a polycarboxylic acid dye with low polymerization degree. The other conditions were same as example 340.

EXAMPLE 361

1-6 g of 2-amino-5-nitro-naphthalene in 5-50 ml of water was added with 1-25 ml of concentrated hydrochloric acid, heated to be dissolved completely while stirring, and cooled rapidly to 0-5° C. 0.5-7.50 g of sodium nitrite was dissolved in 5-30 ml of water, and added into the p-nitroaniline solution. After 30 min, 0.1 g of sulfamic acid was then added; during which period, 1-8 g of 1,1'-dihydroxy-3,3'-sulfonic-6-dinaphthyl urea was taken up in 200 ml of water. The pH was adjusted to about 9, and then the diazo salt of p-nitroaniline was added. After 4 h, the coupling reaction was stopped to obtain an azo dye.

1-5 g of the nitro-comprising azo dye was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. There was a precipitate. The reaction was cooled to 20° C. and filtered. The filter cake was dried to obtain an amino-comprising azo dye.

1-2.9 g of the amino-comprising bisazo dye in 10-40 ml of butanone was added with 1-2.45 g of polymaleic anhydride and stirred at 30-80° C. for 1-24 h. The reaction was cooled and filtered, and the filter cake was dried. A polycarboxylic acid dye with low polymerization degree was obtained.

EXAMPLE 362

1-10 g of 2-amino-5-nitro-naphthalene in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the 2-amino-5-nitro-naphthalene. The reaction was stopped after 30 min, and 0.1 g of sulfamic acid was then added; during which period, 1-17.4 g of 1,1'-dihydroxy-3,3'-sulfonic-8,8'-diamino-6-dinaphthyl urea was taken up in 200 ml of water. The pH was adjusted to about 9, and then the diazo salt of aniline was added. After 4 h, the diazo salt of 2-amino-5-nitro-naphthalene was added, and the coupling reaction was stopped, to obtain an azo dye.

1-18.4 g of cyanuric chloride was placed into a beaker. A small amount of crushed ice and water were added for pulping for 0.1-1 h; during which 1-17.4 g of the amino-comprising azo dye above was added into the cyanuric chloride and condensed for 4-5 h. The temperature was increased to 40° C. Aniline was added and condensed for 4-5 h to obtain a dye comprising triazinyl group and nitro group.

1-5 g of the nitro-comprising azo dye was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. There was a precipitate. The reaction was cooled to 20° C. and filtered. The filter cake was dried to obtain an amino-comprising azo dye.

1-2.9 g of the amino-comprising bisazo dye in 10-40 ml of butanone was added with 1-2.45 g of polymaleic anhydride and stirred at 30-80° C. for 1-24 h. The reaction was cooled and filtered, and the filter cake was dried. A polycarboxylic acid dye with low polymerization degree was obtained.

EXAMPLES 363-382

2-hydroxy-4,6-dichloro-cyanuric chloride, 2-methoxy-4,6-dichloro-cyanuric chloride, 2-ethoxy-4,6-dichloro-cyanuric chloride, 2-anilino-4,6-dichloro-cyanuric chloride, 2-p-sulfoanilino-4,6-dichloro-cyanuric chloride, 2-m-sulfoanilino-4,6-dichloro-cyanuric chloride, 2-o-sulfoanilino-4,6-dichloro-cyanuric chloride, 2-p-methylanilino-4,6-dichloro-cyanuric chloride, 2-p-chloroanilino-4,6-dichloro-cyanuric chloride, 2-(2,5-sulfoanilino)-4,6-dichloro-cyanuric chloride, 2-hydroxy-4-hydroxy-6-chloro-cyanuric chloride, 2-methoxy-4-methoxy-6-chloro-cyanuric chloride, 2-ethoxy-4-ethoxy-6-chloro-cyanuric chloride, 2-anilino-4-anilino-6-chloro-cyanuric chloride, 2-p-sulfoanilino-4-anilino-6-chloro-cyanuric chloride, 2-m-sulfoanilino-4-(p-vinylsulfone sulfate anilino)-6-chloro-cyanuric chloride, 2-o-sulfoanilino-4-(p-vinylsulfone sulfate anilino)-6-chloro-cyanuric chloride, 2-p-methylanilino-4-(p-vinylsulfone sulfate anilino)-6-chloro-cyanuric chloride, 2-p-chloroanilino-4-(pvinylsulfone sulfate anilino)-6-chloro-cyanuric chloride, 2-(2,5-sulfoanilino)-4-

(p-vinylsulfone sulfate anilino)-6-chloro-cyanuric chloride were used in place of cyanuric chloride of example 362 to be condensed with the amino-comprising azo dye. The azo dye comprising triazinyl group and nitro group obtained was reduced with sodium sulfide and finally reacted with polymaleic anhydride, to obtain a polycarboxylic acid dye with low polymerization degree. The other conditions were same as example 362.

EXAMPLE 383

1-13.8 g of 4,4-diamino benzoyl aniline in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the naphthylamine. The reaction was stopped after 30 min, and 0.1 g of sulfamic acid was then added; during which period, 1-17.4 g of 1-acetoamido-8-hydroxy-3,6-naphthalene disulfonic acid was taken up in 200 ml of water. The diazo salt of 4,4-diamino benzoyl aniline was added. After 4 h, the coupling reaction was stopped, filtered and dried to obtain an amido-comprising azo dye.

1-5 g of the amido-comprising azo dye was dissolved in 10-100 ml of water and heated to 50-100° C. 2-7.4 g of sodium hydroxide was dissolved in 10-50 ml of water, which was added dropwise with a constant pressure dropping funnel. After completion of addition, the reaction was carried out at a constant temperature for 1-8 h. The reaction was cooled to 20° C. and filtered. The filter cake was dried to obtain an amino-comprising azo dye.

1-2.9 g of the amino-comprising azo dye in 10-40 ml of butanone was added with 1-2.45 g of polymaleic anhydride and stirred at 30-80° C. for 1-24 h. The reaction was cooled and filtered, and the filter cake was dried. A red polycarboxylic acid dye with low polymerization degree was obtained.

EXAMPLES 384-386

2-acetoamido-5-naphthol-7-sulfonic acid, 2-acetoamido-5-naphthol-7-sulfonic acid, 2-acetoamido-8-naphthol-6-sulfonic acid were used in place of the 1-acetoamido-8-hydroxy-3,6-naphthalene disulfonic acid of example 383, condensed with the diazo salt of 4,4-diamino benzoyl aniline to obtain a corresponding amido-comprising dye, from which an amino-comprising dye was obtained by hydrolysis and then reacted with polymaleic anhydride to obtain a polycarboxylic acid dye with low polymerization degree. The other conditions were same as example 383.

EXAMPLE 387

1-13.8 g of 4,4-diamino benzoyl aniline in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the naphthylamine. The reaction was stopped after 30 min, and 0.1 g of sulfamic acid was then added; during which period, 1-17.4 g of 1-acetoamido-8-hydroxy-3,6-naphthalene disulfonic acid was taken up in 200 ml of water. The diazo salt of 4,4-diamino benzoyl aniline was added. After 4 h, the coupling reaction was stopped, filtered and dried to obtain an amido-comprising azo dye.

1-5 g of the amido-comprising azo dye was dissolved in 10-100 ml of water and heated to 50-100° C. 2-7.4 g of sodium hydroxide was dissolved in 10-50 ml of water, which was added dropwise with a constant pressure dropping funnel. After completion of addition, the reaction was carried out at a constant temperature for 1-8 h. The reaction was cooled to 20° C. and filtered. The filter cake was dried to obtain an amino-comprising azo dye.

1-9 g of cyanuric chloride was placed into a beaker. A small amount of crushed ice and water were added for pulping for 0.1-1 h; during which, 1-17.4 g of the amino-comprising azo dye above was added into the cyanuric chloride and condensate for 4-5 h to obtain a dye comprising triazinyl group and amino group.

1-2.9 g of the amino-comprising azo dye in 10-40 ml of butanone was added with 1-2.45 g of polymaleic anhydride and stirred at 30-80° C. for 1-24 h. The reaction was cooled and filtered, and the filter cake was dried. A red polycarboxylic acid dye with low polymerization degree was obtained.

EXAMPLES 388-407

2-hydroxy-4,6-dichloro-cyanuric chloride, 2-methoxy-4,6-dichloro-cyanuric chloride, 2-ethoxy-4,6-dichloro-cyanuric chloride, 2-anilino-4,6-dichloro-cyanuric chloride, 2-p-sulfoanilino-4,6-dichloro-cyanuric chloride, 2-m-sulfoanilino-4,6-dichloro-cyanuric chloride, 2-o-sulfoanilino-4,6-dichloro-cyanuric chloride, 2-p-methylanilino-4,6-dichloro-cyanuric chloride, 2-p-chloroanilino-4,6-dichloro-cyanuric chloride, 2-(2,5-sulfoanilino)-4,6-dichloro-cyanuric chloride, 2-hydroxy-4-hydroxy-6-chloro-cyanuric chloride, 2-methoxy-4-methoxy-6-chloro-cyanuric chloride, 2-ethoxy-4-ethoxy-6-chloro-cyanuric chloride, 2-anilino-4-anilino-6-chloro-cyanuric chloride, 2-p-sulfoanilino-4-anilino-6-chloro-cyanuric chloride, 2-m-sulfoanilino-4-(p-vinylsulfone sulfate anilino)-6-chloro-cyanuric chloride, 2-o-sulfoanilino-4-(p-vinylsulfone sulfate anilino)-6-chloro-cyanuric chloride, 2-p-methylanilino-4-(p-vinylsulfone sulfate anilino)-6-chloro-cyanuric chloride, 2-p-chloroanilino-4-(pvinylsulfone sulfate anilino)-6-chloro-cyanuric chloride, 2-(2,5-sulfoanilino)-4-(p-vinylsulfone sulfate anilino)-6-chloro-cyanuric chloride were used in place of cyanuric chloride of example 387 to be condensed with the amino-comprising azo dye. The azo dye comprising triazinyl group and amino group obtained was finally reacted with polymaleic anhydride, to obtain a polycarboxylic acid dye with low polymerization degree. The other conditions were same as example 387.

EXAMPLE 408

1-13.8 g of 4,4-diamino benzoyl aniline in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the naphthylamine. The reaction was stopped after 30 min, and 0.1 g of sulfamic acid was then added; during which period, 1-8 g of 1-acetoamido-8-hydroxy-3,6-naphthalene disulfonic acid was taken up in 200 ml of water. The diazo salt of 4,4-diamino benzoyl aniline was added. After 4 h, 1-4 g of phenol was added. After 4 h, the coupling reaction was stopped to obtain an amido-comprising azo dye.

1-5 g of the amido-comprising azo dye was dissolved in 10-100 ml of water and heated to 50-100° C. 2-7.4 g of sodium hydroxide was dissolved in 10-50 ml of water, which was added dropwise with a constant pressure dropping funnel. After completion of addition, the reaction was carried out at a constant temperature for 1-8 h. The reaction was cooled to 20° C. and filtered. The filter cake was dried to obtain an amino-comprising azo dye.

1-2.9 g of the amino-comprising azo dye in 10-40 ml of butanone was added with 1-2.45 g of polymaleic anhydride and stirred at 30-80° C. for 1-24 h. The reaction was cooled and filtered, and the filter cake was dried. A red polycarboxylic acid dye with low polymerization degree was obtained.

EXAMPLE 409

1-13.8 g of 4,4-diamino benzoyl aniline in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the naphthylamine. The reaction was stopped after 30 min, and 0.1 g of sulfamic acid was then added; during which period, 1-8 g of 1-acetoamido-8-hydroxy-3,6-naphthalene disulfonic acid was taken up in 200 ml of water. The diazo salt of 4,4-diamino benzoyl aniline was added. After 4 h, 1-4 g of m-nitrophenol was added. After 4 h, the coupling reaction was stopped to obtain an nitro-comprising azo dye.

1-5 g of the nitro-comprising azo dye was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. There was a precipitate. The reaction was cooled to 20° C. and filtered. The filter cake was dried to obtain an amino-comprising azo dye.

1-18.4 g of cyanuric chloride was placed into a beaker. A small amount of crushed ice and water were added for pulping for 0.1-1 h; during which 1-17.4 g of the amino-comprising azo dye above was added into the cyanuric chloride and condensed for 4-5 h. The temperature was increased to 40° C. Aniline was added and condensed for 4-5 h to obtain a dye comprising triazinyl group and amido group.

1-5 g of the amido-comprising azo dye was dissolved in 10-100 ml of water and heated to 50-100° C. 2-7.4 g of sodium hydroxide was dissolved in 10-50 ml of water, which was added dropwise with a constant pressure dropping funnel. After completion of addition, the reaction was carried out at a constant temperature for 1-8 h. The reaction was cooled to 20° C. and filtered. The filter cake was dried to obtain an amino-comprising azo dye.

1-2.9 g of the amino-comprising azo dye in 10-40 ml of butanone was added with 1-2.45 g of polymaleic anhydride and stirred at 30-80° C. for 1-24 h. The reaction was cooled and filtered, and the filter cake was dried. A red polycarboxylic acid dye with low polymerization degree was obtained.

EXAMPLES 410-429

2-hydroxy-4,6-dichloro-cyanuric chloride, 2-methoxy-4,6-dichloro-cyanuric chloride, 2-ethoxy-4,6-dichloro-cyanuric chloride, 2-anilino-4,6-dichloro-cyanuric chloride, 2-p-sulfoanilino-4,6-dichloro-cyanuric chloride, 2-m-sulfoanilino-4,6-dichloro-cyanuric chloride, 2-o-sulfoanilino-4,6-dichloro-cyanuric chloride, 2-p-methylanilino-4,6-dichloro-cyanuric chloride, 2-p-chloroanilino-4,6-dichloro-cyanuric chloride, 2-(2,5-sulfoanilino)-4,6-dichloro-cyanuric chloride, 2-hydroxy-4-hydroxy-6-chloro-cyanuric chloride, 2-methoxy-4-methoxy-6-chloro-cyanuric chloride, 2-ethoxy-4-ethoxy-6-chloro-cyanuric chloride, 2-anilino-4-anilino-6-chloro-cyanuric chloride, 2-p-sulfoanilino-4-anilino-6-chloro-cyanuric chloride, 2-m-sulfoanilino-4-(p-vinylsulfone sulfate anilino)-6-chloro-cyanuric chloride, 2-o-sulfoanilino-4-(p-vinylsulfone sulfate anilino)-6-chloro-cyanuric chloride, 2-p-methylanilino-4-(p-vinylsulfone sulfate anilino)-6-chloro-cyanuric chloride, 2-p-chloroanilino-4-(pvinylsulfone sulfate anilino)-6-chloro-cyanuric chloride, 2-(2,5-sulfoanilino)-4-(p-vinylsulfone sulfate anilino)-6-chloro-cyanuric chloride were used in place of cyanuric chloride of example 409 to be condensed with the amino dye. The azo dye comprising triazinyl group and amido group obtained was hydrolyzed and finally reacted with polymaleic anhydride, to obtain a polycarboxylic acid dye with low polymerization degree. The other conditions were same as example 409.

EXAMPLE 430

1-13.8 g of 4,4'-diamino diphenyl urea in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the naphthylamine. The reaction was stopped after 30 min, and 0.1 g of sulfamic acid was then added; during which period, 1-17.4 g of 1-acetoamido-8-hydroxy-3,6-naphthalene disulfonic acid was taken up in 200 ml of water. The diazo salt of 4,4'-diamino diphenyl urea was added. After 4 h, the coupling reaction was stopped, filtered and dried to obtain an amido-comprising azo dye.

1-5 g of the amido-comprising azo dye was dissolved in 10-100 ml of water and heated to 50-100° C. 2-7.4 g of sodium hydroxide was dissolved in 10-50 ml of water, which was added dropwise with a constant pressure dropping funnel. After completion of addition, the reaction was carried out at a constant temperature for 1-8 h. The reaction was cooled to 20° C. and filtered. The filter cake was dried to obtain an amino-comprising azo dye.

1-2.9 g of the amino-comprising azo dye in 10-40 ml of butanone was added with 1-2.45 g of polymaleic anhydride and stirred at 30-80° C. for 1-24 h. The reaction was cooled and filtered, and the filter cake was dried. A red polycarboxylic acid dye with low polymerization degree was obtained.

EXAMPLES 431-433

2-acetoamido-5-naphthol-7-sulfonic acid, 2-acetoamido-5-naphthol-7-sulfonic acid, 2-acetoamido-8-naphthol-6-sulfonic acid were used in place of the 1-acetoamido-8-hydroxy-3,6-naphthalene disulfonic acid of example 430, and condensed with the diazo salt of 4,4'-diamino diphenyl urea to obtain a corresponding amido-comprising dye, which was hydrolyzed and then reacted with polymaleic anhydride to obtain a polycarboxylic acid dye with low polymerization degree. The other conditions were same as example 431.

EXAMPLE 434

1-18.4 g of cyanuric chloride was placed into a beaker. A small amount of crushed ice and water were added for pulping for 0.1-1 h; during which, 1-17.4 g of 1-amino-8-naphthol-3,6-disulfonic acid was taken up in 200 ml of water. 2-7.4 g of sodium hydroxide was dissolved in 10-50 ml of water. Cyanuric chloride was added and condensed for 4-5 h. The temperature was increased to 40° C. p-phenylene diamine was added and condensed for 4-5 h to obtain a coupling component comprising triazinyl group and amino group.

1-13.8 g of 4,4'-diamino diphenyl urea in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the naphthylamine. The reaction was stopped after 30 min, and 0.1 g of sulfamic acid was then added. Then, the diazo salt of 4,4'-diamino diphenyl urea was added into the coupling component above. After 4 h, the coupling reaction was stopped to obtain an amino-comprising azo dye.

1-2.9 g of the amino-comprising azo dye in 10-40 ml of butanone was added with 1-2.45 g of polymaleic anhydride and stirred at 30-80° C. for 1-24 h. The reaction was cooled and filtered, and the filter cake was dried. A polycarboxylic acid dye with low polymerization degree was obtained.

EXAMPLES 435-444

2-hydroxy-4,6-dichloro-cyanuric chloride, 2-methoxy-4,6-dichloro-cyanuric chloride, 2-ethoxy-4,6-dichloro-cyanuric chloride, 2-anilino-4,6-dichloro-cyanuric chloride, 2-p-sulfoanilino-4,6-dichloro-cyanuric chloride, 2-m-sulfoanilino-4,6-dichloro-cyanuric chloride, 2-o-sulfoanilino-4,6-dichloro-cyanuric chloride, 2-p-methylanilino-4,6-dichloro-cyanuric chloride, 2-p-chloroanilino-4,6-dichloro-cyanuric chloride, 2-(2,5-sulfoanilino)-4,6-dichloro-cyanuric chloride were used in place of cyanuric chloride of example 434 to be condensed with 1-amino-8-naphthol-3,6-disulfonic acid. The coupling component comprising triazinyl group and hydroxy group obtained was then condensed with m-phenylene diamine, and then coupled with the diazo salt of 4,4'-diamino diphenyl urea of example 434. The amino-comprising azo dye obtained was finally reacted with polymaleic anhydride to obtain a polycarboxylic acid dye with low polymerization degree. The other conditions were same as example 434.

EXAMPLE 445

1-13.8 g of 1,5-diaminonaphthalene in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the naphthylamine. The reaction was stopped after 30 min, and 0.1 g of sulfamic acid was then added; during which period, 1-17.4 g of 1-acetoamido-8-hydroxy-3,6-naphthalene disulfonic acid was taken up in 200 ml of water. The diazo salt of 1,5-diaminonaphthalene was added. After 4 h, the coupling reaction was stopped, filtered and dried to obtain an amido-comprising azo dye.

1-5 g of the amido-comprising azo dye was dissolved in 10-100 ml of water and heated to 50-100° C. 2-7.4 g of sodium hydroxide was dissolved in 10-50 ml of water, which was added dropwise with a constant pressure dropping funnel. After completion of addition, the reaction was carried out at a constant temperature for 1-8 h. The reaction was cooled to 20° C. and filtered. The filter cake was dried to obtain an amino-comprising azo dye.

1-2.9 g of the amino-comprising azo dye in 10-40 ml of butanone was added with 1-2.45 g of polymaleic anhydride and stirred at 30-80° C. for 1-24 h. The reaction was cooled and filtered, and the filter cake was dried. A polycarboxylic acid dye with low polymerization degree was obtained.

EXAMPLES 446-448

2-acetoamido-5-naphthol-7-sulfonic acid, 2-acetoamido-5-naphthol-7-sulfonic acid, 2-acetoamido-8-naphthol-6-sulfonic acid were used in place of the 1-acetoamido-8-hydroxy-3,6-naphthalene disulfonic acid of example 455, reacted with the diazo salt of 1,5-diaminonaphthalene of example 445 to obtain a corresponding amido-comprising dye, which was hydrolyzed and then reacted with polymaleic anhydride of example 445 to obtain a polycarboxylic acid dye with low polymerization degree. The other conditions were same as example 445.

EXAMPLE 449

1-18.4 g of cyanuric chloride was placed into a beaker. A small amount of crushed ice and water were added for pulping for 0.1-1 h; during which, 1-17.4 g of 1-amino-8-naphthol-3,6-disulfonic acid was taken up in 200 ml of water. 2-7.4 g of sodium hydroxide was dissolved in 10-50 ml of water. Cyanuric chloride was added and condensed for 4-5 h and further condensed with p-phenylene diamine for 4 h to obtain a triazinyl-comprising coupling component.

1-13.8 g of 1,5-diaminonaphthalene in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the naphthylamine. The reaction was stopped after 30 min, and 0.1 g of sulfamic acid was then added. Then, the diazo salt of 1,5-diaminonaphthalene was added into the coupling component above. After 4 h, the coupling reaction was stopped to obtain an amino-comprising azo dye.

1-2.9 g of the amino-comprising azo dye in 10-40 ml of butanone was added with 1-2.45 g of polymaleic anhydride and stirred at 30-80° C. for 1-24 h. The reaction was cooled and filtered, and the filter cake was dried. A polycarboxylic acid dye with low polymerization degree was obtained.

EXAMPLES 450-458

2-hydroxy-4,6-dichloro-cyanuric chloride, 2-methoxy-4,6-dichloro-cyanuric chloride, 2-ethoxy-4,6-dichloro-cyanuric chloride, 2-anilino-4,6-dichloro-cyanuric chloride, 2-p-sulfoanilino-4,6-dichloro-cyanuric chloride, 2-m-sulfoanilino-4,6-dichloro-cyanuric chloride, 2-o-sulfoanilino-4,6-dichloro-cyanuric chloride, 2-p-methylanilino-4,6-dichloro-cyanuric chloride, 2-p-chloroanilino-4,6-dichloro-cyanuric chloride, 2-(2,5-sulfoanilino)-4,6-dichloro-cyanuric chloride were used in place of cyanuric chloride of example 449 to be condensed with 1-amino-8-naphthol-3,6-disulfonic acid. The coupling component comprising triazinyl group and hydroxy group obtained was coupled with the diazo salt of 1,5-diaminonaphthalene of example 449. The hydroxy-comprising azo dye obtained was finally reacted with polymaleic anhydride to obtain a polycarboxylic acid dye with low polymerization degree. The other conditions were same as example 449.

EXAMPLE 459

1-18.4 g of cyanuric chloride was placed into a beaker. A small amount of crushed ice and water were added for pulping for 0.1-1 h; during which, 1-17.4 g of 1-amino-8-naphthol-3,6-disulfonic acid was taken up in 200 ml of water. 2-7.4 g of sodium hydroxide was dissolved in 10-50 ml of water. Cyanuric chloride was added and condensed for 4-5 h and further condensed with p-phenylene diamine for 4 h to obtain a triazinyl-comprising coupling component.

1-13.8 g of 4,4'-diaminodistyryl-2,2'-disulfonic acid in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the naphthylamine. The reaction was stopped after 30 min, and 0.1 g of sulfamic acid was then added. Then, the diazo salt of 4,4'-diaminodistyryl-2,2'-disulfonic acid was added into the coupling component above. After 4 h, the coupling reaction was stopped to obtain an amino-comprising azo dye.

1-2.9 g of the amino-comprising azo dye in 10-40 ml of butanone was added with 1-2.45 g of polymaleic anhydride and stirred at 30-80° C. for 1-24 h. The reaction was cooled and filtered, and the filter cake was dried. A polycarboxylic acid dye with low polymerization degree was obtained.

EXAMPLES 460-468

2-hydroxy-4,6-dichloro-cyanuric chloride, 2-methoxy-4,6-dichloro-cyanuric chloride, 2-ethoxy-4,6-dichloro-cyanuric chloride, 2-anilino-4,6-dichloro-cyanuric chloride, 2-p-sulfoanilino-4,6-dichloro-cyanuric chloride, 2-m-sulfoanilino-4,6-dichloro-cyanuric chloride, 2-o-sulfoanilino-4,6-dichloro-cyanuric chloride, 2-p-methylanilino-4,6-dichloro-cyanuric chloride, 2-p-chloroanilino-4,6-dichloro-cyanuric chloride, 2-(2,5-sulfoanilino)-4,6-dichloro-cyanuric chloride were used in place of cyanuric chloride of example 459 to be condensed with 1-amino-8-naphthol-3,6-disulfonic acid, and then condensed with p-phenylene diamine. The coupling component comprising triazinyl group and amino group obtained was coupled with the diazo salt of 4,4'-diaminodistyryl-2,2'-disulfonic acid of example 459. The amino-comprising azo dye obtained was finally reacted with polymaleic anhydride to obtain a polycarboxylic acid dye with low polymerization degree. The other conditions were same as example 459.

EXAMPLES 469-472

1-aminoanthraquinone, 1-amino-4-anilinoanthraquinone, 1-amino-2-p-hydroxy phenoxy-4-anilinoanthraquinone, 1-amino-2-sulfonic-4-anilino anthraquinone were used to be reacted with the polymaleic anhydride of example 1 to obtain a polycarboxylic acid dye with low polymerization degree comprising the anthraquinone chromophore. The other conditions were same as example 1.

EXAMPLES 473-480

1-amino-4-(p-aminoanilino) anthraquinone, 1-amino-2-sulfonic-4-(p-aminoanilino) anthraquinone, 1-amino-4-(m-aminoanilino) anthraquinone, 1-amino-2-sulfonic-4-(p-sulfonic anilino) anthraquinone, 1-amino-4-(p-methyl anilino) anthraquinone, 1-amino-2-sulfonic-4-(p-methyl anilino) anthraquinone, 1-amino-2-sulfonic-4-(o-sulfonic anilino) anthraquinone were used to be reacted with the polymaleic anhydride of example 1 to obtain a polycarboxylic acid dye with low polymerization degree comprising the anthraquinone chromophore. The other conditions were same as example 1.

EXAMPLE 481

1-18.4 g of cyanuric chloride was placed into a beaker. A small amount of crushed ice and water were added for pulping for 0.1-1 h; during which, 1-17.4 g of 1-amino-4-(p-aminoanilino) anthraquinone in 200 ml of acetone was added with the cyanuric chloride, condensed for 4-5 h, to obtain an anthraquinone dye comprising triazinyl group and amino group.

1-2.9 g of the amino-comprising anthraquinone dye in 10-40 ml of butanone was added with 1-2.45 g of polymaleic anhydride and stirred at 30-80° C. for 1-24 h. The reaction was cooled and filtered. The filter cake was dried to obtain a polycarboxylic acid dye with low polymerization degree.

EXAMPLES 482-501

2-hydroxy-4,6-dichloro-cyanuric chloride, 2-methoxy-4,6-dichloro-cyanuric chloride, 2-ethoxy-4,6-dichloro-cyanuric chloride, 2-anilino-4,6-dichloro-cyanuric chloride, 2-p-sulfoanilino-4,6-dichloro-cyanuric chloride, 2-m-sulfoanilino-4,6-dichloro-cyanuric chloride, 2-o-sulfoanilino-4,6-dichloro-cyanuric chloride, 2-p-methylanilino-4,6-dichloro-cyanuric chloride, 2-p-chloroanilino-4,6-dichloro-cyanuric chloride, 2-(2,5-sulfoanilino)-4,6-dichloro-cyanuric chloride, 2-hydroxy-4-hydroxy-6-chloro-cyanuric chloride, 2-methoxy-4-methoxy-6-chloro-cyanuric chloride, 2-ethoxy-4-ethoxy-6-chloro-cyanuric chloride, 2-anilino-4-anilino-6-chloro-cyanuric chloride, 2-p-sulfoanilino-4-anilino-6-chloro-cyanuric chloride, 2-m-sulfoanilino-4-(p-vinylsulfone sulfate anilino)-6-chloro-cyanuric chloride, 2-o-sulfoanilino-4-(p-vinylsulfone sulfate anilino)-6-chloro-cyanuric chloride, 2-p-methylanilino-4-(p-vinylsulfone sulfate anilino)-6-chloro-cyanuric chloride, 2-p-chloroanilino-4-(p-vinylsulfone sulfate anilino)-6-chloro-cyanuric chloride, 2-(2,5-sulfoanilino)-4-(p-vinylsulfone sulfate anilino)-6-chloro-cyanuric chloride were used in place of cyanuric chloride of example 481 to be condensed with the 1-amino-4-(p-aminoanilino)anthraquinone. The anthraquinone dye comprising triazinyl group and amino group obtained was finally reacted with polymaleic anhydride, to obtain a polycarboxylic acid dye with low polymerization degree. The other conditions were same as example 481.

EXAMPLE 502

1-18.4 g of cyanuric chloride was placed into a beaker. A small amount of crushed ice and water were added for pulping for 0.1-1 h; during which, 1-17.4 g of 1-amino-4-(p-aminoanilino) anthraquinone in 200 ml of acetone was added with the cyanuric chloride, and condensed for 4-5 h. The temperature was increased to 40° C. p-phenylene diamine was added and condensed for 4-5 h, to obtain an anthraquinone dye comprising triazinyl group and amino group.

1-2.9 g of the amino-comprising anthraquinone dye in 10-40 ml of butanone was added with 1-2.45 g of polymaleic anhydride and stirred at 30-80° C. for 1-24 h. The reaction was cooled and filtered. The filter cake was dried to obtain a polycarboxylic acid dye with low polymerization degree.

EXAMPLES 503-522

2-hydroxy-4,6-dichloro-cyanuric chloride, 2-methoxy-4,6-dichloro-cyanuric chloride, 2-ethoxy-4,6-dichloro-cyanuric chloride, 2-anilino-4,6-dichloro-cyanuric chloride, 2-p-sulfoanilino-4,6-dichloro-cyanuric chloride, 2-m-sulfoanilino-4,6-dichloro-cyanuric chloride, 2-o-sulfoanilino-4,6-dichloro-cyanuric chloride, 2-p-methylanilino-4,6-dichloro-cyanuric chloride, 2-p-chloroanilino-4,6-dichloro-cyanuric chloride, 2-(2,5-sulfoanilino)-4,6-dichloro-cyanuric chloride, 2-hydroxy-4-hydroxy-6-chloro-cyanuric chloride, 2-methoxy-4-methoxy-6-chloro-cyanuric chloride, 2-ethoxy-4-ethoxy-6-chloro-cyanuric chloride, 2-anilino-4-anilino-6-chloro-cyanuric chloride, 2-p-sulfoanilino-4-anilino-6-chloro-cyanuric chloride, 2-m-sulfoanilino-4-(p-vinylsulfone sulfate anilino)-6-chloro-cyanuric chloride, 2-o-sulfoanilino-4-(p-vinylsulfone sulfate anilino)-6-chloro-cyanuric chloride, 2-p-methylanilino-4-(p-vinylsulfone sulfate anilino)-6-chloro-cyanuric chloride, 2-p-chloroanilino-4-(p-vinylsulfone sulfate anilino)-6-chloro-cyanuric chloride, 2-(2,5-sulfoanilino)-4-(p-vinylsulfone sulfate anilino)-6-chloro-cyanuric chloride were used in place of cyanuric chloride of example 502 to be condensed with the 1-amino-4-(p-aminoanilino)anthraquinone, and then condensed with p-phenylene diamine. The anthraquinone dye comprising triazinyl group and amino group obtained was finally reacted with polymaleic anhydride, to obtain a polycarboxylic acid dye with low polymerization degree. The other conditions were same as example 502.

EXAMPLE 533

1-18.4 g of cyanuric chloride was placed into a beaker. A small amount of crushed ice and water were added for pulping for 0.1-1 h; during which, 1-17.4 g of 1-amino-4-(m-amino p-sulfonic anilino) anthraquinone in 200 ml of acetone was added with the cyanuric chloride, and condensed for 4-5 h. The temperature was increased to 40° C. p-phenylene diamine was added and condensed for 4-5 h, to obtain an anthraquinone dye comprising triazinyl group and amino group.

1-2.9 g of the amino-comprising anthraquinone dye in 10-40 ml of butanone was added with 1-2.45 g of polymaleic anhydride and stirred at 30-80° C. for 1-24 h. The reaction was cooled and filtered. The filter cake was dried to obtain a polycarboxylic acid dye with low polymerization degree.

EXAMPLES 534-553

2-hydroxy-4,6-dichloro-cyanuric chloride, 2-methoxy-4,6-dichloro-cyanuric chloride, 2-ethoxy-4,6-dichloro-cyanuric chloride, 2-anilino-4,6-dichloro-cyanuric chloride, 2-p-sulfoanilino-4,6-dichloro-cyanuric chloride, 2-m-sulfoanilino-4,6-dichloro-cyanuric chloride, 2-o-sulfoanilino-4,6-dichloro-cyanuric chloride, 2-p-methylanilino-4,6-dichloro-cyanuric chloride, 2-p-chloroanilino-4,6-dichloro-cyanuric chloride, 2-(2,5-sulfoanilino)-4,6-dichloro-cyanuric chloride, 2-hydroxy-4-hydroxy-6-chloro-cyanuric chloride, 2-methoxy-4-methoxy-6-chloro-cyanuric chloride, 2-ethoxy-4-ethoxy-6-chloro-cyanuric chloride, 2-anilino-4-anilino-6-chloro-cyanuric chloride, 2-p-sulfoanilino-4-anilino-6-chloro-cyanuric chloride, 2-m-sulfoanilino-4-(p-vinylsulfone sulfate anilino)-6-chloro-cyanuric chloride, 2-o-sulfoanilino-4-(pvinylsulfone sulfate anilino)-6-chloro-cyanuric chloride, 2-p-methylanilino-4-(p-vinylsulfone sulfate anilino)-6-chloro-cyanuric chloride, 2-p-chloroanilino-4-(p-vinylsulfone sulfate anilino)-6-chloro-cyanuric chloride, 2-(2,5-sulfoanilino)-4-(p-vinylsulfone sulfate anilino)-6-chloro-cyanuric chloride were used in place of cyanuric chloride of example 533 to be condensed with the 1-amino-4-(m-amino p-sulfonic anilino) anthraquinone, and then condensed with p-phenylene diamine. The anthraquinone dye comprising triazinyl group and amino group obtained was finally reacted with polymaleic anhydride, to obtain a polycarboxylic acid dye with low polymerization degree. The other conditions were same as example 533.

EXAMPLES 554-555

1-nitro-4-amino-6-sulfonic anthraquinone, 1-hydroxy-2-sulfonic-4-aminoanthraquinone were used to be reacted with the polymaleic anhydride of example 1 to obtain a polycarboxylic acid dye with low polymerization degree comprising the anthraquinone chromophore. The other conditions were same as example 1.

EXAMPLE 556

1-18.4 g of cyanuric chloride was placed into a beaker. A small amount of crushed ice and water were added for pulping for 0.1-1 h; during which, 1-17.4 g of 1-nitro-4-amino-6-anthraquinone in 200 ml of acetone was added with the cyanuric chloride, and condensed for 4-5 h. The temperature was increased to 40° C. p-phenylene diamine was added and condensed for 4-5 h, to obtain an anthraquinone dye comprising triazinyl group and amino group.

1-2.9 g of the amino-comprising anthraquinone dye in 10-40 ml of butanone was added with 1-2.45 g of polymaleic anhydride and stirred at 30-80° C. for 1-24 h. The reaction was cooled and filtered, and the filter cake was dried. A polycarboxylic acid dye with low polymerization degree was obtained.

EXAMPLES 557-576

2-hydroxy-4,6-dichloro-cyanuric chloride, 2-methoxy-4,6-dichloro-cyanuric chloride, 2-ethoxy-4,6-dichloro-cyanuric chloride, 2-anilino-4,6-dichloro-cyanuric chloride, 2-p-sulfoanilino-4,6-dichloro-cyanuric chloride, 2-m-sulfoanilino-4,6-dichloro-cyanuric chloride, 2-o-sulfoanilino-4,6-dichloro-cyanuric chloride, 2-p-methylanilino-4,6-dichloro-cyanuric chloride, 2-p-chloroanilino-4,6-dichloro-cyanuric chloride, 2-(2,5-sulfoanilino)-4,6-dichloro-cyanuric chloride, 2-hydroxy-4-hydroxy-6-chloro-cyanuric chloride, 2-methoxy-4-methoxy-6-chloro-cyanuric chloride, 2-ethoxy-4-ethoxy-6-chloro-cyanuric chloride, 2-anilino-4-anilino-6-chloro-cyanuric chloride, 2-p-sulfoanilino-4-anilino-6-chloro-cyanuric chloride, 2-m-sulfoanilino-4-(p-vinylsulfone sulfate anilino)-6-chloro-cyanuric chloride, 2-o-sulfoanilino-4-(p-vinylsulfone sulfate anilino)-6-chloro-cyanuric chloride, 2-p-methylanilino-4-(p-vinylsulfone sulfate anilino)-6-chloro-cyanuric chloride, 2-p-chloroanilino-4-(pvinylsulfone sulfate anilino)-6-chloro-cyanuric chloride, 2-(2,5-sulfoanilino)-4-(p-vinylsulfone sulfate anilino)-6-chloro-cyanuric chloride were used in place of cyanuric chloride of example 556 to be condensed with the 1-nitro-4-amino-6-anthraquinone, and then condensed with p-phenylene diamine. The anthraquinone dye comprising triazinyl group and amino group obtained was finally reacted with polymaleic anhydride, to obtain a polycarboxylic acid dye with low polymerization degree. The other conditions were same as example 556.

EXAMPLE 577

1-20 of maleic anhydride monomer and 10-100 of toluene were added into a 250 ml three-necked flask equipped with a stirrer, a thermometer and a Allihn condenser, stirred and warmed to a temperature of 50-110° C. 0.01-5 g of BPO or AIBN was dissolved in 1-50 ml of toluene, and added dropwise into the three-necked flask with a constant pressure dropping funnel over a dropping period of 1-100 min. After the addition, stirring was made for 1-72 h. The stirring was stopped, the reaction product which was still hot was poured into a beaker, stirred, stood, and cooled followed by suction filtered. The filter cake was taken out and vacuum dried at 60° C. for 24 h, so as to obtain a polymaleic anhydride product.

1-13.8 g of p-nitroaniline in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the p-nitroaniline solution. The reaction was stopped after 30 min, and 0.1 g of sulfamic acid was then added; during which period, 1-17.4 g of 1-phenyl-3 methyl-5-pyrazolone was taken up in water, heated and adjusted to a pH=9 with 15% sodium carbonate solution, which was cooled to below 5° C. after completion of dissolution. Then, the coupling component was placed in an ice-water mixture and stirred. The diazo salt was added dropwise to the coupling component. The pH of the solution was adjusted to 9. An orange substance precipitated. After 4 h, the coupling reaction was stopped. Filtrating and drying provided an azo dye of pyrazolone comprising nitro group.

1-5 g of the azo dye of pyrazolone comprising nitro group was dissolved in 10-100 ml of toluene and heated to 50-100° C. 2-7.4 g of sodium sulfide and 0.5-2.6 g of sodium carbonate were dissolved in 10-50 ml of water, which were added dropwise with a constant pressure dropping funnel. After completion of addition, the reaction was carried out at a constant temperature for 1-8 h. A red substance precipitated. The reaction was cooled to 20° C. and filtered. The filter cake was dried to obtain an azo dye of pyrazolone comprising amino group.

1-2.9 g of the azo dye of pyrazolone comprising amino group in 10-40 ml of butanone was added with 1-2.45 g of polymaleic anhydride and stirred at 30-80° C. for 1-24 h. 1-2 g of trimethylamine was added and reacted for 1-2 h. The reaction was cooled and filtered, and the filter cake was dried. A yellow polycarboxylic acid dye with low polymerization degree was obtained.

EXAMPLE 578

1-18.4 g of cyanuric chloride was placed into a beaker. A small amount of crushed ice and water were added for pulping for 0.1-1 h; during which 1-11 g of 2,4-diamino benzene sulfonic acid was added into the cyanuric chloride. Condensation was made for 4-5 h to obtain a primary condensation liquor.

The primary condensation liquor was added into 1-25 ml of concentrated hydrochloric acid for complete dissolution while stirring. 0.5-7.25 g of sodium nitrite was dissolved in 5-30 ml of water, and added into the primary condensation solution. The reaction was stopped after 30 min, and 0.1 g of sulfamic acid was then added; during which period, 1-5 g of 1-phenyl-3 methyl-5-pyrazolone was taken up in water, which was cooled to below 5° C. after completion of dissolution. Then, the coupling component was placed in an ice-water mixture and stirred. The diazo salt was added dropwise to the coupling component. After 4 h, the coupling reaction was stopped. The temperature was increased to 40° C. 1-2 g of p-phenylene diamine was added and the di-condensation was made. 3 hours later, the reaction was stopped, and an azo dye of pyrazolone comprising amino group was obtained.

1-2.9 g of the azo dye of pyrazolone comprising amino group in 10-40 ml of butanone was added with 1-2.45 g of polymaleic anhydride and stirred at 30-80° C. for 1-24 h. 1-2 g of triethylamine was added and reacted for 1-2 h. The reaction was cooled and filtered, and the filter cake was dried. A polycarboxylic acid dye with low polymerization degree was obtained.

EXAMPLES 579-580

Sodium carbonate, potassium carbonate were used in place of triethylamine of example 578 to obtain a polycarboxylic acid dye with low polymerization degree. The other conditions were same as example 578.

EXAMPLE 581

1-13.8 g of p-nitroaniline in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the p-nitroaniline solution. The reaction was stopped after 30 min, and 0.1 g of sulfamic acid was then added; during which period, 1-12 g of N-ethyl-N-ethyl aniline was taken up in 200 ml of water, and then added dropwise to the solution of the diazo salt of p-nitroaniline. A red substance precipitated. After 4 h, the coupling reaction was stopped, filtered and dried to obtain a nitro-comprising azo dye.

1-5 g of the nitro-comprising azo dye was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. An amaranth substance precipitated. The reaction was cooled to 20° C. and filtered. The filter cake was dried to obtain an amino-comprising azo dye.

1-2.9 g of the amino-comprising azo dye in 10-40 ml of butanone was added with 1-2.45 g of polymaleic anhydride and stirred at 30-80° C. for 1-24 h. 1-2 g of sodium carbonate was added and reacted for 1-2 h. The reaction was cooled and filtered, and the filter cake was dried. A red polycarboxylic acid dye with low polymerization degree was obtained.

EXAMPLE 582

1-18.4 g of cyanuric chloride was placed into a beaker. A small amount of crushed ice and water were added for pulping for 0.1-1 h; during which, 1-17.4 g of N,N-diethyl m-acetoamido aniline was taken up in 200 ml of water. 2-7.4 g of sodium hydroxide was dissolved in 10-50 ml of water. The reaction was carried out at a constant temperature of 40-90° C. for 1-8 h, cooled to 20° C., added with cyanuric chloride and condensed for 4-5 h, to obtain a triazinyl-comprising coupling component.

1-13.8 g of p-nitroaniline in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the p-nitroaniline solution. The reaction was stopped after 30 min, and 0.1 g of sulfamic acid was then added. This diazo salt was added into the triazinyl-comprising coupling component above, coupled for 4-10 h, and filtered. The filter cake was dried to obtain a nitro-comprising azo dye.

1-5 g of the nitro-comprising azo dye was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. An amaranth substance precipitated. The reaction was cooled to 20° C. and filtered. The filter cake was dried to obtain an amino-comprising azo dye.

1-2.9 g of the amino-comprising azo dye in 10-40 ml of butanone was added with 1-2.45 g of polymaleic anhydride and stirred at 30-80° C. for 1-24 h. 1-2 g of potassium carbonate was added and reacted for 1-2 h. The reaction was cooled and filtered. The filter cake was dried to obtain a polycarboxylic acid dye with low polymerization degree.

EXAMPLE 583

1-13.8 g of p-nitroaniline in 5-50 ml of water was added with 1-25 ml of concentrated hydrochloric acid, heated to be dissolved completely while stirring, and cooled rapidly to 0-5° C. 0.5-7.25 g of sodium nitrite was dissolved in 5-30 ml of water, and added into the p-nitroaniline solution. The reaction was stopped after 30 min, and 0.1 g of sulfamic acid was then added; during which period, 1-17.4 g of 2-naphthol was taken up in 200 ml of water. The pH was adjusted to about 9, and then the diazo salt of p-nitroaniline was added. After 4 h, the coupling reaction was stopped, filtered and dried to obtain a nitro-comprising azo dye.

1-5 g of the nitro-comprising azo dye was dissolved in 10-100 ml of toluene and heated to 50-100° C. 2-7.4 g of sodium sulfide and 0.5-2.6 g of sodium bicarbonate were dissolved in 10-50 ml of water, which were added dropwise with a constant pressure dropping funnel. After completion of addition, the reaction was carried out at a constant temperature for 1-8 h. An amaranth substance precipitated. The reaction was cooled to 20° C. and filtered. The filter cake was dried to obtain an amino-comprising azo dye.

1-2.9 g of the amino-comprising azo dye in 10-40 ml of butanone was added with 1-2.45 g of polymaleic anhydride and stirred at 30-80° C. for 1-24 h. 1-2 g of tri-n-butylamine was added and reacted for 1-2 h. The reaction was cooled and filtered. The filter cake was dried to obtain a polycarboxylic acid dye with low polymerization degree.

EXAMPLE 584

1-18.4 g of cyanuric chloride was placed into a beaker. A small amount of crushed ice and water were added for pulping for 0.1-1 h; during which, 1-17.4 g of 1-amino-4-(m-amino p-sulfonic anilino) anthraquinone in 200 ml of acetone was added with the cyanuric chloride, and condensed for 4-5 h. The temperature was increased to 40° C. p-phenylene diamine was added and condensed for 4-5 h, to obtain an anthraquinone dye comprising triazinyl group and amino group.

1-2.9 g of the amino-comprising anthraquinone dye in 10-40 ml of butanone was added with 1-2.45 g of polymaleic anhydride and stirred at 30-80° C. for 1-24 h. 1-2 g of dimethylamine was added and reacted for 1-2 h. The reaction was cooled and filtered. The filter cake was dried to obtain a polycarboxylic acid dye with low polymerization degree.

EXAMPLES 585-591

Sodium carbonate, potassium carbonate, aqueous ammonia, methylamine aqueous solution, trimethylamine, di-n-butylamine, tri-n-butylamine were used in place of dimethylamine of example 584 to obtain a polycarboxylic acid dye with low polymerization degree. The other conditions were same as example 584.

Technical Effect

The dye according to the present invention has superior dye fixation and color fastness as compared with the dye according to the prior art. Tables 3 and 4 below show the dye of example 1 according to the present invention and of the comparative example (a dye according to prior art), respectively.

TABLE 3

Structure and performance of the dye according to example 1 of the present invention

| Example No. | Variables of the polymaleic acid n1, n2, n3, n | X | M | Chromophore D = | Dye fixation % | Color fastness (Level) |
|---|---|---|---|---|---|---|
| 1 | n1 = 5<br>n2 = 2<br>n3 = 3<br>n = 10 | NH | H | | 98.8% | Dry and wet fastness: 4-5, 3-4;<br>Color change by washing, color staining on wool/cotton: 4, 4-5, 4-5;<br>exposure to sun: 3-4 |

TABLE 4

Structure and performance of the comparative example (polyacrylic dye)

| No. | Reference document | Structure | Dye fixations | Color fastness |
|---|---|---|---|---|
| 1 | LI, Yingling, syntheses of polyamine type and polycarboxylic acid type of macromolecule dye and use thereof, doctoral thesis of Dalian University of Technology, 2007 | 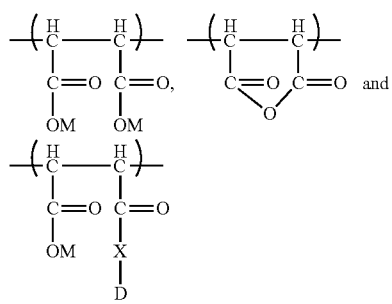 | 85.1% | Dry and wet fastness: 4-5, 2-3; Color change by washing, color staining on wool/cotton: 4-5, 3-4, 4-5; exposure to sun: 3. |

It can be seen from the comparison between tables 3 and 4, the dye according to the present invention has superior dye fixation and color fastness as compared with the prior art dye.

The invention claimed is:

1. A polycarboxylic acid dye, wherein the dye is a polymerized polycarboxylic acid, or salt or ester thereof having a macromolecule skeleton of polymaleic acid, or salt or ester thereof linked to a chromophore via a bridge group of amide or ester bond, having a structural formula of:

   (1)

in formula (1), the structural component A consists of the following three monomer units which are linked randomly, block or alternately in arbitrary sequence, present with respective numbers of $n_1$, $n_2$ and $n_3$:

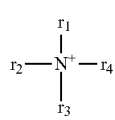

wherein each of the structural component A can independently have same or different $n_1$, same or different $n_2$ and/or same or different $n_3$, wherein, M is H, Na, K or a quaternary ammonium positive ion of formula 1-1:

$$r_2-\overset{r_1}{\underset{r_3}{N^+}}-r_4 \quad (1\text{-}1)$$

in formula 1-1, $r_1$, $r_2$, $r_3$ and $r_4$ are hydrogen, a $C_1$-$C_{12}$ linear alkyl, or a $C_1$-$C_{12}$ linear alkenyl, wherein the $r_1$, $r_2$, $r_3$ and $r_4$ can be same or different;

$n_1$=1-100; $n_2$=0-100; $n_3$=1-100; and n=an integer of 1-300;

X=O or NH, linked to a chromophore;

D is (2), (3), (4), (5), (6), (7), (8), (9), (10), (11), (12), (13), (14), (15), (16), (17), (18), (19), (20), (21), (22), (23), (24), (25) or (26) having the following structures:

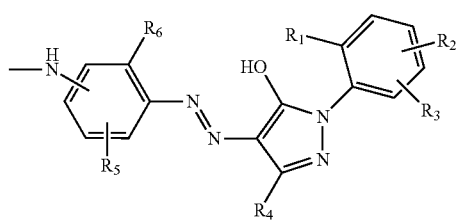   (2)

in formula (2): $R_1$ is H or Cl; $R_2$ is H, Cl, CN, $SO_3Na$, $SO_2NHR$, $SO_2CH_2CH_2Y_1$ or $SO_2NHCH_2CH_2Y_1$; $R_3$ is H, Cl, CN, CONHR or COOR; $R_4$ is H, $CH_3$, CN, COOR or $C_6H_5$; $R_5$ is H, Cl, NHR, CN, $SO_3Na$, $SO_2NHR$, CONHR, COOR, NHCOR,

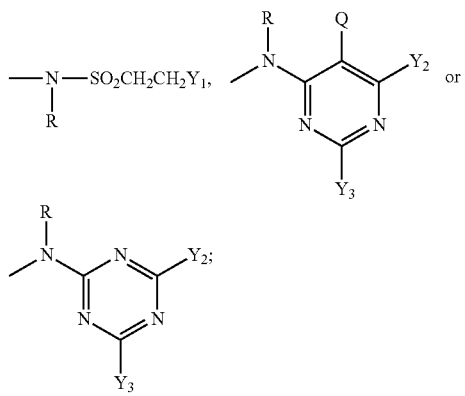

$Y_1$ is Cl, $OSO_3X$ or $N(CH_3)CH_2CH_2SO_3X$; $Y_2$ is Cl, F, OR, $NHCH_2SO_3X$, $N(R)_2$, $N(CH_2OH)_2$, $N(C_2H_4OH)_2$

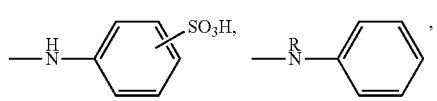

-continued

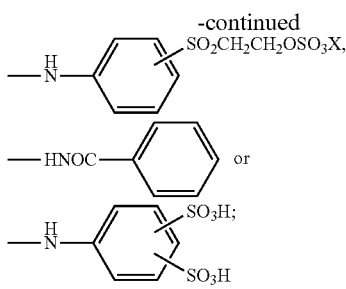

$Y_3$ is Cl, F, OR, $NHCH_2SO_3X$, $N(R)_2$, $N(CH_2OH)_2$, $N(C_2H_4OH)_2$,

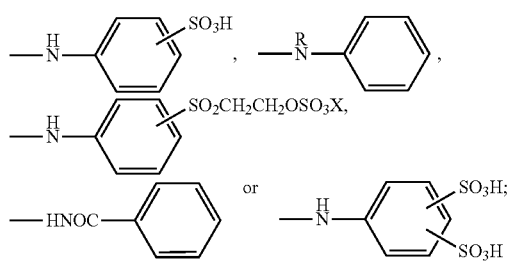

Q is Cl or $CH_3$; $R_6$ is H, Cl, CN, $NO_2$, $SO_2NHR$, CONHR or COOR; R is H, or a linear, saturated alkyl of $C_pH_{2p+1}$, wherein: p is an integer with the proviso of $1 \leq p \leq 18$; and X is H, Na or K;

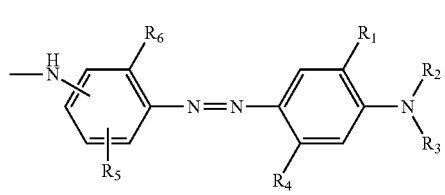
(3)

in formula (3): $R_1$ is H, $OCH_3$ or $OCH_2CH_3$; $R_2$ is $CH_3$, $CH_2CH_3$, $CH_2CH_2OH$, $CH_2CH_2OCH_3$, $CH_2CH_2Cl$, $CH_2CH_2CN$ or $CH_2CH_2OCOCH_3$; $R_3$ is $CH_3$, $CH_2CH_3$, $CH_2CH_2OH$, $CH_2CH_2OCH_3$, $CH_2CH_2Cl$, $CH_2CH_2CN$ or $CH_2CH_2OCOCH_3$; $R_4$ is H, $NHCOCH_3$, $NHCOC_2H_5$,

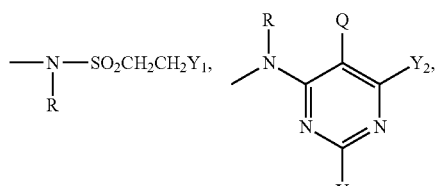

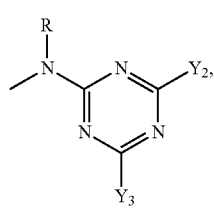

$NHCOCY_4$=$CHY_5$ or $NHCOCHY_4CH_2Y_6$; $Y_1$ is Cl, $OSO_3X$ or $N(CH_3)CH_2CH_2SO_3X$; $Y_2$ is Cl or F; $Y_3$ is Cl, F, OR, $NHCH_2SO_3X$, $N(R)_2$, $N(CH_2OH)_2$, $N(C_2H_4OH)_2$,

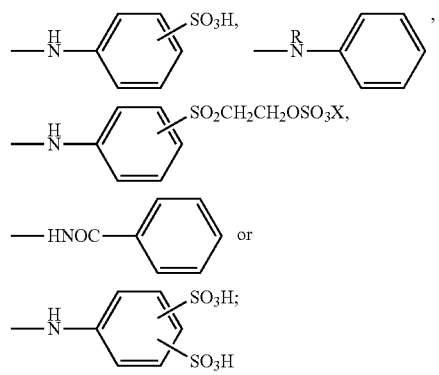

$Y_4$ is H or Br; $Y_5$ is H, Cl or Br; $Y_6$ is Br or $OSO_3X$; Q is Cl or $CH_3$; $R_5$ is H, Cl, Br, CN, $NO_2$, $SO_3Na$, $SO_2NHR$, CONHR or COOR; $R_6$ is H, Cl, Br, CN, $NO_2$, $CH_3$, $OCH_3$, $OC_2H_5$, $CONH_2$, $COOCH_3$ or $COOC_2H_5$; R is H, or a linear, saturated alkyl of $C_pH_{2p+1}$, wherein: p is an integer with the proviso of $1 \leq p \leq 18$; and X is H, Na or K;

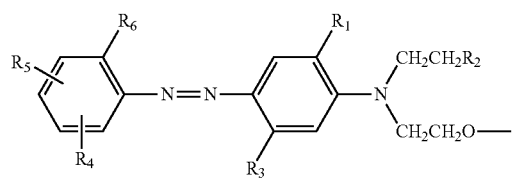
(4)

in formula (4): $R_1$ is H, $OCH_3$ or $OCH_2CH_3$; $R_2$ is OH, $OCH_3$, Cl, CN or $OCOCH_3$; $R_3$ is H, $NHCOCH_3$, $NHCOC_2H_5$,

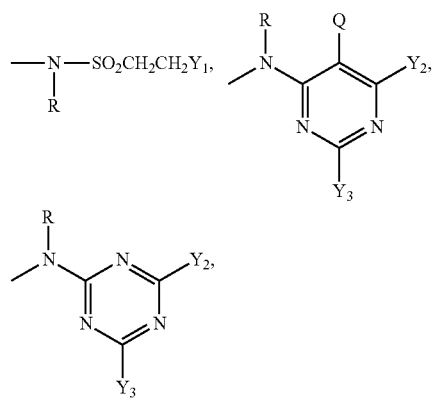

$NHCOCY_4$=$CHY_5$ or $NHCOCHY_4CH_2Y_6$; $R_4$ is H, Cl, Br, CN, $NO_2$, $SO_3Na$, $SO_2NHR$, CONHR or COOR; $R_5$ is H, Cl, Br, CN, $NO_2$, $SO_2NHR$, CONHR, $SO_2CH_2CH_2Y_1$, $SO_2NHCH_2CH_2Y_1$,

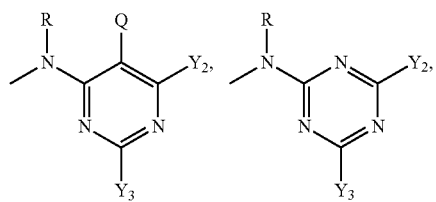

NHCOCY$_4$=CHY$_5$ or NHCOCHY$_4$CH$_2$Y$_6$; Y$_1$ is Cl, OSO$_3$X or N(CH$_3$)CH$_2$CH$_2$SO$_3$X; Y$_2$ is Cl or F; Y$_3$ is Cl, F, OR, NHCH$_2$SO$_3$X, N(R)$_2$, N(CH$_2$OH)$_2$, N(C$_2$H$_4$OH)$_2$,

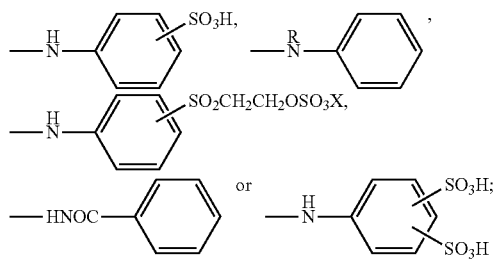

Y$_4$ is H or Br; Y$_5$ is H, Cl or Br; Y$_6$ is Br or OSO$_3$X; Q is Cl or CH$_3$; R$_6$ is H, Cl, Br, CN, NO$_2$, CH$_3$, OCH$_3$, OC$_2$H$_5$, CONH$_2$, COOCH$_3$ or COOC$_2$H$_5$; R is H, or a linear, saturated alkyl of C$_p$H$_{2p+1}$, wherein: p is an integer with the proviso of $1 \le p \le 18$; and X is H, Na or K;

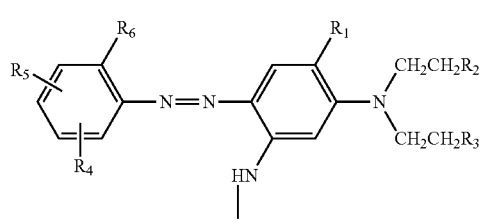

in formula (5): R$_1$ is H, OCH$_3$ or OCH$_2$CH$_3$; R$_2$ is H, OH, OCH$_3$, Cl, CN or OCOCH$_3$; R$_3$ is H, OH, OCH$_3$, Cl, CN or OCOCH$_3$; R$_4$ is H, Cl, Br, CN, NO$_2$, SO$_3$Na, SO$_2$NHR, CONHR or COOR; R$_5$ is H, Cl, Br, CN, NO$_2$, SO$_2$NHR, CONHR, SO$_2$CH$_2$CH$_2$Y$_1$, SO$_2$NHCH$_2$CH$_2$Y$_1$,

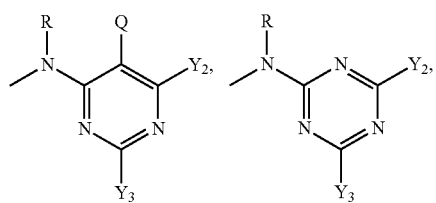

NHCOCY$_4$=CHY$_5$ or NHCOCHY$_4$CH$_2$Y$_6$; Y$_1$ is Cl, OSO$_3$X or N(CH$_3$)CH$_2$CH$_2$SO$_3$X; Y$_2$ is Cl or F; Y$_3$ is Cl, F, OR, NHCH$_2$SO$_3$X, N(R)$_2$, N(CH$_2$OH)$_2$, N(C$_2$H$_4$OH)$_2$,

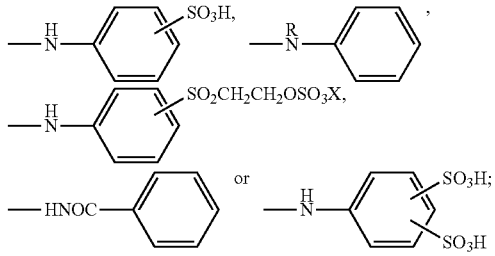

Y$_4$ is H or Br; Y$_5$ is H, Cl or Br; Y$_6$ is Br or OSO$_3$X; Q is Cl or CH$_3$; R$_6$ is H, Cl, Br, CN, NO$_2$, CH$_3$, OCH$_3$, OC$_2$H$_5$, CONH$_2$, COOCH$_3$ or COOC$_2$H$_5$; R is H, or a linear, saturated alkyl of C$_p$H$_{2p+1}$, wherein: p is an integer with the proviso of $1 \le p \le 18$; and X is H, Na or K;

(6)

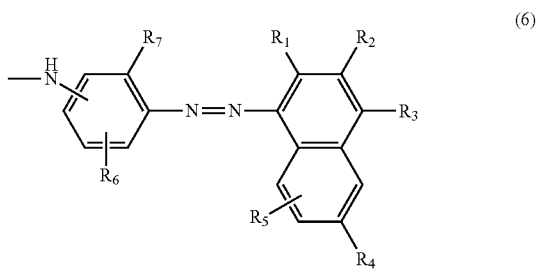

in formula (6): R$_1$ is H, OH or NH$_2$; R$_2$ is H, SO$_3$Na or SO$_2$NHR; R$_3$ is H, Cl, CN, SO$_2$NHR, CONHR, COOR, NHR, NHCOR, SO$_2$CH$_2$CH$_2$Y$_1$, SO$_2$NHCH$_2$CH$_2$Y$_1$,

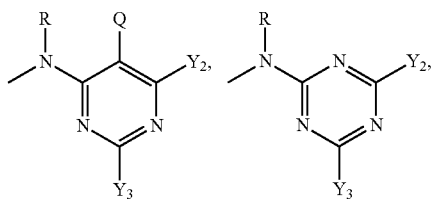

NHCOCY$_4$=CHY$_5$ or NHCOCHY$_4$CH$_2$Y$_6$; Y$_1$ is Cl, OSO$_3$X or N(CH$_3$)CH$_2$CH$_2$SO$_3$X; Y$_2$ is Cl or F; Y$_3$ is Cl, F, OR, NHCH$_2$SO$_3$X, N(R)$_2$, N(CH$_2$OH)$_2$, N(C$_2$H$_4$OH)$_2$,

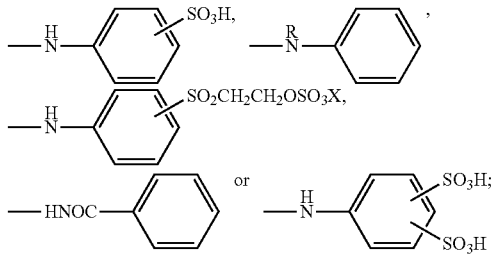

Y$_4$ is H or Br; Y$_5$ is H, Cl or Br; Y$_6$ is Br or OSO$_3$X; Q is Cl or CH$_3$; R$_4$ is H, SO$_3$Na, SO$_2$NHR, NHR or NHCOR; R$_5$ is H, SO$_2$NHR, NHR or NHCOR; R$_6$ is H, Cl, NHR, CN, SO$_3$Na, SO$_2$NHR, CONHR, COOR or NHCOR; R$_7$ is H, Cl, CH$_3$, OCH$_3$, OC$_2$H$_5$, OH, CN, CONH$_2$, COOCH$_3$ or COOC$_2$H$_5$; R is H, or a linear, saturated alkyl of $C_pH_{2p+1}$, wherein: p is an integer with the proviso of $1 \leq p \leq 18$; and X is H, Na or K;

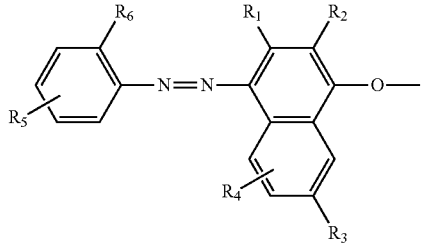
(7)

in formula (7): $R_1$ is H, $OCH_3$ or NHR; $R_2$ is H, $SO_3Na$ or $SO_2NHR$; $R_3$ is H, Cl, CN, $SO_3Na$, $SO_2NHR$, CONHR, COOR, NHR or NHCOR; $R_4$ is H, $SO_2NHR$, NHR or NHCOR; $R_5$ is H, $SO_3Na$, $SO_2NHR$, NHR, CONHR, COOR, NHCOR, $SO_2CH_2CH_2Y_1$, $SO_2NHCH_2CH_2Y_1$,

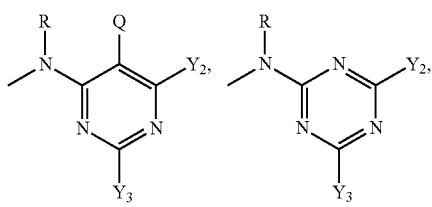

$NHCOCY_4=CHY_5$ or $NHCOCHY_4CH_2Y_6$; $Y_i$ is Cl, $OSO_3X$ or $N(CH_3)CH_2CH_2SO_3X$; $Y_2$ is Cl or F; $Y_3$ is Cl, F, OR, $NHCH_2SO_3X$, $N(R)_2$, $N(CH_2OH)_2$, $N(C_2H_4OH)_2$,

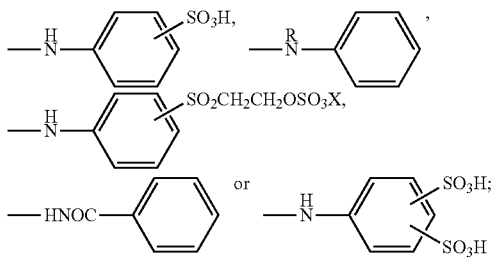

$Y_4$ is H or Br; $Y_5$ is H, Cl or Br; $Y_6$ is Br or $OSO_3X$; Q is Cl or $CH_3$; $R_6$ is H, Cl, $CH_3$, $OCH_3$, $OC_2H_5$, OH, CN, $CONH_2$, $COOCH_3$ or $COOC_2H_5$; R is H, or a linear, saturated alkyl of $C_pH_{2p+1}$, wherein: p is an integer with the proviso of $1 \leq p \leq 18$; and X is H, Na or K;

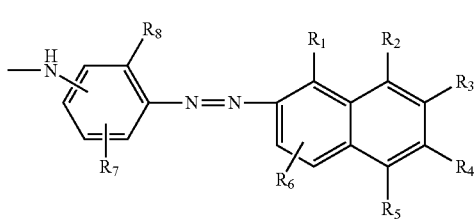
(8)

in formula (8): $R_1$ is H, OH or $NH_2$; $R_2$ is H, NHR, NHCOR,

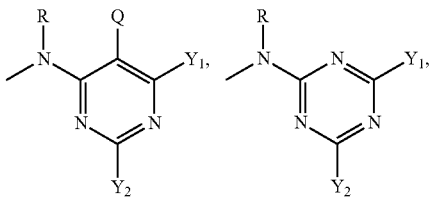

$NHCOCY_3=CHY_4$ or $NHCOCHY_4CH_2Y_5$; $Y_1$ is Cl or F; Q is Cl or $CH_3$; $Y_2$ is Cl, F, OR, $NHCH_2SO_3X$, $N(R)_2$, $N(CH_2OH)_2$, $N(C_2H_4OH)_2$,

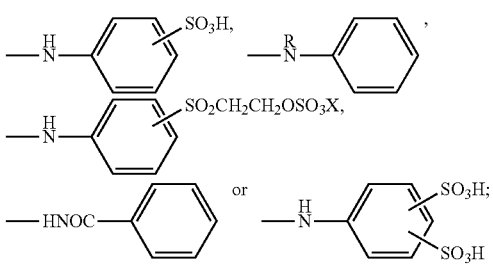

$Y_3$ is H or Br; $Y_4$ is H, Cl or Br; $Y_5$ is Br or $OSO_3X$; $R_3$ is H, NHR, $SO_3Na$, $SO_2NHR$, NHCOR or

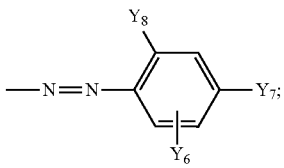

$Y_6$ is H, Cl, NHR, OR, CN, $SO_3Na$, $SO_2NHR$, CONHR, COOR or NHCOR; $Y_7$ is H, Cl, OR, CN, $NO_2$, $SO_3Na$, $SO_2NHR$, $SO_2CH_2CH_2Y_9$, $SO_2NHCH_2CH_2Y_9$, CONHR or COOR; $Y_8$ is H, OH, Cl, $CH_3$, $OCH_3$, $OC_2H_5$, CN, $CONH_2$, $COOCH_3$ or $COOC_2H_5$; $Y_9$ is Cl, $OSO_3X$ or $N(CH_3)CH_2CH_2SO_3X$; $R_4$ is H, NHR, $SO_3Na$, $SO_2NHR$ or NHCOR; $R_5$ is H, NHR, $SO_3Na$, $SO_2NHR$ or NHCOR; $R_6$ is H, $SO_3Na$ or $SO_2NHR$; $R_7$ is H, Cl, NHR, CN, $SO_3Na$, $SO_2NHR$, CONHR or COOR; $R_8$ is H, Cl, $CH_3$, $OCH_3$, $OC_2H_5$, OH, CN, $CONH_2$, $COOCH_3$ or $COOC_2H_5$; R is H, or a linear, saturated alkyl of $C_pH_{2p+1}$, wherein: p is an integer with the proviso of $1 \leq p \leq 18$; and X is H, Na or K;

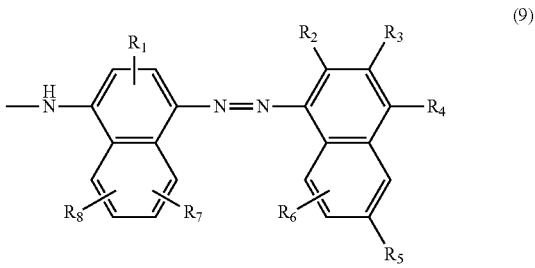
(9)

in formula (9): $R_1$ is H, Cl, $CH_3$, $OCH_3$, $OC_2H_5$, OH, CN, $CONH_2$, $COOCH_3$ or $COOC_2H_5$; $R_2$ is H or OH; $R_3$ is H, NHR or NHCOR; $R_4$ is H, NHR, $SO_3Na$, $SO_2NHR$, NHCOR,

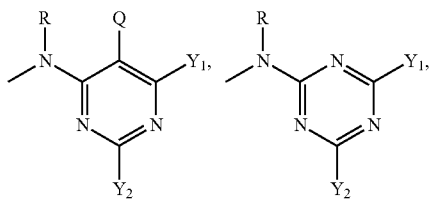

NHCOCY$_3$=CHY$_3$, NHCOCHY$_4$CH$_2$Y$_5$ or

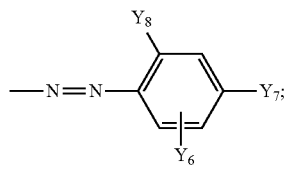

Y$_1$ is Cl or F; Q is Cl or CH$_3$; Y$_2$ is Cl, F, OR, NHCH$_2$SO$_3$X, N(R)$_2$, N(CH$_2$OH)$_2$, N(C$_2$H$_4$OH)$_2$,

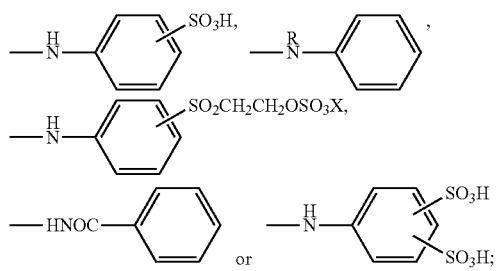

Y$_3$ is H or Br; Y$_4$ is H, Cl or Br; Y$_5$ is Br or OSO$_3$X; Y$_6$ is H, Cl, NHR, OR, CN, SO$_3$Na, SO$_2$NHR, CONHR, COOR or NHCOR; Y$_7$ is H, Cl, OR, CN, NO$_2$, SO$_3$Na, SO$_2$NHR, SO$_2$CH$_2$CH$_2$Y$_9$, SO$_2$NHCH$_2$CH$_2$Y$_9$, CONHR or COOR; Y$_8$ is H, OH, Cl, CH$_3$, OCH$_3$, OC$_2$H$_5$, CN, CONH$_2$, COOCH$_3$ or COOC$_2$H$_5$; Y$_9$ is Cl, OSO$_3$X or N(CH$_3$)CH$_2$CH$_2$SO$_3$X; R$_5$ is H, NHR, SO$_3$Na, SO$_2$NHR or NHCOR; R$_6$ is H, SO$_3$Na or SO$_2$NHR; R$_7$ is H, Cl, R, NHR, CN, SO$_3$Na, SO$_2$NHR or COOR; R$_8$ is H, Cl, CH$_3$, OCH$_3$, OC$_2$H$_5$, OH, CN, CONH$_2$, COOCH$_3$ or COOC$_2$H$_5$; R is H, or a linear, saturated alkyl of C$_p$H$_{2p+1}$, wherein: p is an integer with the proviso of 1≤p≤18; and X is H, Na or K;

(10)

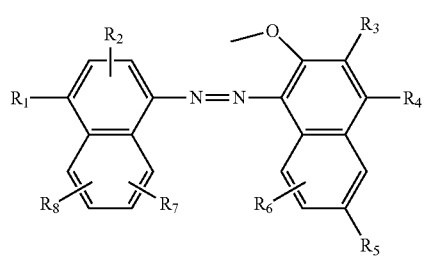

in formula (10): R$_1$, R$_4$ is H, Cl, CH$_3$, OCH$_3$, OC$_2$H$_5$, OH, CN, CONH$_2$, COOCH$_3$, COOC$_2$H$_5$, NHCOR,

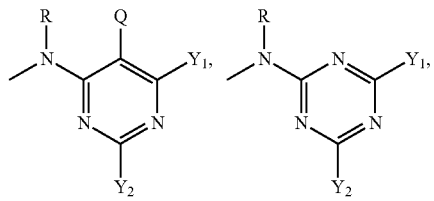

NHCOCY$_3$=CHY$_3$, NHCOCHY$_4$CH$_2$Y$_5$ or

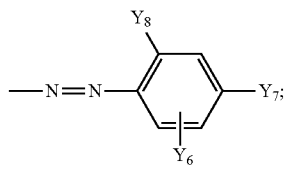

Y$_1$ is Cl or F; Q is Cl or CH$_3$; Y$_2$ is Cl, F, OR, NHCH$_2$SO$_3$X, N(R)$_2$, N(CH$_2$OH)$_2$, N(C$_2$H$_4$OH)$_2$,

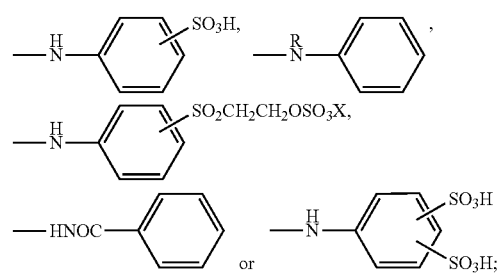

Y$_3$ is H or Br; Y$_4$ is H, Cl or Br; Y$_5$ is Br or OSO$_3$X; Y$_6$ is H, Cl, NHR, OR, CN, SO$_3$Na, SO$_2$NHR, CONHR, COOR or NHCOR; Y$_7$ is H, Cl, OR, CN, NO$_2$, SO$_3$Na, SO$_2$NHR, SO$_2$CH$_2$CH$_2$Y$_9$, SO$_2$NHCH$_2$CH$_2$Y$_9$, CONHR or COOR; Y$_8$ is H, OH, Cl, CH$_3$, OCH$_3$, OC$_2$H$_5$, CN, CONH$_2$, COOCH$_3$, COOC$_2$H$_5$; Y$_9$ is Cl, OSO$_3$X or N(CH$_3$)CH$_2$CH$_2$SO$_3$X; R$_2$ is H, NHR, SO$_3$Na, SO$_2$NHR or NHCOR; R$_3$ is H, SO$_3$Na or SO$_2$NHR; R$_5$ is H, NHR, SO$_3$Na or SO$_2$NHR; R$_6$ is H, NHR, SO$_3$Na, SO$_2$NHR or NHCOR; R$_7$ is H, SO$_3$Na or SO$_2$NHR; R$_8$ is H, Cl, NHR, CN, SO$_3$Na, SO$_2$NHR or COOR; R is H, or a linear, saturated alkyl of C$_p$H$_{2p+1}$, wherein: p is an integer with the proviso of 1≤p≤18; and X is H, Na or K;

(11)

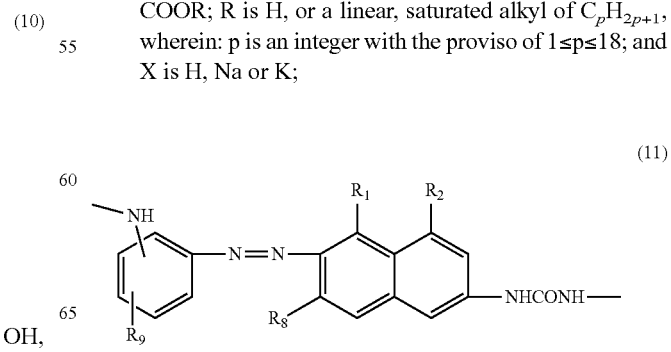

-continued

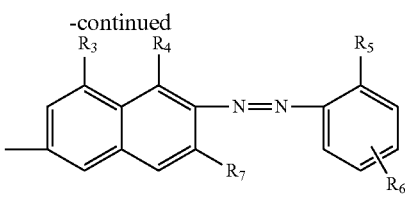

in formula (11): $R_1$ is OH or $NH_2$; $R_2$, $R_3$ is H, $SO_3Na$, $SO_2NHR$, NHCOR,

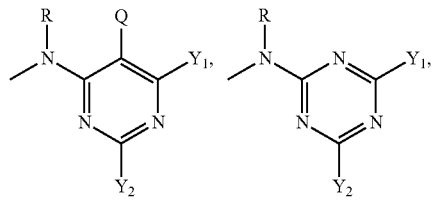

$NHCOCY_3=CHY_3$, $NHCOCHY_4CH_2Y_5$ or

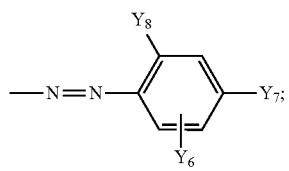

$Y_1$ is Cl or F; Q is Cl or $CH_3$; $Y_2$ is Cl, F, OR, $NHCH_2SO_3X$, $N(R)_2$, $N(CH_2OH)_2$, $N(C_2H_4OH)_2$,

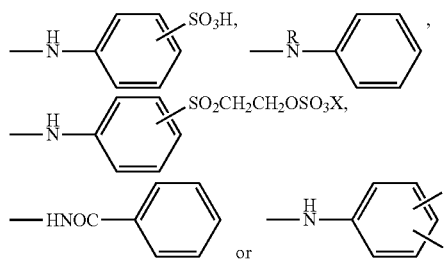

$Y_3$ is H or Br; $Y_4$ is H, Cl or Br; $Y_5$ is Br or $OSO_3X$; $Y_6$ is H, Cl, NHR, OR, CN, $SO_3Na$, $SO_2NHR$, CONHR, COOR or NHCOR; $Y_7$ is H, Cl, OR, CN, $NO_2$, $SO_3Na$, $SO_2NHR$, $SO_2CH_2CH_2Y_9$, $SO_2NHCH_2CH_2Y_9$, CONHR or COOR; $Y_8$ is H, OH, Cl, $CH_3$, $OCH_3$, $OC_2H_5$, CN, $CONH_2$, $COOCH_3$ or $COOC_2H_5$; $Y_9$ is Cl, $OSO_3X$ or $N(CH_3)CH_2CH_2SO_3X$; $R_4$ is H, OH or $NH_2$; $R_5$ is H, NHR, $SO_3Na$, $SO_2NHR$; $R_6$ is H, NHR, $SO_3Na$, $SO_2NHR$ or NHCOR; $R_7$ is H, Cl, NHR, CN, $SO_3Na$, $SO_2NHR$ or COOR; $R_8$ is H, Cl, NHR, CN, $SO_3Na$, $SO_2NHR$ or COOR; $R_9$ is H, Cl, $CH_3$, $OCH_3$, $OC_2H_5$, OH, CN, $CONH_2$, $COOCH_3$ or $COOC_2H_5$; R is H, or a linear, saturated alkyl of $C_pH_{2p+1}$, wherein: p is an integer with the proviso of $1 \leq p \leq 18$; and X is H, Na or K;

(12)

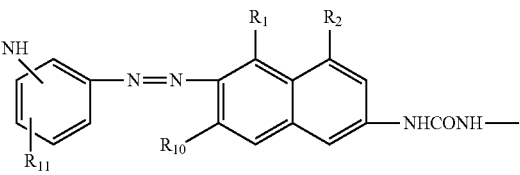

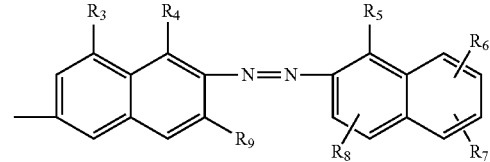

in formula (12): $R_1$ is OH or $NH_2$; $R_2$, $R_3$ is H, $SO_3Na$, $SO_2NHR$, NHCOR,

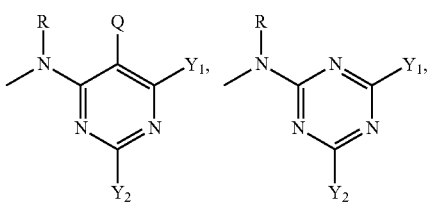

$NHCOCY_3=CHY_3$, $NHCOCHY_4CH_2Y_5$ or

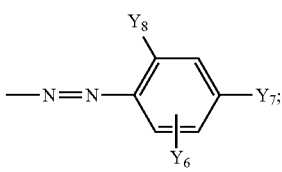

$Y_1$ is Cl or F; Q is Cl or $CH_3$; $Y_2$ is Cl, F, OR, $NHCH_2SO_3X$, $N(R)_2$, $N(CH_2OH)_2$, $N(C_2H_4OH)_2$,

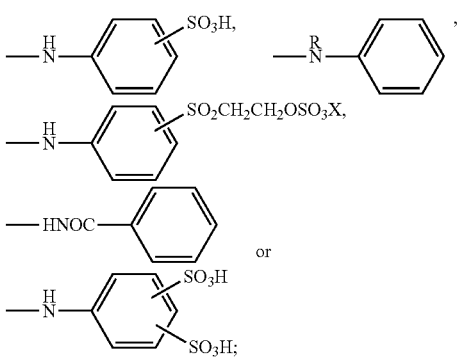

$Y_3$ is H or Br; $Y_4$ is H, Cl or Br; $Y_5$ is Br or $OSO_3X$; $Y_6$ is H, Cl, NHR, OR, CN, $SO_3Na$, $SO_2NHR$, CONHR, COOR or NHCOR; $Y_7$ is H, Cl, OR, CN, $NO_2$, $SO_3Na$, $SO_2NHR$, $SO_2CH_2CH_2Y_9$, $SO_2NHCH_2CH_2Y_9$, CONHR or COOR; $Y_8$ is H, OH, Cl, $CH_3$, $OCH_3$, $OC_2H_5$, CN, $CONH_2$, $COOCH_3$ or $COOC_2H_5$; $Y_9$ is Cl, $OSO_3X$ or $N(CH_3)CH_2CH_2SO_3X$; $R_4$ is H, OH or $NH_2$; $R_5$ is H, NHR, $SO_3Na$ or $SO_2NHR$; $R_6$ is H, NHR, $SO_3Na$, $SO_2NHR$ or NHCOR; $R_7$ is H, NHR, $SO_3Na$ or $SO_2NHR$; $R_8$ is H, NHR, $SO_3Na$, $SO_2NHR$ or NHCOR; $R_9$ is H, Cl, NHR, CN, $SO_3Na$, $SO_2NHR$ or COOR; $R_{10}$ is H, Cl, NHR, CN, $SO_3Na$, $SO_2NHR$ or COOR; $R_{11}$ is H, Cl, $CH_3$, $OCH_3$, $OC_2H_5$, OH, CN, $CONH_2$, $COOCH_3$ or $COOC_2H_5$; R is H, or a linear, saturated alkyl of $C_pH_{2p+1}$, wherein: p is an integer with the proviso of $1 \leq p \leq 18$; and X is H, Na or K;

(13)

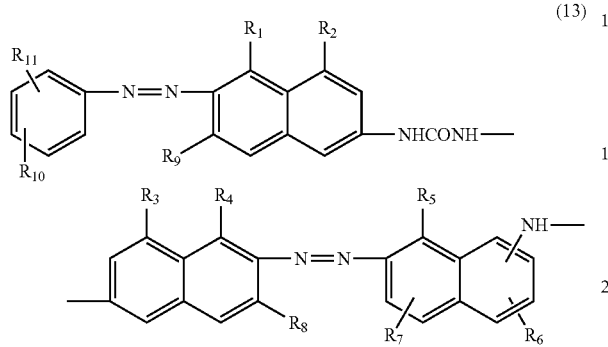

in formula (13): $R_1$ is OH or $NH_2$; $R_2$, $R_3$ is H, $SO_3Na$, $SO_2NHR$, NHCOR,

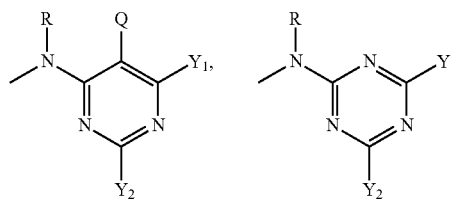

$NHCOCY_3=CHY_3$, $NHCOCHY_4CH_2Y_5$ or

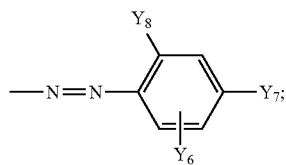

$Y_1$ is Cl or F; Q is Cl or $CH_3$; $Y_2$ is Cl, F, OR, $NHCH_2SO_3X$, $N(R)_2$, $N(CH_2OH)_2$, $N(C_2H_4OH)_2$,

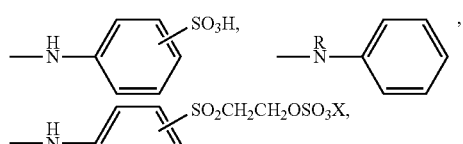

or

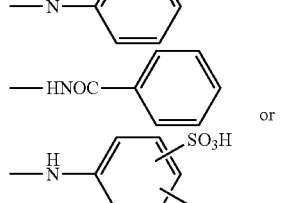

$Y_3$ is H or Br; $Y_4$ is H, Cl or Br; $Y_5$ is Br or $OSO_3X$; $Y_6$ is H, Cl, NHR, OR, CN, $SO_3Na$, $SO_2NHR$, CONHR, COOR or NHCOR; $Y_7$ is H, Cl, OR, CN, $NO_2$, $SO_3Na$, $SO_2NHR$, $SO_2CH_2CH_2Y_9$, $SO_2NHCH_2CH_2Y_9$, CONHR or COOR; $Y_8$ is H, OH, Cl, $CH_3$, $OCH_3$, $OC_2H_5$, CN, $CONH_2$, $COOCH_3$ or $COOC_2H_5$; $Y_9$ is Cl, $OSO_3X$ or $N(CH_3)CH_2CH_2SO_3X$; $R_4$ is H, OH or $NH_2$; $R_5$ is H, NHR, $SO_3Na$ or $SO_2NHR$; $R_6$ is H, NHR, $SO_3Na$, $SO_2NHR$ or NHCOR; $R_7$ is H, NHR, $SO_3Na$ or $SO_2NHR$; $R_8$ is H, NHR, $SO_3Na$, $SO_2NHR$ or NHCOR; $R_9$ is H, Cl, NHR, CN, $SO_3Na$, $SO_2NHR$ or COOR; $R_{10}$ is H, Cl, NHR, CN, $SO_3Na$, $SO_2NHR$ or COOR; $R_{11}$ is H, Cl, $CH_3$, $OCH_3$, $OC_2H_5$, OH, NHR, CN, $CONH_2$, $COOCH_3$ or $COOC_2H_5$; R is H, or a linear, saturated alkyl of $C_pH_{2p+1}$, wherein: p is an integer with the proviso of $1 \leq p \leq 18$; and X is H, Na or K;

(14)

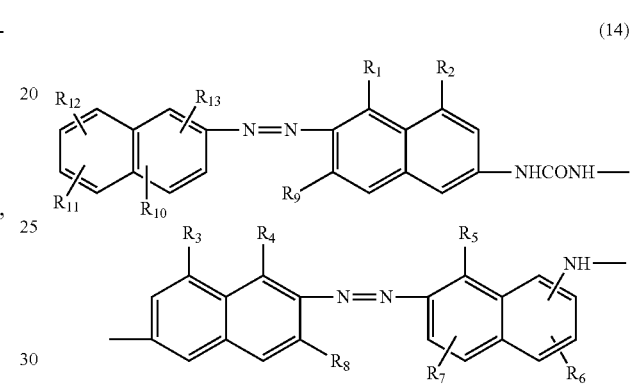

in formula (14): $R_1$ is OH or $NH_2$; $R_2$, $R_3$ is H, $SO_3Na$, $SO_2NHR$, NHCOR,

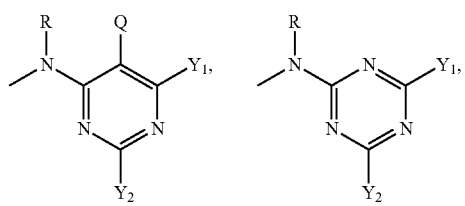

$NHCOCY_3=CHY_3$, $NHCOCHY_4CH_2Y_5$ or

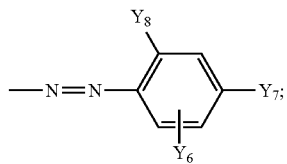

$Y_i$ is Cl or F; Q is Cl or $CH_3$; $Y_2$ is Cl, F, OR, $NHCH_2SO_3X$, $N(R)_2$, $N(CH_2OH)_2$, $N(C_2H_4OH)_2$,

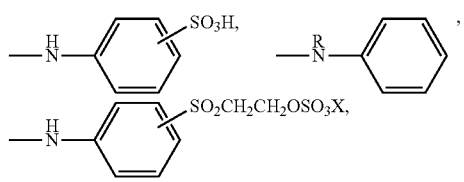

-continued

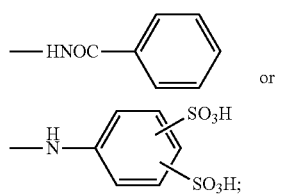 or $Y_3$ is H or Br; $Y_4$ is H, Cl or Br; $Y_5$ is Br or $OSO_3X$; $Y_6$ is H, Cl, NHR, OR, CN, $SO_3Na$, $SO_2NHR$, CONHR, COOR or NHCOR; $Y_7$ is H, Cl, OR, CN, $NO_2$, $SO_3Na$, $SO_2NHR$, $SO_2CH_2CH_2Y_9$, $SO_2NHCH_2CH_2Y_9$, CONHR or COOR; $Y_8$ is H, OH, Cl, $CH_3$, $OCH_3$, $OC_2H_5$, CN, $CONH_2$, $COOCH_3$ or $COOC_2H_5$; $Y_9$ is Cl, $OSO_3X$ or $N(CH_3)CH_2CH_2SO_3X$; $R_4$ is H, OH or $NH_2$; $R_5$ is H, NHR, $SO_3Na$ or $SO_2NHR$; $R_6$ is H, NHR, $SO_3Na$, $SO_2NHR$ or NHCOR; $R_7$ is H, NHR, $SO_3Na$ or $SO_2NHR$; $R_8$ is H, NHR, $SO_3Na$, $SO_2NHR$ or NHCOR; $R_9$ is H, Cl, NHR, CN, $SO_3Na$, $SO_2NHR$ or COOR; $R_{10}$ is H, Cl, NHR, CN, $SO_3Na$, $SO_2NHR$ or COOR; $R_{11}$ is H, Cl, $CH_3$, $OCH_3$, $OC_2H_5$, OH, NHR, CN, $CONH_2$, $COOCH_3$ or $COOC_2H_5$; $R_{12}$ is H, Cl, $CH_3$, $OCH_3$, $OC_2H_5$, OH, NHR, CN, $CONH_2$, $COOCH_3$ or $COOC_2H_5$; $R_{13}$ is H, Cl, $CH_3$, $OCH_3$, $OC_2H_5$, OH, NHR, CN, $CONH_2$, $COOCH_3$ or $COOC_2H_5$; R is H, or a linear, saturated alkyl of $C_pH_{2p+1}$, wherein: p is an integer with the proviso of $1 \le p \le 18$; and X is H, Na or K;

(15)

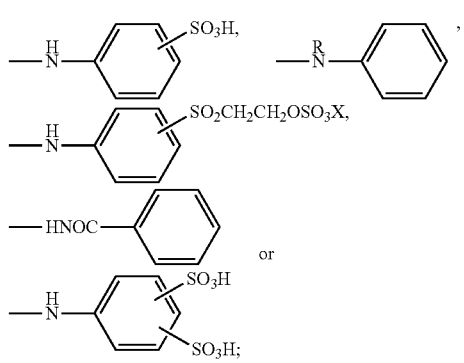

in formula (15): $R_1$ is H, $CH_3$, Cl, OR, CN, $NO_2$, $SO_3Na$ or $SO_2NHR$; $R_2$ is H, $CH_3$, Cl, OR, CN, $NO_2$, $SO_3Na$ or $SO_2NHR$; $R_3$ is H, NHR or NHCOR; $R_4$, $R_9$ is H, $CH_3$, Cl, OR, CN, $NO_2$, $SO_3Na$, $SO_2NHR$, NHR,

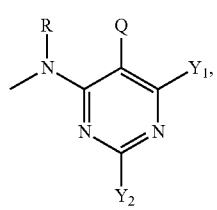 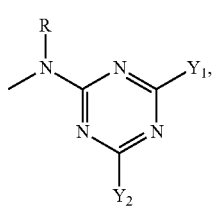

$NHCOCY_3$=$CHY_3$, $NHCOCHY_4CH_2Y_5$ or

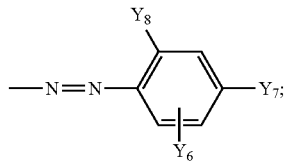

$Y_1$ is Cl or F; Q is Cl or $CH_3$; $Y_2$ is Cl, F, OR, $NHCH_2SO_3X$, $N(R)_2$, $N(CH_2OH)_2$, $N(C_2H_4OH)_2$,

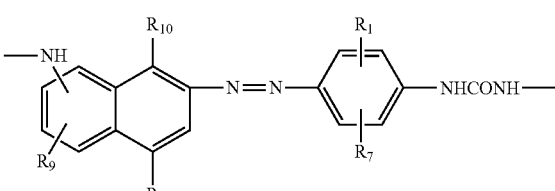

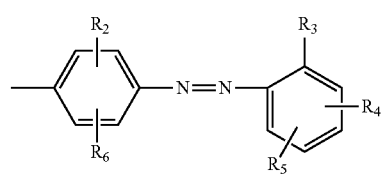

$Y_3$ is H or Br; $Y_4$ is H, Cl or Br; $Y_5$ is Br or $OSO_3X$; $Y_6$ is H, Cl, NHR, OR, CN, $SO_3Na$, $SO_2NHR$, CONHR, COOR or NHCOR; $Y_7$ is H, Cl, OR, CN, $NO_2$, $SO_3Na$, $SO_2NHR$, $SO_2CH_2CH_2Y_9$, $SO_2NHCH_2CH_2Y_9$, CONHR or COOR; $Y_8$ is H, OH, Cl, $CH_3$, $OCH_3$, $OC_2H_5$, CN, $CONH_2$, $COOCH_3$ or $COOC_2H_5$; $Y_9$ is Cl, $OSO_3X$ or $N(CH_3)CH_2CH_2SO_3X$; $R_5$ is H, $SO_3Na$, $SO_2NHR$ or NHCOR; $R_6$ is H, $SO_3Na$ or $SO_2NHR$; $R_7$ is H, $SO_3Na$ or $SO_2NHR$; $R_8$ is H, $SO_3Na$, $SO_2NHR$ or NHCOR; $R_{10}$ is H, OH, $NH_2$, NHR, CN, $SO_3Na$, $SO_2NHR$ or COOR; R is H, or a linear, saturated alkyl of $C_pH_{2p+1}$, wherein: p is an integer with the proviso of $1 \le p \le 18$; and X is H, Na or K;

(16)

in formula (16): $R_1$ is H, $CH_3$, Cl, OR, CN, $NO_2$, $SO_3Na$ or $SO_2NHR$; $R_2$ is H, $CH_3$, Cl, OR, CN, $NO_2$, $SO_3Na$ or $SO_2NHR$; $R_3$ is H, NHR or NHCOR; $R_4$, $R_9$ is H, NHR, $SO_3Na$, $SO_2NHR$, NHCOR, $SO_2CH_2CH_2Y_1$, $SO_2NHCH_2CH_2Y_1$,

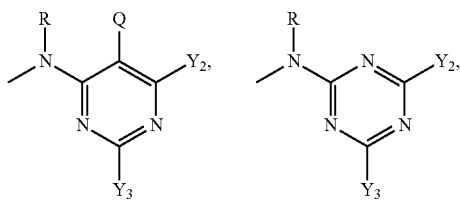

NHCOCY$_4$=CHY$_5$ or NHCOCHY$_4$CH$_2$Y$_6$; Y$_i$ is Cl, OSO$_3$X or N(CH$_3$)CH$_2$CH$_2$SO$_3$X; Q is Cl or CH$_3$; Y$_2$ is Cl or F; Y$_3$ is Cl, F, OR, NHCH$_2$SO$_3$X, N(R)$_2$, N(CH$_2$OH)$_2$, N(C$_2$H$_4$OH)$_2$,

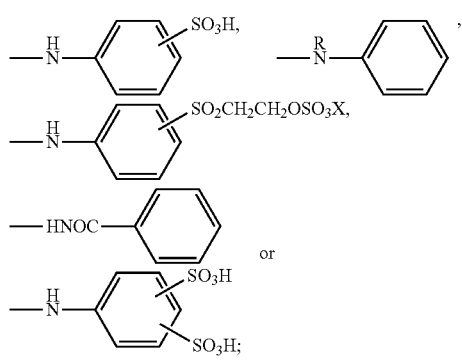

Y$_4$ is H or Br; Y$_5$ is H, Cl or Br; Y$_6$ is Br or OSO$_3$X; R$_5$ is H, SO$_3$Na, SO$_2$NHR or NHCOR; R$_6$ is H, SO$_3$Na or SO$_2$NHR; R$_7$ is H, SO$_3$Na or SO$_2$NHR; R$_8$ is H, SO$_3$Na, SO$_2$NHR or NHCOR; R$_{10}$ is H, OH, NH$_2$, NHR, CN, SO$_3$Na, SO$_2$NHR or COOR; R is H, or a linear, saturated alkyl of C$_p$H$_{2p+1}$, wherein: p is an integer with the proviso of 1≤p≤18; and X is H, Na or K;

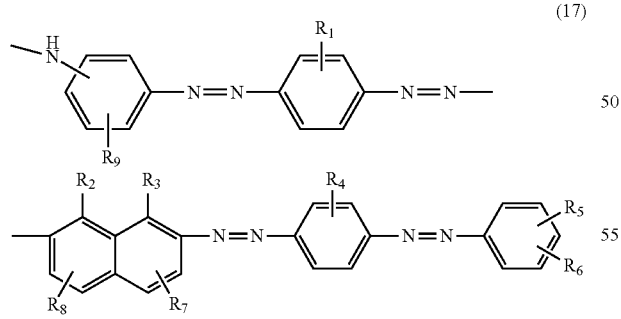

in formula (17): R$_1$ is H, CH$_3$, Cl, OR, CN, NO$_2$, SO$_3$Na or SO$_2$NHR; R$_2$ is NH$_2$, OH or OR; R$_3$ is NH$_2$, OH or OR; R$_4$ is H, CH$_3$, Cl, OR, CN, NO$_2$, SO$_3$Na or SO$_2$NHR; R$_5$, R$_9$ is H, NHR, SO$_3$Na, SO$_2$NHR, NHCOR, SO$_2$CH$_2$CH$_2$Y$_1$, SO$_2$NHCH$_2$CH$_2$Y$_1$,

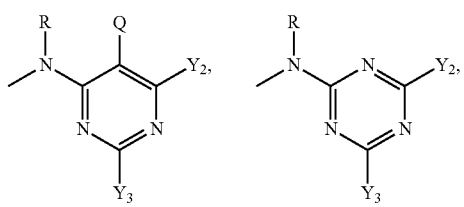

NHCOCY$_4$=CHY$_5$ or NHCOCHY$_4$CH$_2$Y$_6$; Y$_1$ is Cl, OSO$_3$X or N(CH$_3$)CH$_2$CH$_2$SO$_3$X; Q is Cl or CH$_3$; Y$_2$ is Cl or F; Y$_3$ is Cl, F, OR, NHCH$_2$SO$_3$X, N(R)$_2$, N(CH$_2$OH)$_2$, N(C$_2$H$_4$OH)$_2$,

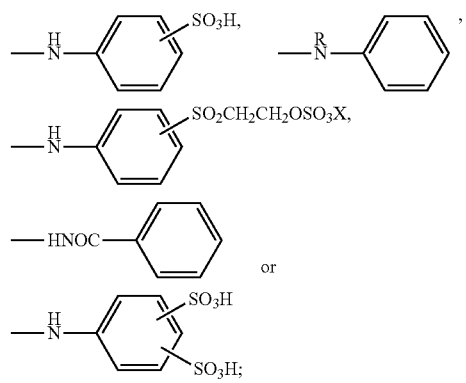

Y$_4$ is H or Br; Y$_5$ is H, Cl or Br; Y$_6$ is Br or OSO$_3$X; R$_6$ is H, SO$_3$Na, SO$_2$NHR or NHCOR; R$_7$ is H, SO$_3$Na or SO$_2$NHR; R$_8$ is H, SO$_3$Na or SO$_2$NHR; R is H, or a linear, saturated alkyl of C$_p$H$_{2p+1}$, wherein: p is an integer with the proviso of 1≤p≤18; and X is H, Na or K;

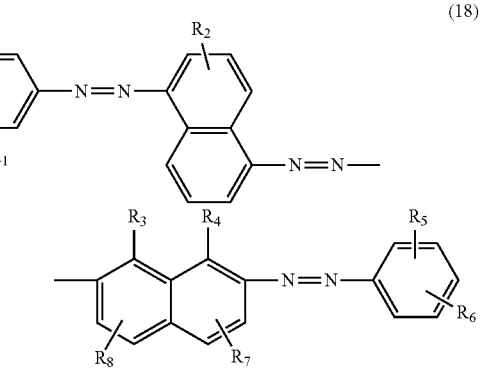

(18)

in formula (18): R$_1$ is H, CH$_3$, Cl, OR, CN, NO$_2$, SO$_3$Na or SO$_2$NHR; R$_2$ is H, CH$_3$, Cl, OR, CN, NO$_2$, SO$_3$Na or SO$_2$NHR; R$_3$ is NH$_2$, OH or OR; R$_4$ is NH$_2$, OH or OR; R$_5$ is H, CH$_3$, Cl, OR, CN, NO$_2$, SO$_3$Na, SO$_2$NHR, NHR,

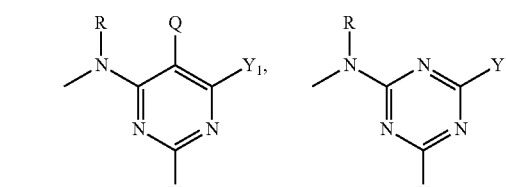

NHCOCY$_3$=CHY$_3$, NHCOCHY$_4$CH$_2$Y$_5$ or

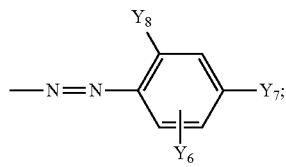

Y$_1$ is Cl or F; Q is Cl or CH$_3$; Y$_2$ is Cl, F, OR, NHCH$_2$SO$_3$X, N(R)$_2$, N(CH$_2$OH)$_2$, N(C$_2$H$_4$OH)$_2$,

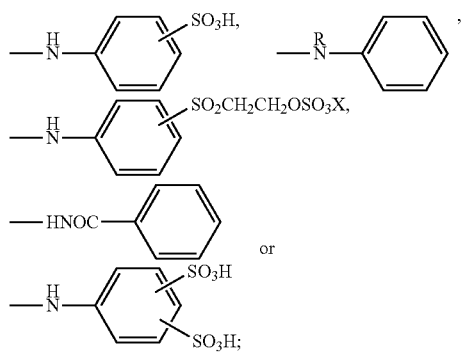

Y$_3$ is H or Br; Y$_4$ is H, Cl or Br; Y$_5$ is Br or OSO$_3$X; Y$_6$ is H, Cl, NHR, OR, CN, SO$_3$Na, SO$_2$NHR, CONHR, COOR or NHCOR; Y$_7$ is H, Cl, OR, CN, NO$_2$, SO$_3$Na, SO$_2$NHR, SO$_2$CH$_2$CH$_2$Y$_9$, SO$_2$NHCH$_2$CH$_2$Y$_9$, CONHR or COOR; Y$_8$ is H, OH, Cl, CH$_3$, OCH$_3$, OC$_2$H$_5$, CN, CONH$_2$, COOCH$_3$ or COOC$_2$H$_5$; Y$_9$ is Cl, OSO$_3$X or N(CH$_3$)CH$_2$CH$_2$SO$_3$X; R$_6$ is H, SO$_3$Na, SO$_2$NHR or NHCOR; R$_7$ is H, SO$_3$Na or SO$_2$NHR; R$_8$ is H, SO$_3$Na or SO$_2$NHR; R is H, or a linear, saturated alkyl of C$_p$H$_{2p+1}$, wherein: p is an integer with the proviso of $1 \leq p \leq 18$; and X is H, Na or K;

(19)

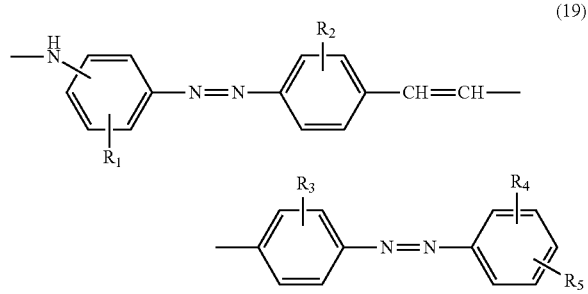

in formula (19): R$_1$ is H, CH$_3$, Cl, OR, CN, NO$_2$, SO$_3$Na or SO$_2$NHR; R$_2$ is H, CH$_3$, Cl, OR, CN, NO$_2$, SO$_3$Na or SO$_2$NHR; R$_3$ is H, CH$_3$, Cl, OR, CN, NO$_2$, SO$_3$Na or SO$_2$NHR; R$_4$ is NH$_2$, OH or OR; R$_5$ is H, CH$_3$, Cl, OR, CN, NO$_2$, SO$_3$Na, SO$_2$NHR, NHR,

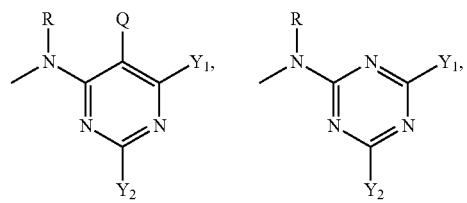

NHCOCY$_3$=CHY$_3$, NHCOCHY$_4$CH$_2$Y$_5$ or

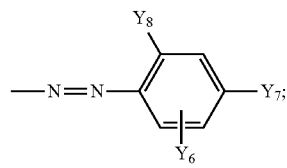

Y$_1$ is Cl or F; Q is Cl or CH$_3$; Y$_2$ is Cl, F, OR, NHCH$_2$SO$_3$X, N(R)$_2$, N(CH$_2$OH)$_2$, N(C$_2$H$_4$OH)$_2$,

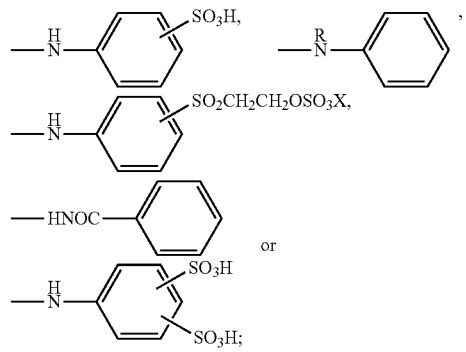

Y$_3$ is H or Br; Y$_4$ is H, Cl or Br; Y$_5$ is Br or OSO$_3$X; Y$_6$ is H, Cl, NHR, OR, CN, SO$_3$Na, SO$_2$NHR, CONHR, COOR or NHCOR; Y$_7$ is H, Cl, OR, CN, NO$_2$, SO$_3$Na, SO$_2$NHR, SO$_2$CH$_2$CH$_2$Y$_9$, SO$_2$NHCH$_2$CH$_2$Y$_9$, CONHR or COOR; Y$_8$ is H, OH, Cl, CH$_3$, OCH$_3$, OC$_2$H$_5$, CN, CONH$_2$, COOCH$_3$ or COOC$_2$H$_5$; Y$_9$ is Cl, OSO$_3$X or N(CH$_3$)CH$_2$CH$_2$SO$_3$X; R is H, or a linear, saturated alkyl of C$_p$H$_{2p+1}$, wherein: p is an integer with the proviso of $1 \leq p \leq 18$; and X is H, Na or K;

(20)

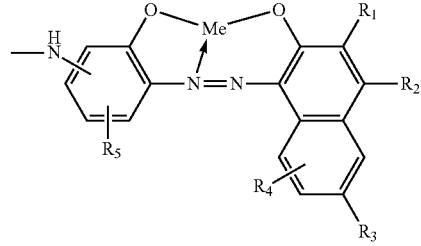

in formula (20): $R_1$ is H, $SO_3Na$ or $SO_2NHR$; $R_2$ is H, Cl, CN, $SO_2NHR$, CONHR, COOR, NHR, NHCOR, $SO_2CH_2CH_2Y_1$, $SO_2NHCH_2CH_2Y_1$,

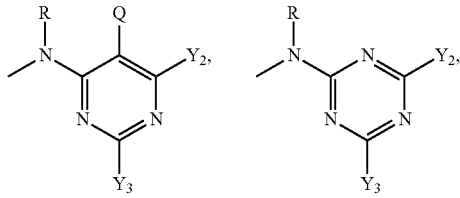

$NHCOCY_4$=$CHY_5$ or $NHCOCHY_4CH_2Y_6$, $Y_i$ is Cl, $OSO_3X$ or $N(CH_3)CH_2CH_2SO_3X$; $Y_2$ is Cl or F; $Y_3$ is Cl, F, OR, $NHCH_2SO_3X$, $N(R)_2$, $N(CH_2OH)_2$, $N(C_2H_4OH)_2$,

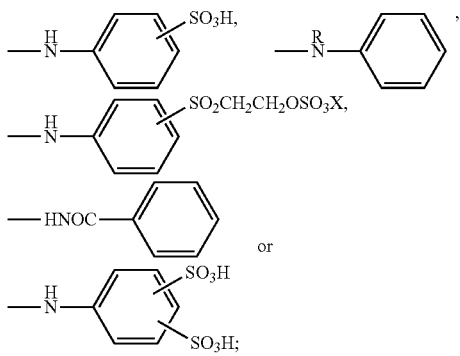

$Y_4$ is H or Br; $Y_5$ is H, Cl or Br; $Y_6$ is Br or $OSO_3X$; Q is Cl or $CH_3$; $R_3$ is H, $SO_3Na$, $SO_2NHR$, NHR or NHCOR; $R_4$ is H, $SO_2NHR$, NHR or NHCOR; $R_5$ is H, Cl, NHR, CN, $SO_3Na$, $SO_2NHR$, CONHR, COOR or NHCOR; R is H, or a linear, saturated alkyl of $C_pH_{2p+1}$, wherein: p is an integer with the proviso of $1 \leq p \leq 18$; and X is H, Na or K; Me is Cu, Co, Ni, Cr or Fe;

(21)

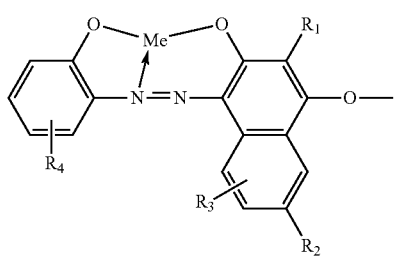

in formula (21): $R_1$ is H, $SO_3Na$ or $SO_2NHR$; $R_2$ is H, Cl, CN, $SO_3Na$, $SO_2NHR$, CONHR, COOR, NHR or NHCOR; $R_3$ is H, $SO_2NHR$, NHR or NHCOR; $R_4$ is H, $SO_3Na$, $SO_2NHR$, NHR, CONHR, COOR, NHCOR, $SO_2CH_2CH_2Y_1$, $SO_2NHCH_2CH_2Y_1$,

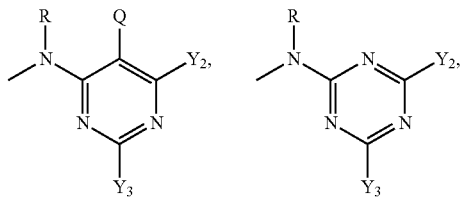

$NHCOCY_4$=$CHY_5$ or $NHCOCHY_4CH_2Y_6$; $Y_1$ is Cl, $OSO_3X$ or $N(CH_3)CH_2CH_2SO_3X$; $Y_2$ is Cl or F; $Y_3$ is Cl, F, OR, $NHCH_2SO_3X$, $N(R)_2$, $N(CH_2OH)_2$, $N(C_2H_4OH)_2$,

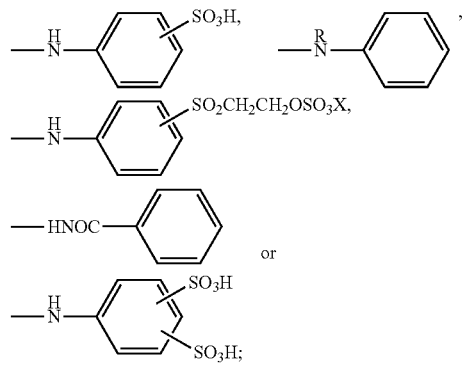

$Y_4$ is H or Br; $Y_5$ is H, Cl or Br; $Y_6$ is Br or $OSO_3X$; Q is Cl or $CH_3$; R is H, or a linear, saturated alkyl of $C_pH_{2p+1}$, wherein: p is an integer with the proviso of $1 \leq p \leq 18$; and X is H, Na or K; Me is Cu, Co, Ni, Cr or Fe;

(22)

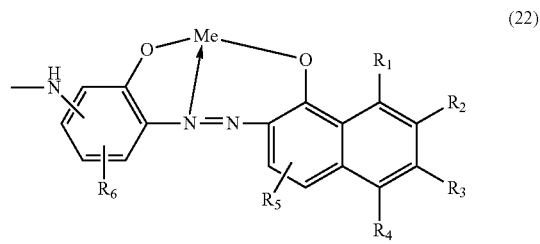

in formula (22): $R_1$ is H, OH, NHR, NHCOR,

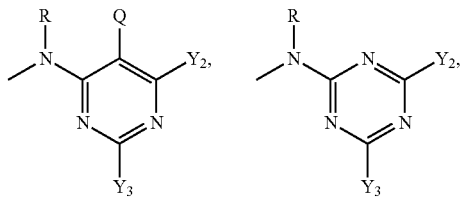

$NHCOCY_3$=$CHY_3$ or $NHCOCHY_4CH_2Y_5$; $Y_1$ is Cl or F; Q is Cl or $CH_3$; $Y_2$ is Cl, F, OR, $NHCH_2SO_3X$, $N(R)_2$, $N(CH_2OH)_2$, $N(C_2H_4OH)_2$,

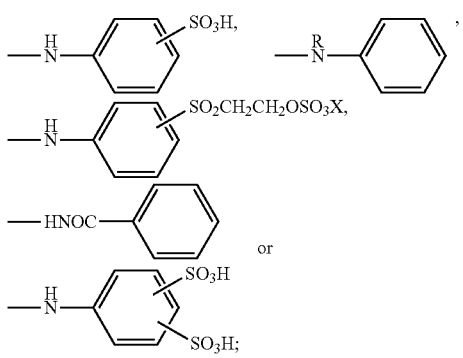

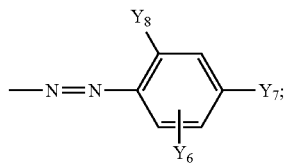

$Y_3$ is H or Br; $Y_4$ is H, Cl or Br; $Y_5$ is Br or $OSO_3X$; $R_2$ is H, NHR, $SO_3Na$, $SO_2NHR$, NHCOR or

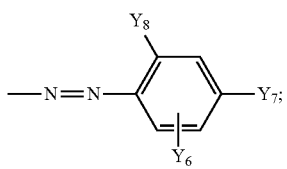

$Y_6$ is H, Cl, NHR, OR, CN, $SO_3Na$, $SO_2NHR$, CONHR, COOR or NHCOR; $Y_7$ is H, Cl, OR, CN, $NO_2$, $SO_3Na$, $SO_2NHR$, $SO_2CH_2CH_2Y_9$, $SO_2NHCH_2CH_2Y_9$, CONHR or COOR; $Y_8$ is H, OH, Cl, $CH_3$, $OCH_3$, $OC_2H_5$, CN, $CONH_2$, $COOCH_3$ or $COOC_2H_5$; $Y_9$ is Cl, $OSO_3X$ or $N(CH_3)CH_2CH_2SO_3X$; $R_3$ is H, NHR, $SO_3Na$, $SO_2NHR$ or NHCOR; $R_4$ is H, NHR, $SO_3Na$, $SO_2NHR$ or NHCOR; $R_5$ is H, $SO_3Na$ or $SO_2NHR$; $R_6$ is H, Cl, NHR, CN, $SO_3Na$, $SO_2NHR$, CONHR or COOR; R is H, or a linear, saturated alkyl of $C_pH_{2p+1}$, wherein: p is an integer with the proviso of $1 \leq p \leq 18$; and X is H, Na or K; Me is Cu, Co, Ni, Cr or Fe;

(23)

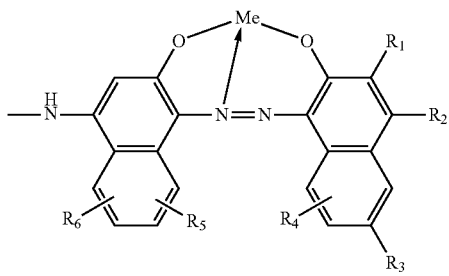

in formula (23): $R_1$ is H, Cl, $CH_3$, $OCH_3$, $OC_2H_5$, OH, CN, $CONH_2$, $COOCH_3$ or $COOC_2H_5$; $R_2$ is H, OH, $NH_2$,

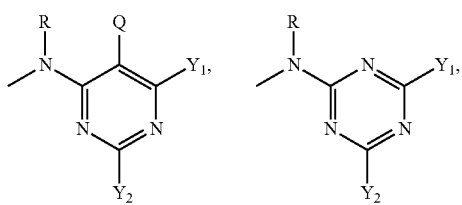

$NHCOCY_3$=$CHY_3$, $NHCOCHY_4CH_2Y_5$ or

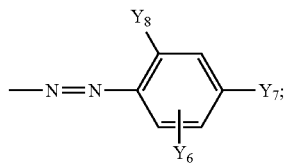

$Y_1$ is Cl or F; Q is Cl or $CH_3$; $Y_2$ is Cl, F, OR, $NHCH_2SO_3X$, $N(R)_2$, $N(CH_2OH)_2$, $N(C_2H_4OH)_2$,

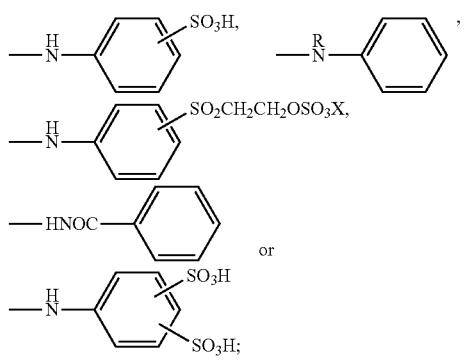

$Y_3$ is H or Br; $Y_4$ is H, Cl or Br; $Y_5$ is Br or $OSO_3X$; $Y_6$ is H, Cl, NHR, OR, CN, $SO_3Na$, $SO_2NHR$, CONHR, COOR or NHCOR; $Y_7$ is H, Cl, OR, CN, $NO_2$, $SO_3Na$, $SO_2NHR$, $SO_2CH_2CH_2Y_9$, $SO_2NHCH_2CH_2Y_9$, CONHR or COOR; $Y_8$ is H, OH, Cl, $CH_3$, $OCH_3$, $OC_2H_5$, CN, $CONH_2$, $COOCH_3$ or $COOC_2H_5$; $Y_9$ is Cl, $OSO_3X$ or $N(CH_3)CH_2CH_2SO_3X$; $R_3$ is H, NHR, $SO_3Na$, $SO_2NHR$ or NHCOR; $R_4$ is H, $SO_3Na$ or $SO_2NHR$; $R_5$ is H, Cl, NHR, CN, $SO_3Na$, $SO_2NHR$ or COOR; $R_6$ is H, Cl, $CH_3$, $OCH_3$, $OC_2H_5$, OH, CN, $CONH_2$, $COOCH_3$ or $COOC_2H_5$; R is H, or a linear, saturated alkyl of $C_pH_{2p+1}$, wherein: p is an integer with the proviso of $1 \leq p \leq 18$; and X is H, Na or K; Me is Cu, Co, Ni, Cr or Fe;

(24)

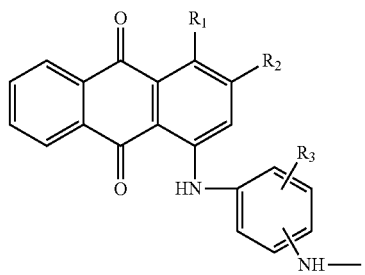

in formula (24): $R_1$ is H, Cl, Br, $CH_3$, $OCH_3$, $OC_2H_5$, OH, NHR, $NO_2$, CN, $CONH_2$, NHCOR,

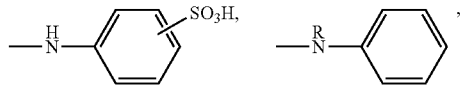

-continued

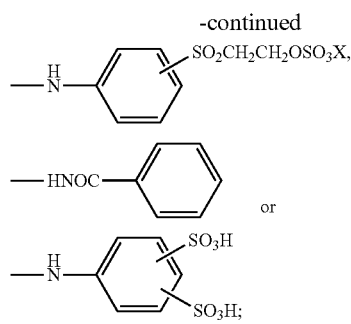

$R_2$ is H, $SO_3Na$, $SO_2NHR$ or

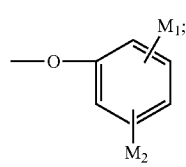

$M_1$ is H, Cl, OR, CN, $NO_2$, $SO_3Na$ or $SO_2NHR$; $M_2$ is H, Cl, OR, CN, $NO_2$, $SO_3Na$ or $SO_2NHR$; $R_3$ is H, $CH_3$, Cl, OR, CN, $NO_2$, $SO_3Na$, $SO_2NHR$, $SO_2CH_2CH_2Y_1$, $SO_2NHCH_2CH_2Y_1$,

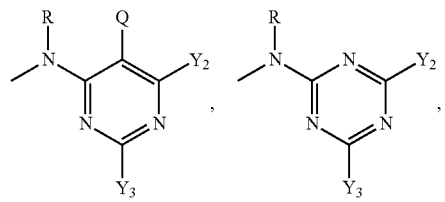

$NHCOCY_4$=$CHY_5$ or $NHCOCHY_4CH_2Y_6$; $Y_1$ is Cl, $OSO_3X$ or $N(CH_3)CH_2CH_2SO_3X$; $Y_2$ is Cl or F; $Y_3$ is Cl, F, OR, $NHCH_2SO_3X$, $N(R)_2$, $N(CH_2OH)_2$, $N(C_2H_4OH)_2$,

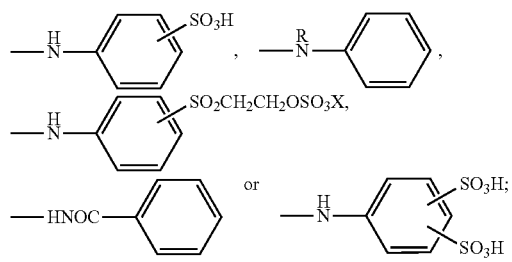

$Y_4$ is H or Br; $Y_5$ is H, Cl or Br; $Y_6$ is Br or $OSO_3X$; Q is Cl or $CH_3$; R is H, or a linear, saturated alkyl of $C_pH_{2p+1}$, wherein: p is an integer with the proviso of $1 \leq p \leq 18$; and X is H, Na or K;

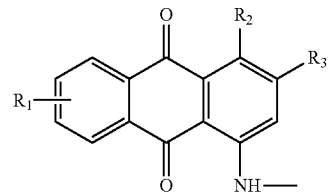

in formula (25): $R_1$ is H, Cl, Br, $CH_3$, $OCH_3$, $OC_2H_5$, OH, NHR, $NO_2$, CN, $CONH_2$, NHCOR, $SO_3Na$, $SO_2NHR$,

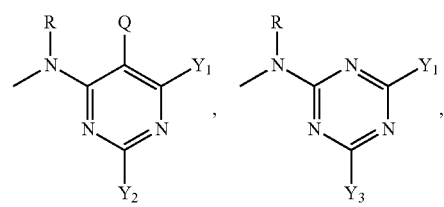

$NHCOCY_3$=$CHY_3$, $NHCOCHY_4CH_2Y_5$ or

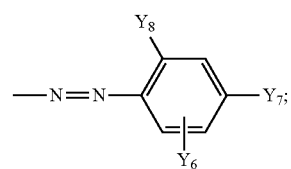

$Y_1$ is Cl or F; Q is Cl or $CH_3$; $Y_2$ is Cl, F, OR, $NHCH_2SO_3X$, $N(R)_2$, $N(CH_2OH)_2$, $N(C_2H_4OH)_2$,

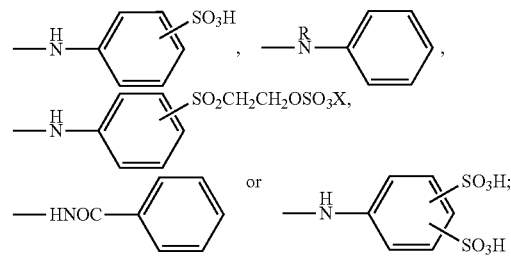

$Y_3$ is H or Br; $Y_4$ is H, Cl or Br; $Y_5$ is Br or $OSO_3X$; $Y_6$ is H, Cl, NHR, OR, CN, $SO_3Na$, $SO_2NHR$, CONHR, COOR or NHCOR; $Y_7$ is H, Cl, OR, CN, $NO_2$, $SO_3Na$, $SO_2NHR$, $SO_2CH_2CH_2Y_9$, $SO_2NHCH_2CH_2Y_9$, CONHR or COOR; $Y_8$ is H, OH, Cl, $CH_3$, $OCH_3$, $OC_2H_5$, CN, $CONH_2$, $COOCH_3$ or $COOC_2H_5$; $Y_9$ is Cl, $OSO_3X$ or $N(CH_3)CH_2CH_2SO_3X$; $R_2$ is H, Cl, Br, $CH_3$, $OCH_3$, $OC_2H_5$, OH, NHR, $NO_2$, CN, $CONH_2$, NHCOR, $SO_3Na$, $SO_2NHR$,

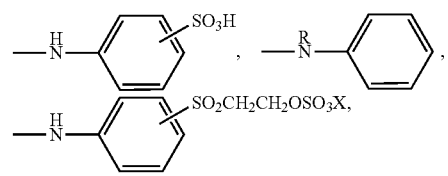

-continued

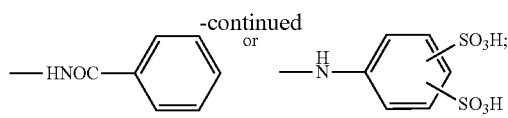

$R_3$ is H, $SO_3Na$, $SO_2NHR$ or

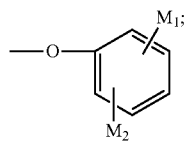

$M_1$ is H, Cl, OR, CN, $NO_2$, $SO_3Na$ or $SO_2NHR$; $M_2$ is H, Cl, OR, CN, $NO_2$, $SO_3Na$ or $SO_2NHR$; R is H, or a linear, saturated alkyl of $C_pH_{2p+1}$, wherein: p is an integer with the proviso of $1 \leq p \leq 18$; and X is H, Na or K;

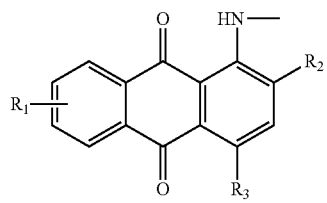
(26)

in formula (26): $R_1$ is H, Cl, Br, $CH_3$, $OCH_3$, $OC_2H_5$, OH, NHR, $NO_2$, CN, $CONH_2$, NHCOR, $SO_3Na$, $SO_2NHR$,

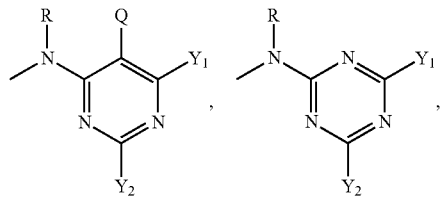

$NHCOCY_3{=}CHY_3$, $NHCOCHY_4CH_2Y_5$ or

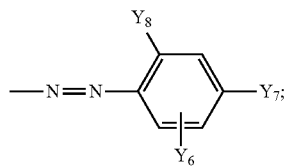

$Y_1$ is Cl or F; Q is Cl or $CH_3$; $Y_2$ is Cl, F, OR, $NHCH_2SO_3X$, $N(R)_2$, $N(CH_2OH)_2$, $N(C_2H_4OH)_2$,

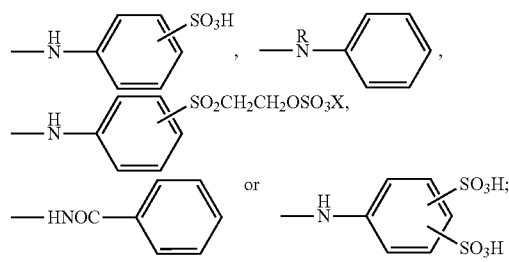

$Y_3$ is H or Br; $Y_4$ is H, Cl or Br; $Y_5$ is Br or $OSO_3X$; $Y_6$ is H, Cl, NHR, OR, CN, $SO_3Na$, $SO_2NHR$, CONHR, COOR or NHCOR; $Y_7$ is H, Cl, OR, CN, $NO_2$, $SO_3Na$, $SO_2NHR$, $SO_2CH_2CH_2Y_9$, $SO_2NHCH_2CH_2Y_9$, CONHR or COOR; $Y_8$ is H, OH, Cl, $CH_3$, $OCH_3$, $OC_2H_5$, CN, $CONH_2$, $COOCH_3$, $COOC_2H_5$; $Y_9$ is Cl, $OSO_3X$ or $N(CH_3)CH_2CH_2SO_3X$; $R_2$ is H, $SO_3Na$, $SO_2NHR$ or

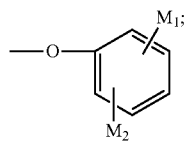

$M_1$ is H, Cl, OR, CN, $NO_2$, $SO_3Na$ or $SO_2NHR$; $M_2$ is H, Cl, OR, CN, $NO_2$, $SO_3Na$ or $SO_2NHR$; $R_3$ is H, Cl, Br, $CH_3$, $OCH_3$, $OC_2H_5$, OH, NHR, $NO_2$, CN, $CONH_2$, NHCOR, $SO_3Na$, $SO_2NHR$,

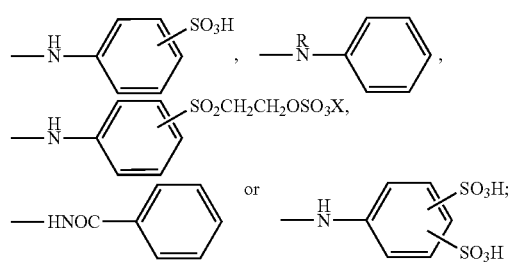

R is H, or a linear, saturated alkyl of $C_pH_{2p+1}$, wherein: p is an integer with the proviso of $1 \leq p \leq 18$; and X is H, Na or K.

2. The polycarboxylic acid dye according to claim 1, wherein $n_1$=1-20.

3. The polycarboxylic acid dye according to claim 1, wherein $n_2$=0-10.

4. The polycarboxylic acid dye according to claim 1, wherein $n_3$=1-50.

5. The polycarboxylic acid dye according to claim 1, wherein n=an integer of 1-80.

* * * * *